United States Patent
Komoriya et al.

[19]

[11] Patent Number: 5,916,458
[45] Date of Patent: Jun. 29, 1999

[54] PRODUCTION OF OPTICAL MODULE ASSEMBLY

[75] Inventors: Hitoshi Komoriya; Tetsuo Koezuka; Akihiko Yabuki; Yutaka Nakamura; Takao Hirahara; Yoshiro Goto, all of Kawasaki, Japan

[73] Assignee: Fujitsu Limited, Kawasaki, Japan

[21] Appl. No.: 08/639,197

[22] Filed: Apr. 26, 1996

[30] Foreign Application Priority Data

Aug. 31, 1995 [JP] Japan ................................ 7-223781
Jan. 23, 1996 [JP] Japan ................................ 8-009472

[51] Int. Cl.$^6$ .............................. G02B 27/62; G02B 6/42; B23K 26/00
[52] U.S. Cl. ............................... 219/121.63; 219/121.83; 356/400; 385/33; 385/93
[58] Field of Search ................................ 356/153, 400, 356/388, 399; 385/31, 32, 33, 134; 219/121.63, 121.64, 121.83

[56] References Cited

U.S. PATENT DOCUMENTS

| | | |
|---|---|---|
| 4,498,737 | 2/1985 | Doggett . |
| 4,746,195 | 5/1988 | Auracher et al. .................... 356/400 |
| 4,843,209 | 6/1989 | Milligan . |
| 4,854,667 | 8/1989 | Ebata et al. ........................ 385/134 |
| 4,984,885 | 1/1991 | Oritz et al. ........................ 356/153 |
| 5,009,481 | 4/1991 | Kinoshita et al. .................. 385/33 |
| 5,117,474 | 5/1992 | van den Bergh et al. ........... 385/33 |
| 5,322,463 | 6/1994 | Young . |
| 5,373,633 | 12/1994 | Satoi et al. . |
| 5,383,118 | 1/1995 | Nguyen ............................. 385/134 |
| 5,666,450 | 9/1997 | Fujimura et al. ................... 385/93 |
| 5,673,350 | 9/1997 | Song et al. ........................ 385/93 |

FOREIGN PATENT DOCUMENTS

| | | |
|---|---|---|
| 0 223 556 A2 | 5/1987 | European Pat. Off. . |
| 0 269 337 A2 | 6/1988 | European Pat. Off. . |
| 0 314 113 A2 | 5/1989 | European Pat. Off. . |
| 0 327 949 | 8/1989 | European Pat. Off. . |
| 0 589 622 A1 | 3/1994 | European Pat. Off. . |
| 58-158622 | 9/1983 | Japan . |
| 60-76710 | 5/1985 | Japan . |
| 63-139307 | 6/1988 | Japan . |
| 02301705 | 12/1990 | Japan . |
| 08005870 | 1/1996 | Japan . |
| 2 286 061 | 8/1995 | United Kingdom . |
| 93/20988 | 10/1993 | WIPO . |

OTHER PUBLICATIONS

IBM Technical Disclosure Bulletin, vol. 34, No. 6, Nov. 1991; "Apparatus for Determining Beam Centrality in Connectorized Fiber–Optic Packages", pp. 67–69.

Proceedings of the Electronic Components and Technology Conference, Washington, May 1, 1994; U.S. Dept of Energy–Lawrence Livermore National Laboratory; Publ. Jan. 5, 1994; "Automated Fiber Pigtailing", O.T. Strand et al., Livermore, CA 94550 Technology.

*Primary Examiner*—Geoffrey S. Evans
*Attorney, Agent, or Firm*—Armstrong, Westerman, Hattori, McLeland & Naughton

[57] ABSTRACT

A method for producing an optical module assembly includes the steps of illuminating an optical surface of an optical device included in an optical module, acquiring an image of the optical surface of the optical module, obtaining a position of an end surface of the optical fiber with respect to the optical surface of the optical device based upon the image of the optical surface, and positioning the end surface of said optical fiber at the position thus obtained. An apparatus for carrying out the method is also disclosed.

32 Claims, 50 Drawing Sheets

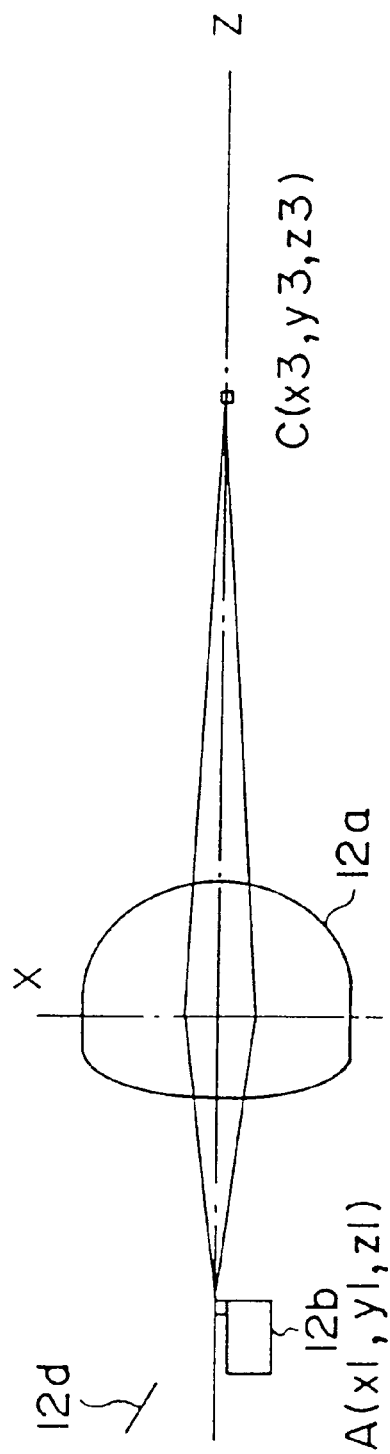
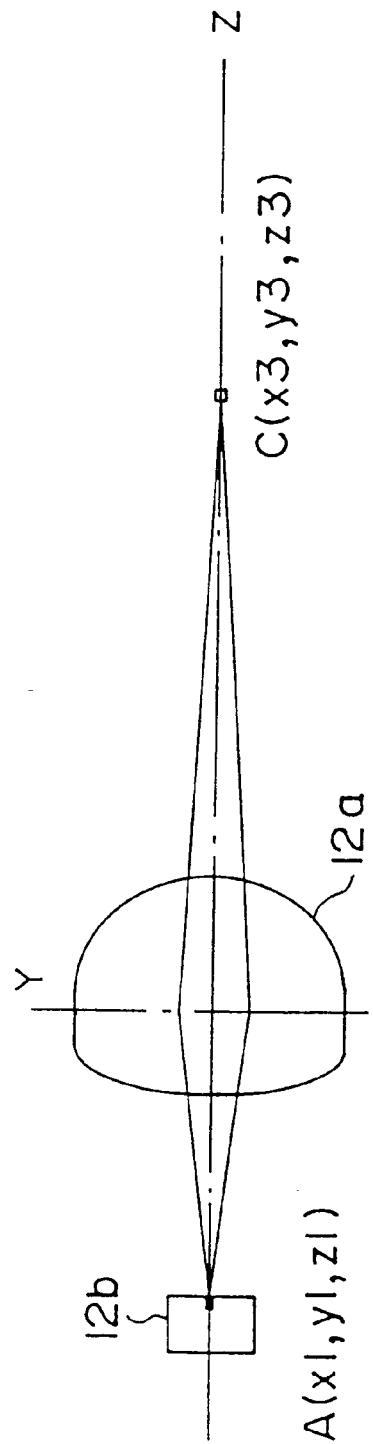
FIG. 8A
FIG. 8B

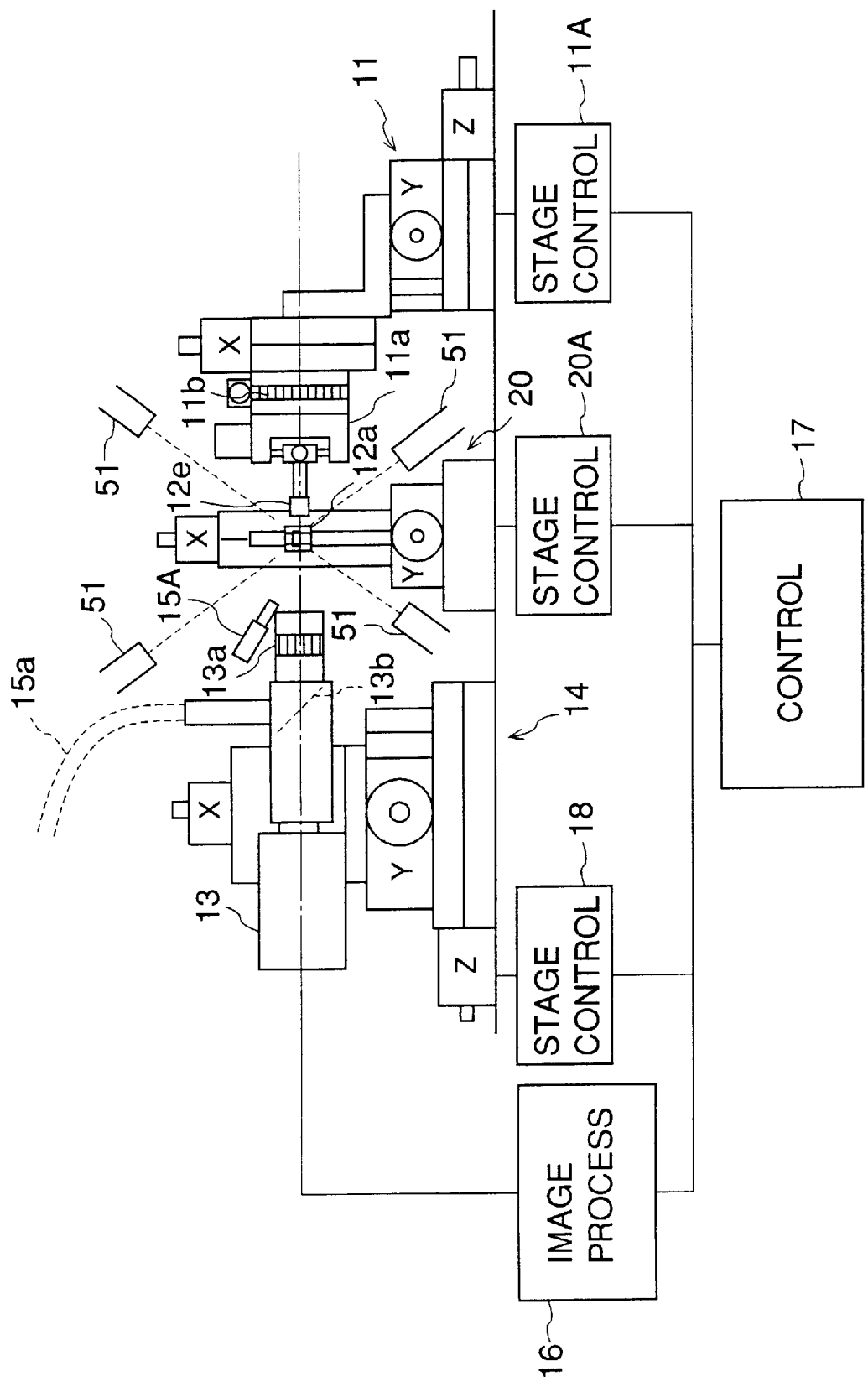

IMAGE OUT
(SYNTHESIS)

IMAGERY PLANE

OUT
(SYNTHESIS)

OFF - FOCUS (+)

ON - FOCUS

OFF - FOCUS (-)

→ MATCHING:NG

→ MATCHING:OK

PRODUCTION OF OPTICAL MODULE ASSEMBLY

BACKGROUND OF THE INVENTION

The present invention generally relates to production of optical modules and more particularly to the art of coupling a light emitting device or a photoreception device in an optical module to an optical fiber.

Optical networks support transmission of very large amounts of information with very high speed and is expected to play a major role in the near future particularly in relation to so-called multi-media applications in which image data including motion picture data and audio data are treated as a part of the information to be processed. In order that the human society accepts such multi-media as a part of the culture, it is necessary to provide the optical network as well as information processing terminals connected thereto at a cost as low as possible.

In order to connect various information processing terminals to the optical network, a so-called optical module is used, in which a photoreception device such as photodiode and a light emitting device such as laser diode are integrated. In such optical modules, it has been necessary to carry out a complex adjustment for achieving an optimum optical coupling between the photoreception device or the light emitting device in the module and the optical fiber.

For example, it is necessary to assemble an optical module with such precision that the optical beam emitted from a laser diode, provided in the optical module as a light emitting device, is focused, by a lens at a point located within 0.1 $\mu$m from the edge surface of a corresponding optical fiber. Conventionally, such an adjustment of the laser diode with respect to the optical beam edge has been achieved by observing the intensity of the optical beam in the optical fiber while continuously driving the laser diode during such an adjustment process.

FIG. 1 shows the constitution of an assembling rig used conventionally for producing an optical module assembly.

Referring to FIG. 1, an optical module includes a case 1a that holds a lens 3 and a laser diode 2, wherein it will be noted that a cylindrical body of the laser diode is fitted into the lens case 1a. After the laser diode 2 is thus mounted upon the case 1a, the relationship between the laser diode 2 and the lens 3 is fixed. Further, a fiber holder 6 that holds an end of an optical fiber 4 via a ferrule 5 is abutted to the case 1a. The ferrule 5 protects the end part of the optical fiber 4 as usual.

When fixing the fiber holder 6 upon the lens case 1a, a triaxial stage 7 is used. More specifically, the fiber holder 6 is held on the triaxial stage 7 in the state that the fiber holder 6 holds the optical fiber 4 as indicated, and the position of the triaxial stage 7 is adjusted for each of three axes x, y and z, while observing the optical beam at the other end of the optical fiber, so that the optical beam intensity in the optical fiber 6 becomes maximum.

However, such a conventional assembling process of the optical module has a drawback in that it takes about 30 seconds for conducting the adjustment for each of the foregoing x, y and z axes. This means that it takes about 1 minute and 30 seconds for adjustment of all three axes.

The reason such a long time is needed for the adjustment is that: (1) a stringent accuracy of 0.1 $\mu$m or less is required between the optical fiber edge and the optical module in order to achieve the necessary optical coupling; (2) it is necessary to direct the output beam of the laser diode into the core of the optical fiber before starting any adjustment at all, while the optical fiber core has a diameter of only about 9 $\mu$m; no adjustment is possible at all unless the optical beam of the laser diode hits the optical fiber core; (3) the output beam of the laser diode is an infrared beam, thus making it difficult to carry out a coarse adjustment by visual operation; (4) the optical components generally have substantial variation in the dimension due to poor precision of fabrication, leading to a substantial variation in the optimum position (as much as 500 $\mu$m), and the like.

SUMMARY OF THE INVENTION

Accordingly, it is a general object of the present invention to provide a novel and useful method of producing an optical module assembly and an apparatus for assembling such an optical module wherein the foregoing problems are eliminated.

Another and more specific object of the present invention is to provide a method of producing an optical module assembly and an apparatus for assembling such an optical module, wherein the efficiency of the process for achieving optical coupling between an optical module and an optical fiber is substantially improved.

Another object of the present invention is to provide a method for producing an optical module assembly including an optical module and an optical fiber coupled optically to said optical module, said method comprising the steps of:

(a) illuminating an optical surface of an optical device included in said optical module;

(b) acquiring an image of said optical surface;

(c) obtaining a position of an edge surface of said optical fiber with respect to said optical device, based upon said image of said optical surface; and (d) positioning said edge surface of said optical fiber at said position obtained in step (c).

Another object of the present invention is to provide an apparatus for producing an optical module assembly in which an optical module is coupled optically to an optical fiber, comprising:

a holder holding said optical module;

an illuminating device that illuminates said optical module in a state such that said optical module is held by said holder;

an imaging device acquiring an image of said optical module in a state that said optical module is held by said holder;

a triaxial stage carrying said illuminating device and said imaging device so as to be movable in three different directions; and an image processor obtaining a position of said optical fiber at which said optical fiber aligns optically to said optical module, according to said image acquired by said imaging device.

According to the present invention, an efficient coarse positioning of the optical fiber is achieved with respect to the optical module by picturing the optical surface of the optical module by using the imaging device that may be a camera.

Another object of the present invention is to provide an apparatus for producing an optical module assembly, said optical module assembly including an optical device, a lens and an optical fiber connector adapted for connection to an optical fiber; said apparatus comprising:

a turn-table;

a first assembling unit provided at a first location adjacent to said turn-table, said first assembling unit mounting a lens upon an optical device with an optical coupling to said optical device;

a second assembling unit provided at a second location adjacent to said turn-table and separate from said first location, said second assembling unit mounting an optical fiber connector upon a lens mounted on an optical device;

a first component holder provided on said turn-table at a first angular position that corresponds to said first assembling unit when said turn-table is in a first angular state;

a second component holder provided on said turn-table at a second angular position offset from said first angular position in a first angular direction;

a third component holder provided on said turn-table at a third angular position offset from said second angular position in said first angular direction;

a fourth component holder provided on said turn-table at a fourth angular position offset from said third angular position in said first angular direction, said third angular position being set so as to correspond to said second assembling unit when said turn-table is in said first angular state;

said second and fourth angular positions being set so as to correspond respectively to said first and second assembling units when said turn-table is in a second angular state;

each of said first through fourth component holders being capable of holding any of said optical device, said lens and said optical fiber connector;

said first assembling unit selecting a lens from one of said first through fourth component holders located at a position corresponding to said first assembling unit, said first assembling unit further mounting said lens onto an optical device held in another component holder with optical alignment so that said another component holder is located at the position corresponding to said first assembling unit;

said second assembling unit selecting an optical fiber connector from one of said first through fourth component holders located at a position corresponding to said second assembling unit, said second assembling unit further mounting said optical fiber connector onto a lens mounted upon a corresponding optical device in other component holder with optical alignment so that said other component holder is located at the position corresponding to said second assembling unit.

According to the present invention, it becomes possible to produce optical module assemblies consecutively with a continuous process, by providing the first and second assembling units at diametrically opposite locations of the turn-table and by conducting the mounting of the lens on the optical device such as a laser diode or a photodiode that forms the optical module by activating the first assembling unit, while simultaneously conducting the mounting of the optical fiber connector on the lens that is previously mounted on the optical device by activating the second assembling unit.

Another object of the present invention is to provide an apparatus for producing an optical module assembly, said optical module assembly including an optical device and a lens, said apparatus comprising:

a holder base for holding an optical device rotatably;

a first layer stage provided on said holder base;

a second layer stage provided on said first layer stage so as to be movable in a first direction with respect to said first layer stage;

a first drive mechanism for driving said second layer stage with respect to said first layer stage in said first direction;

a third layer stage provided on said second layer stage so as to be movable in a second, different direction;

a second drive mechanism for driving said third layer stage with respect to said second layer stage in said second direction;

a z-stage provided on said third layer stage so as to be movable in a vertical direction substantially perpendicular to said first and second directions, said z-stage carrying a lens holding mechanism holding a lens;

a z-drive mechanism for driving said z-stage on said third layer stage in said vertical direction; and a welding mechanism for welding said optical device and said lens with each other;

said first through third layer stages being provided with first through third openings respectively, said first through third openings allowing intrusion of said lens holding mechanism thereinto;

said z-stage having an opening for allowing intrusion of an imaging device thereinto, said imaging device detecting an optical alignment between said optical device and said lens;

said first layer stage carrying thereon a plurality of first guide mechanisms, such that said first guide mechanisms are provided between said first and second layer stages and guide said second layer stage in said first direction with respect to said first layer stage;

said second layer stage carrying thereon a plurality of second guide mechanisms, such that said second guide mechanisms are provided between said second layer stage and said third layer stage and guide said third layer stage in said second direction with respect to said second layer stage.

According to the present invention, it is possible to minimize the deformation of the stages caused by the reaction force that acts upon a hand mechanism used for holding a lens when welding the lens to a corresponding optical device to form an optical module assembly, the reaction force bearing on by a plurality of linear guides disposed generally symmetrically with respect to the hand mechanism. Thereby, it will be noted that the mechanical deformation of each of the first through third layer stages is minimized.

Other objects and further features of the present invention will become apparent from the following detailed description of preferred embodiments when read in conjunction with the attached drawings.

BRIEF DESCRIPTION OF THE DRAWINGS

FIGS. 8A and 8B are diagrams showing a step of the assembling process of the optical module according to the second embodiment of the present invention;

FIG. 12 is a diagram showing the construction of a production rig used in the second embodiment of the present invention;

DETAILED DESCRIPTION OF THE PREFERRED EMBODIMENTS

Figure 1:
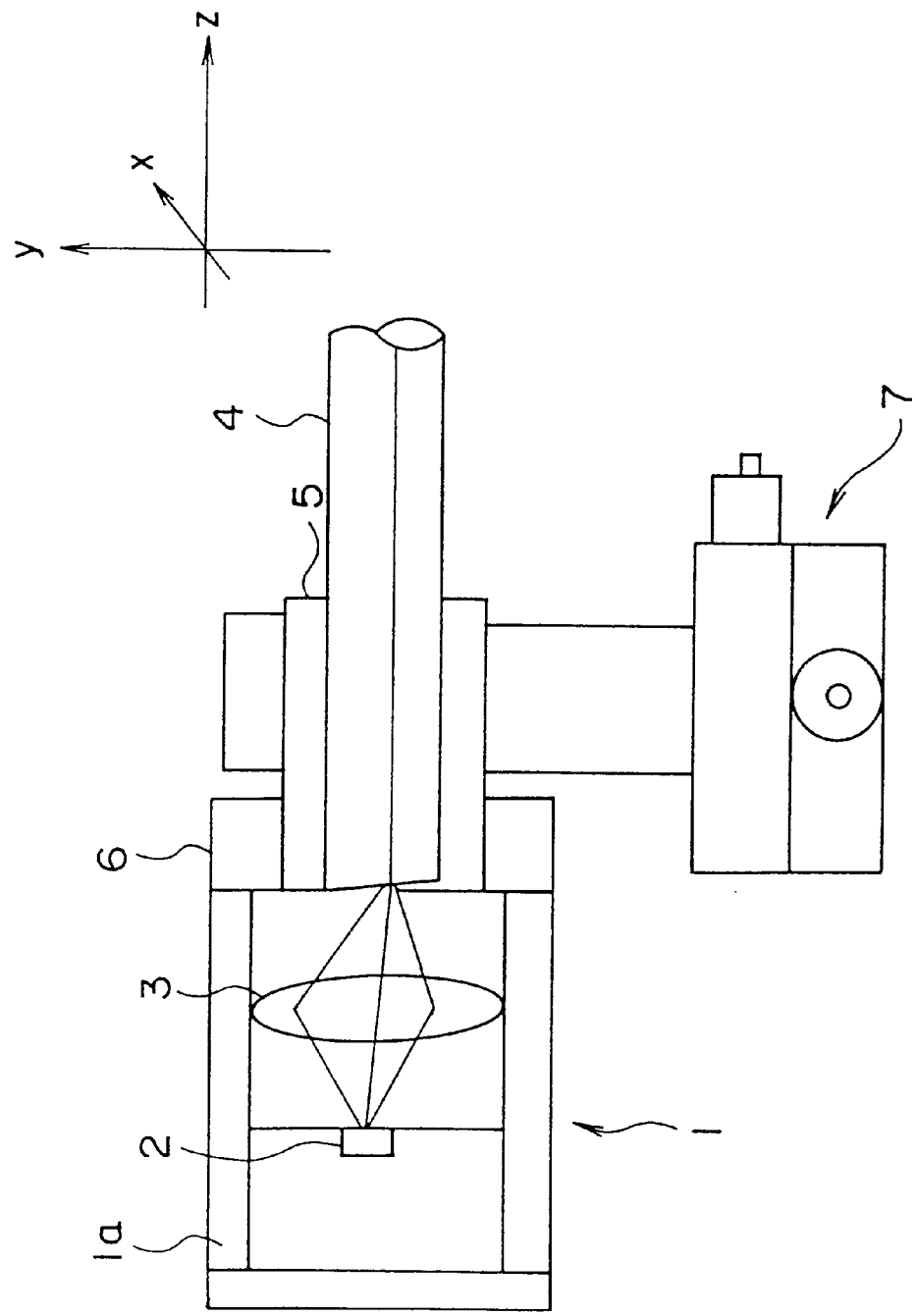
FIG. 1 is a diagram showing the construction of a conventional production rig of an optical module assembly.
Figure 2:
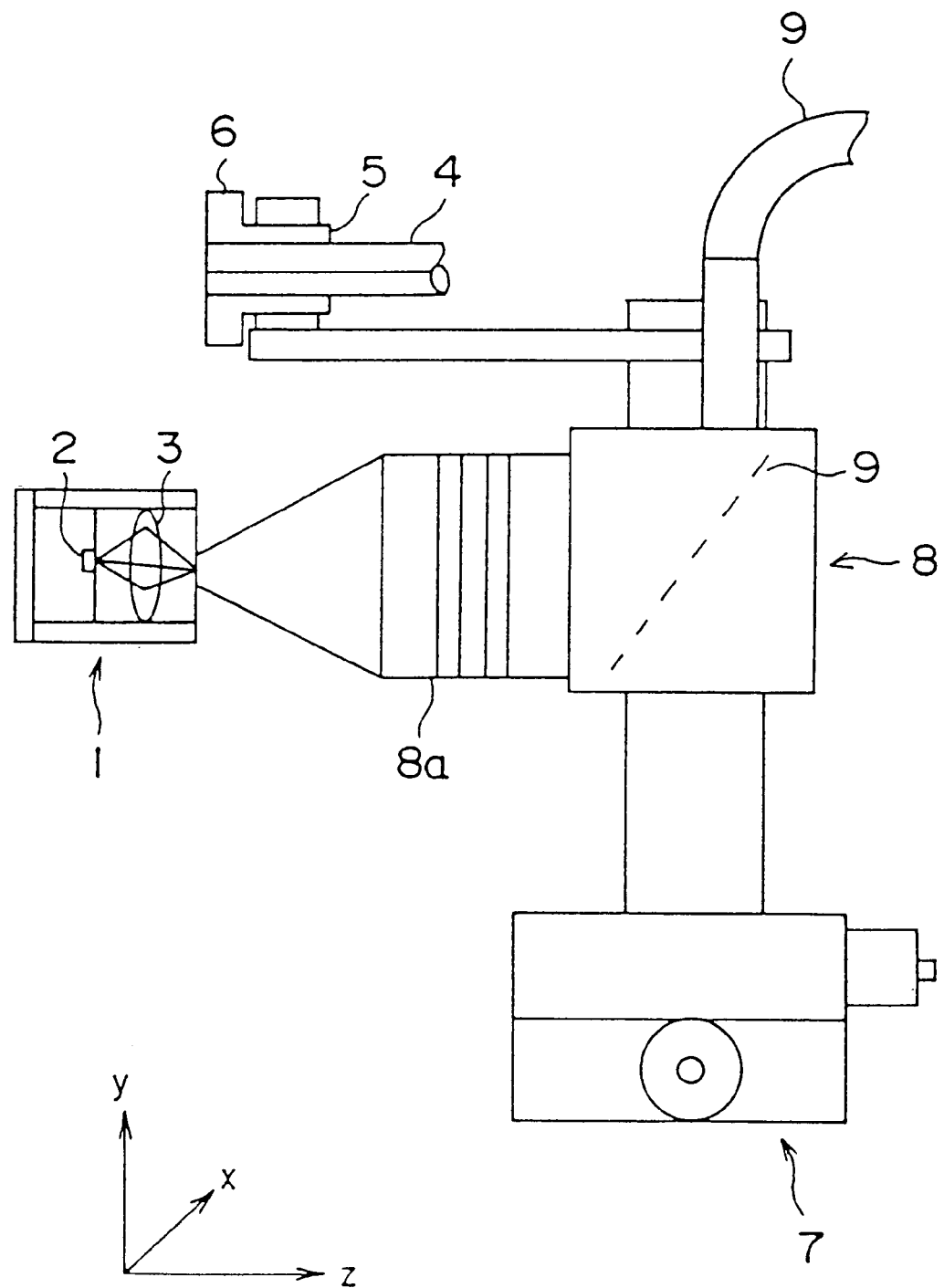
FIG. 2 is a diagram explaining the principle of the present invention.

FIG. 2 shows the principle of the present invention, wherein those parts common to the corresponding parts of FIG. 1 are designated by the same reference numerals and the description thereof will be omitted.

Referring to FIG. 2, the present invention acquires an image of the optical surface or luminous surface of the laser diode 2 of the optical module 1 as viewed over the lens 3, by a camera 8 that is held on the triaxial stage 7, prior to coupling and connecting the optical fiber 4 to the optical module 1. For this purpose, an external illumination beam is supplied to the camera 8 via an optical fiber 9, wherein it is preferable that the illumination beam has a wavelength generally close to or coincident to the wavelength of the output optical beam of the laser diode 2. The illumination beam thus supplied is reflected by a beam splitter 9a provided in the camera 8 and is focused upon the optical surface of the laser diode 2 from which the output optical beam is emitted, via an imaging optical system 8a of the camera 8 and further via a lens 3 that forms a part of the optical module.

The image of the optical surface of the laser diode 2 thus acquired by the camera 8 is then forwarded to an image processing system not shown in FIG. 2, and the position of the optical surface as viewed over the lens 3 is obtained thereby. It should be noted that the position of the optical surface as viewed over the lens 3 coincides to the position in which the efficiency of injection of the output optical beam of the laser diode 2 into the optical fiber 4 becomes maximum. Thus, one can easily and positively achieve injection of the optical beam of the laser diode 2, by driving the triaxial stage 7 such that the edge surface of the optical fiber 4 coincides to the position of the optical surface of the laser diode 2 as viewed over the lens 3. Thereby, one can achieve a coarse optical coupling between the optical module 1 and the optical fiber 4 by picturing the optical surface of the laser diode 2 over the lens 3 by the camera 8.

After such a coarse optical coupling is achieved as such, the stage 7 is driven in minute incremental amounts while monitoring the intensity of the optical beam of the laser diode 2 at the other end of the optical fiber 4, such that the optical coupling is optimized. In such an optimization process, the injection of the optical beam of the laser diode 2 into the optical fiber 4 is guaranteed by the coarse optical coupling process conducted by using the camera 8. Thereby, the efficiency of adjustment is improved substantially and hence promotes an increase of production.

First Embodiment

Figure 3:
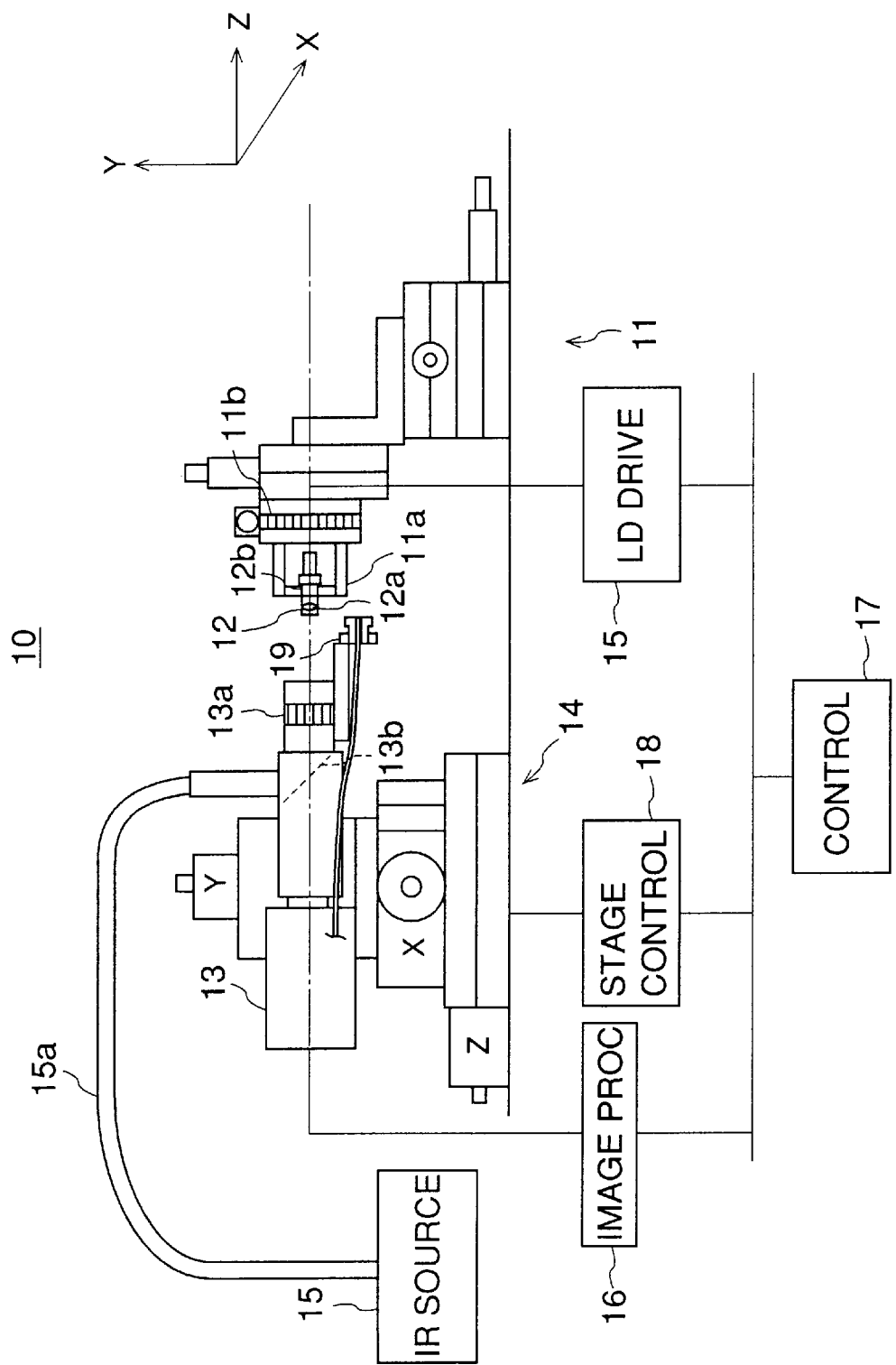
FIG. 3 is a diagram showing the construction of a production rig used for assembling an optical module assembly according to a first embodiment of the present invention.

FIG. 3 shows the construction of a production rig 10 of an optical module assembly according to a first embodiment of the present invention.

Referring to FIG. 3, the production rig 10 includes a first xyz-stage 11 carrying an LD assembly 12 in which a laser diode and a lens are integrated with each other, and a second xyz-stage 14 carrying an infrared camera 13, wherein the second xyz-stage 14 carries the infrared camera 13 such that the camera 13 faces the foregoing LD assembly 12. More specifically, the LD assembly 12 is held on a rotatable Θ-stage 11b provided on the xyz-stage 11 via a chuck mechanism 11a, in a state such that an optical axis of the LD assembly 12 generally coincides to the rotational axis of the Θ-stage 11b. On the other hand, the infrared camera 13 includes an imaging optical system 13a for picturing the image of the optical surface of the laser diode 12b in the state that the LD assembly 12 is held on the chuck mechanism 11a, over a lens 12a that forms a part of the LD assembly 12. It should be noted that the foregoing optical system 13a includes a semi-transparent mirror 13b that introduces an infrared beam supplied thereto from an external infrared source 15 via an optical fiber 15a such that the infrared beam travels parallel to the optical axis of the imaging optical system 13a and illuminates the optical surface of the laser diode.

The infrared camera 13 produces an output to an image processing unit 16, wherein the image processing unit 16 recovers the image of the optical surface of the laser diode 12b acquired over the lens 12a of the LD assembly 12. The image of the optical surface thus recovered is then forwarded to a control unit 17, which may be a computer, wherein the control unit 17 evaluates a coarse optimum position of an optical fiber 19 to be coupled to the LD assembly 12. Thereby, the control unit 17 controls the stage 14 via a triaxial controller 18 such that the optical fiber 19, which is carried by the xyz-stage 14, is positioned to the foregoing coarse optimum position.

In the foregoing step of obtaining the coarse optimum position of the optical fiber 19, it will be noted that not only the x- and y-coordinates of the optimum position is obtained but also the z-coordinate, wherein the z-coordinate is obtained by carrying out an automatic focusing process by the camera 13. The automatic focusing process may be conducted such that the contrast of a bright spot on the optical surface with respect to the dark spot also on the optical surface becomes maximum. The x-, y- and z-coordinates of the optimum position thus obtained are memorized in the control unit 17 as the foregoing coarse optimum position.

Next, the laser diode 12b in the LD assembly 12 is energized, and a fine adjustment is carried out for each of the x-, y- and z-axes of the stage 14 while observing the intensity of the optical beam emitted from the optical surface of the laser diode 12b at the other end of the optical fiber 19. After such a fine adjustment, the optical fiber 19 and the LD assembly 12 are welded so that maximum efficiency of optical coupling is obtained. The details of welding will be explained later in relation to other embodiments.

In the construction of FIG. 3, it should be noted that the infrared source 15 produces an infrared beam with a wavelength substantially identical to the wavelength of the optical beam produced by the laser diode 12b. In this case, the coarse optimum position thus obtained can be used as the coarse optimum position of the optical fiber 19 as it is, without applying any corrections thereto.

In the construction of FIG. 3, it is also possible to use a monochromatic optical beam of visible wavelength in place of the infrared optical beam. By illuminating the optical surface of the laser diode 12b by such a visible beam, one can readily acquire a clear image of the optical surface even in a case where the laser diode 12 absorbs infrared radiation. In this case, however, it is necessary to apply a compensation to the coarse optimum position thus obtained for compensating for the effect of chromatic aberration that arises because of the difference in the wavelength between the optical beam of the laser diode and the optical beam used for the illumination. Such a shift of the optimum position is calculated by the control unit 17, and the stage 14 is controlled, based upon such a shift, such that the optical fiber 19 is moved to the coarse optimum position in which the effect of the chromatic aberration is compensated.

In the construction of FIG. 3, the image acquired by the camera 13 generally has a resolution of 640×480 picture elements. Thus, the imaging optical system 13a can cover an area of 0.64 mm×0.48 mm, provided that the magnification thereof is set such that 1 picture element has a size of approximately 1 μm for each edge. This, on the other hand, means that the camera 13 covers an area substantially exceeding the area of the core of the optical fiber 19. Further, the recognition of the position of the LD assembly 12 can be achieved within the accuracy of 1 sec. As a result, it is possible to position the optical fiber 19 within an error of 5 μm with respect to the true optimum position, based upon the image acquired by the camera 13. Thereby, an efficient assembling of the optical module becomes possible.

Figure 4:
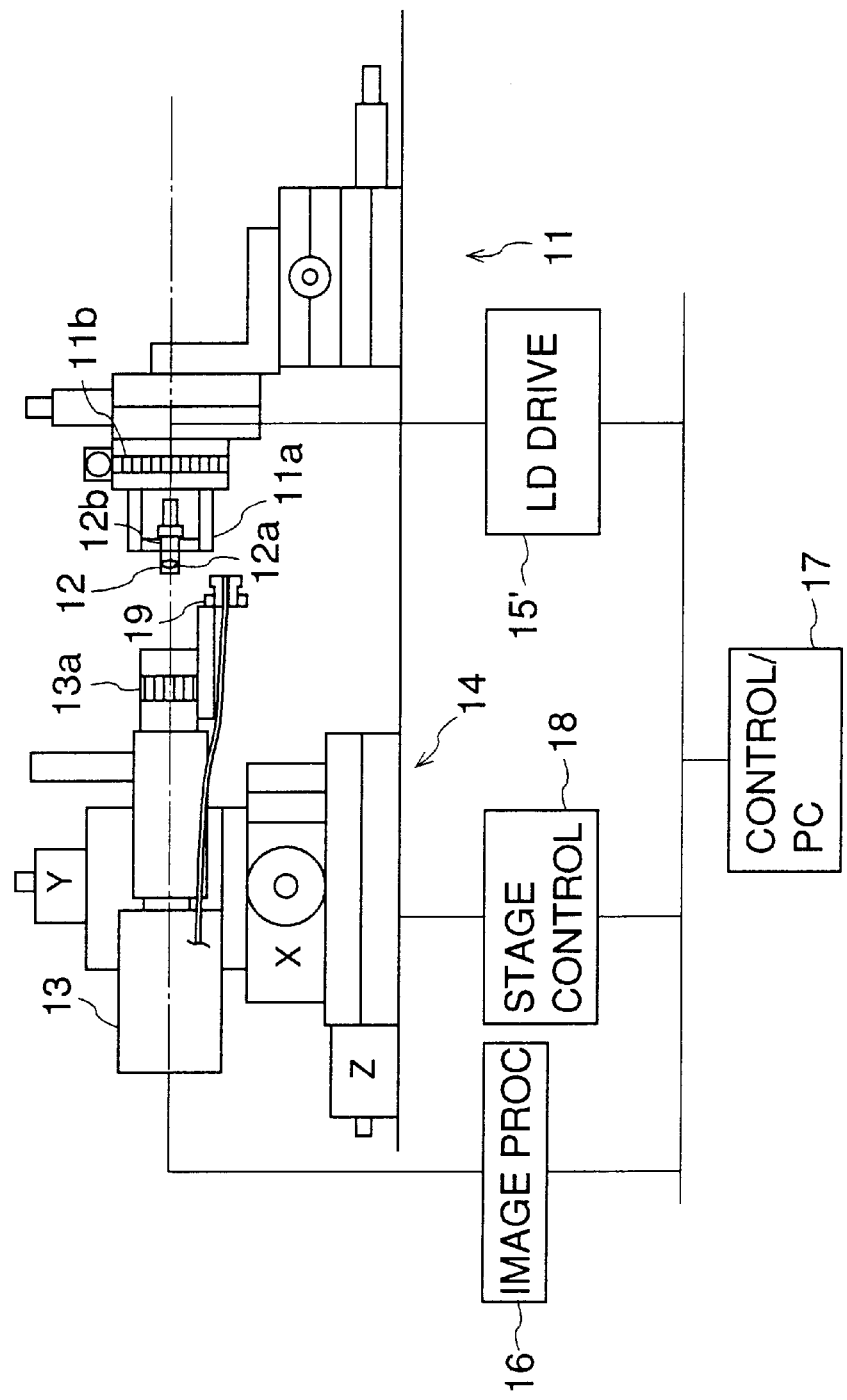
FIG. 4 is a diagram showing the construction of another production rig for assembling the optical module assembly of the first embodiment.

FIG. 4 shows a modification of the construction of FIG. 3, wherein those parts described previously are designated by the same reference numerals and the description thereof will be omitted.

In the construction of FIG. 4, it will be noted that the optical source 15 is eliminated. Thus, the construction of FIG. 4 uses a driving power source 15' for driving the laser diode 12b such that the laser diode 12b produces an output optical beam from the optical surface thereof, wherein the camera 13 pictures the optical surface thus emitting the optical beam, over the lens 12a. Thereby, the foregoing procedures for obtaining the coarse optimum position are carried out based upon the image thus acquired by the camera 13.

Second Embodiment

Figure 5:
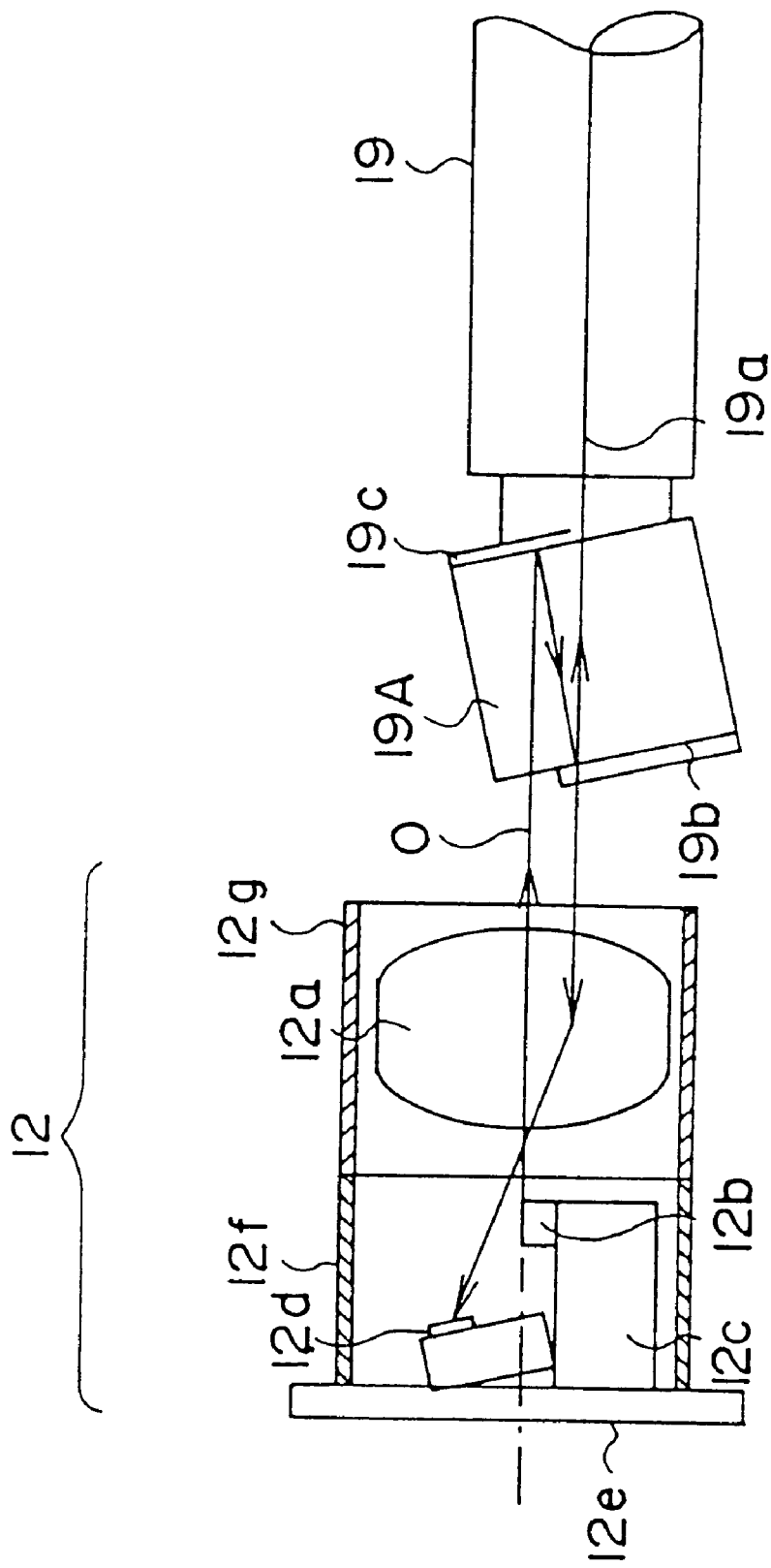
FIG. 5 is a diagram explaining an assembling process of an optical module according to a second embodiment of the present invention.
Figure 6:
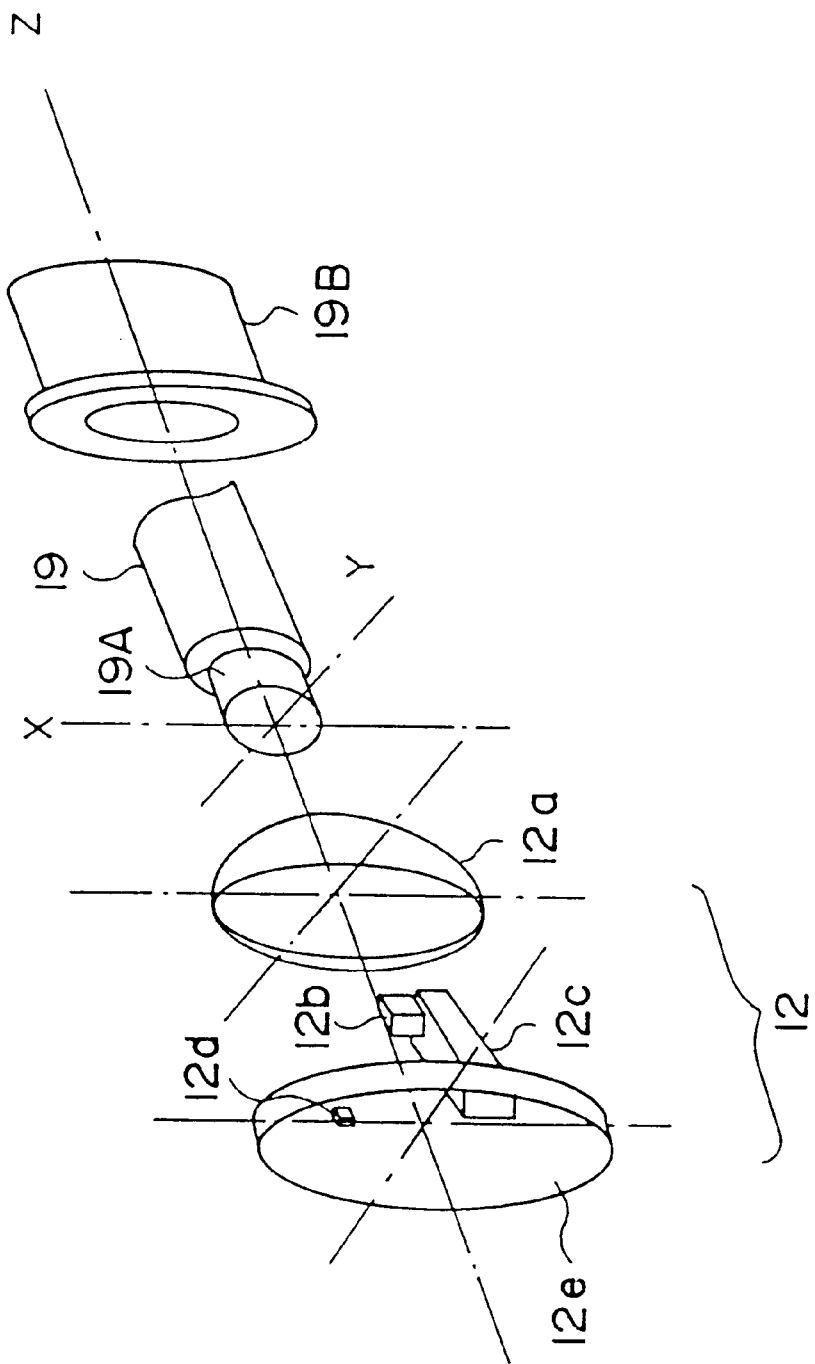
FIG. 6 is another diagram showing the assembling process of the optical module according to the second embodiment of the present invention.

FIG. 5 shows an ideal optical coupling achieved between the LD assembly 12 including the lens 12a held in a lens case 12g, and the optical fiber 19.

Referring to FIG. 5, an LD element forms a part of the LD assembly 12 and includes a substrate 12e and a case 12f provided on the substrate 12e as a part thereof, wherein the substrate 12e carries an arm 12c thereon and the laser diode 12b is provided on a tip end of the arm 12c. Further, the LD element includes a photodiode 12d on the substrate 12e, and the lens 12a held in the case 12g is mounted upon the LD element having such a construction, as noted already.

Thereby, the LD element and the lens 12a are adjusted such that the laser diode 12b is held at a position slightly offset from an optical axis O of the lens 12a and emits an optical beam such that the optical beam travels parallel to the optical axis O.

On the other hand, the optical fiber 19 is disposed such that a core 19a of the optical fiber 19 is located with an offset from the optical axis O of the lens 12a and carries a prism 19A at the end that faces the LD assembly 12. The prism 19A, in turn, carries a semi-transparent mirror 19b and a full-reflection mirror 19c at two opposing surfaces, such that the optical beam emitted from the laser diode 12b along the optical axis O is reflected first by the mirror 19c. After reflection by the mirror 19c, the optical beam is reflected further by the half-mirror 19b and is passed into the core 19a of the optical fiber 19.

The optical beam exiting from the core 19a of the optical fiber 19, on the other hand, is passed through the half mirror 19b and is focused upon the photodiode 12d by the lens 12a.

When assembling an optical module having such a construction, it is necessary to achieve alignment between the lens 12a and the substrate 12e, which substrate carries thereon the laser diode 12b and the photodiode 12d, and between the optical fiber 19 and the LD assembly 12 formed of the foregoing substrate 12e and the lens 12a. In such an alignment process, it is necessary to rotate the substrate 12e about the optical axis O and hence the z-axis. Further, it is necessary to rotate the prism 19A about the optical axis O. In addition, it is necessary to translate the lens 12a in the x-y plane in two axial directions, and it is further necessary to translate the prism 19A and hence the optical fiber 19 in the x-y-z space in three axial directions. In all, the adjustment has to be made about seven axes. On the other hand, there is no freedom of adjustment in the z-direction between the lens 12a and the substrate 12e, as the lens 12a is in an abutting engagement with the substrate 12e via the lens case 12g and the case 12f.

Conventionally, such an adjustment of the optical system has been achieved by observing the optical beam emitted from the laser diode 12b at the other end of the optical fiber 19. Such an adjustment process takes a substantial time in view of the necessity of adjustment for each of the seven axes. Further, before conducting such an adjustment at all, one has to direct the output optical beam of the laser diode 12b into the core 19a of the optical fiber 19. It has been hitherto difficult to conduct such a coarse adjustment.

In the second embodiment of the present invention, the foregoing adjustment is achieved much easier. It should be noted that the process of the second embodiment is carried out by a production rig to be explained later with reference to FIG. 12, while the production rig of FIG. 12 has a construction generally similar to that of the production rig of FIG. 3.

The first step of the adjustment is a preliminary rotational adjustment.

Figure 7:
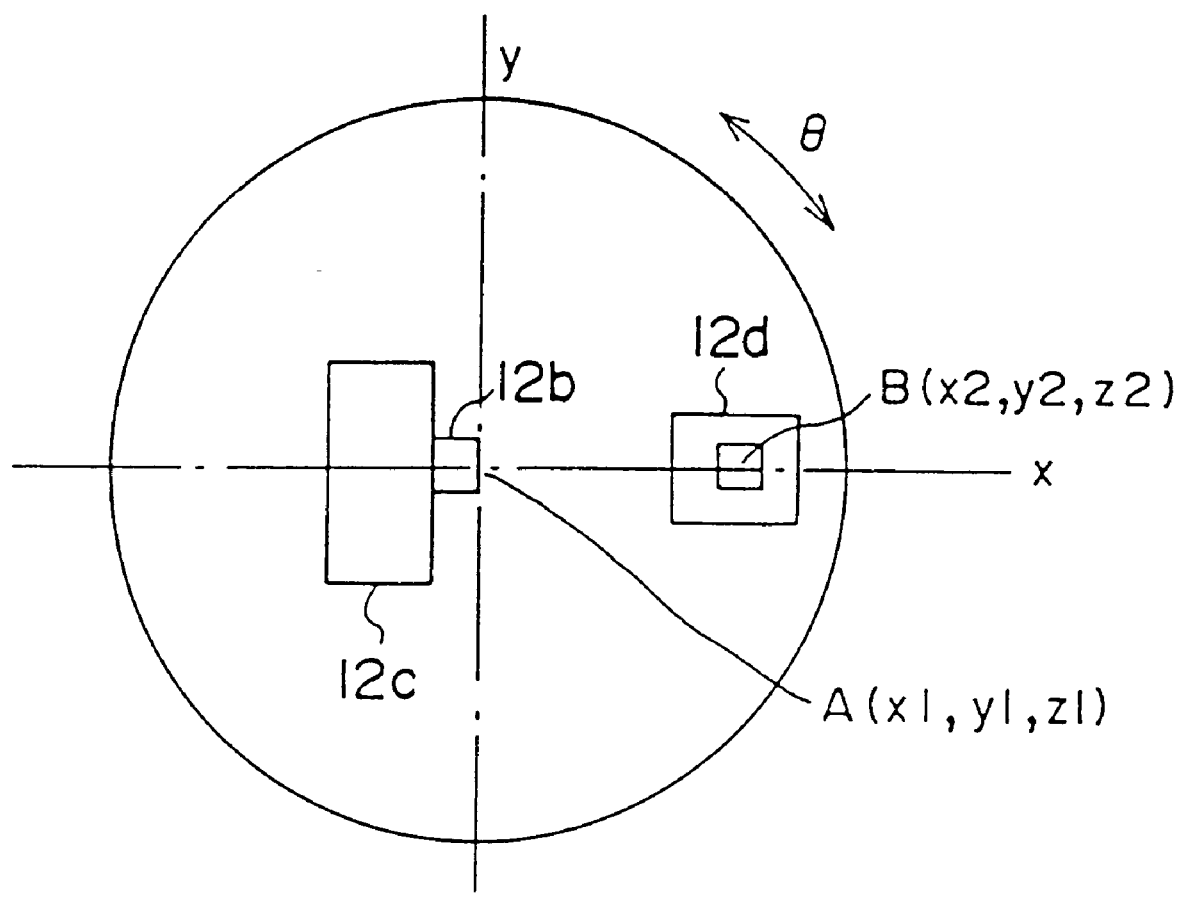
FIG. 7 is a still other diagram showing the assembling process of the optical module according to the second embodiment of the present invention.

Referring to FIG. 7, the laser diode 12b and the photodiode 12d are illuminated by an illumination beam for acquiring an image that includes the optical surface of the laser diode 12b as well as the optical surface of the photodiode 12d. Further, the coordinate $(x_1, y_1, z_1)$ of a luminous point A in the optical surface of the laser diode 12b as well as the coordinate $(x_2, y_2, z_2)$ of a center B of the optical surface of the photodiode 12d, are obtained from the image thus acquired by the camera 13. Based upon the coordinates thus obtained, the substrate 12e is rotated about the z-axis such that the luminous point A $(x_1, y_1, z_1)$ of the laser diode 12b and the center B $(x_2, y_2, z_2)$ of the photodiode 12d are aligned on the same y-plane. Thereby, the rotation is made such that $y_1=y_2$, and the points A and B are located on the common x-z plane.

The next step is the coarse adjustment of the y-position.

In the steps of FIGS. 8A and 8B, the infrared camera 13 is used for picturing the image of the laser diode 12b over the lens 12a, and the coordinate $(x_3, y_3, z_3)$ of an imagery point C of the laser diode 12b is determined as the position of the image thus acquired. It should be noted that FIG. 8A shows a cross section of the LD assembly 12 taken along the x-z plane, while FIG. 8B shows a cross section of the same LD assembly 12 taken along the y-z plane. As indicated in FIGS. 8A and 8B, the lens 12a is adjusted such that the x- and y- coordinates of the position A $(x_1, y_1, z_1)$ of the laser diode coincide with the x- and y-coordinates of the imagery point C $(x_3, y_3, z_3)$ of the laser diode $(x_1=x_3, y_1=y_3)$.

As a result of such translational adjustments and rotational adjustments, it will be noted that each of the laser diode, photodiode, the lens center and the imagery point of the laser diode coincide with each other with respect to the y-coordinates. In other words, all of these five elements are aligned on a common x-z plane. Thereby, it is guaranteed that the movement of the lens 12a in the x-direction does not affect the y-coordinate of the laser diode image or the y-coordinate of the photodiode image and no change occurs in the y-coordinate, as long as such a movement of the lens is made after the foregoing adjustment. In other words, it is possible to carry out the positional adjustment of the lens in the x-direction independently to the adjustment in the y-direction.

The final step is the coarse adjustment of the lens in the x-direction.

Figure 9:
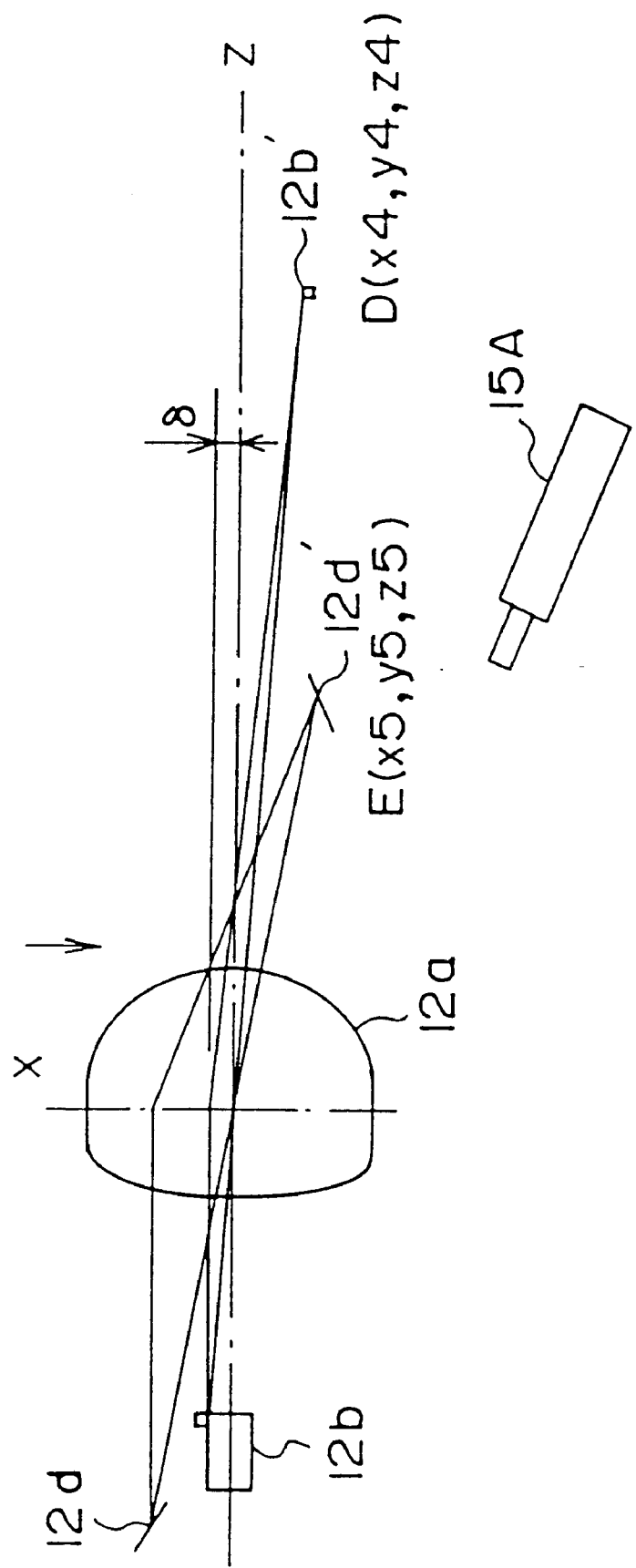
FIG. 9 is another diagram showing a step of the assembling process of the optical module according to the second embodiment of the present invention.

In the step of FIG. 9, the lens 12a is moved in the x-direction as indicated by an arrow with a distance δ and the position D $(x_4, y_4, z_4)$ of an image 12b' of the laser diode 12b as viewed over the lens 12a as well as the position E $(x_5, y_5, z_5)$ of an image 12d' of the photodiode 12d as viewed over the lens 12a, are obtained from the image acquired by the camera 13. Thereby, a coaxial illumination is employed for illuminating the optical surface of the laser diode 12b and the optical surface of the photodiode 12d, wherein such a coaxial illumination is formed by using the infrared source 15 in combination with the optical fiber 15a for guiding the infrared beam produced by the infrared source 15 and further by using the beam splitter 13b for deflecting the infrared beam thus supplied along the optical fiber 15a, wherein the beam splitter 13b produces an infrared optical beam traveling coaxially to the optical axis of the optical system of the camera 13. In the case where the offset of the photodiode from the optical axis is large and the coaxial illumination is not sufficient, one may use a separate, oblique illumination 15a or an illumination mask to be described later in detail.

Figure 10:
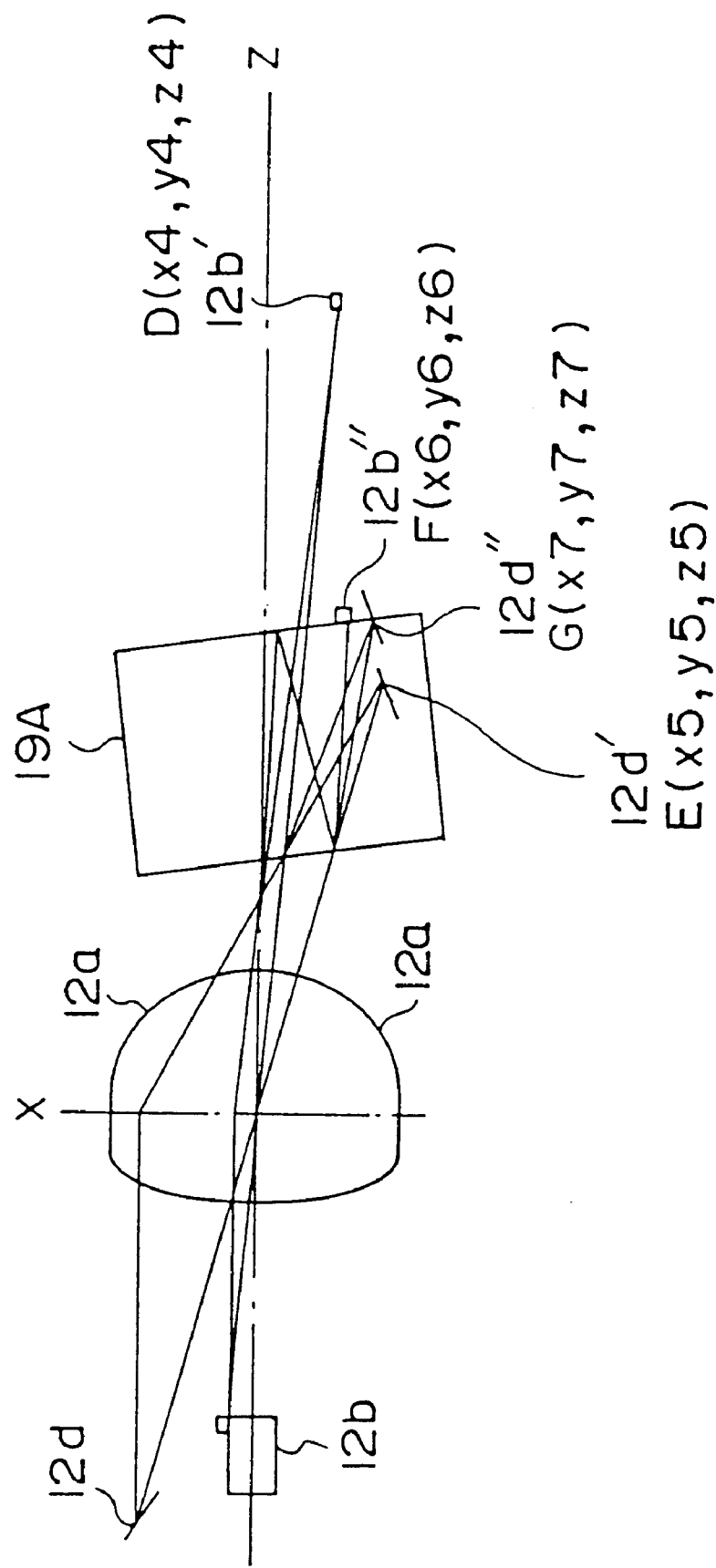
FIG. 10 is a still other diagram showing a step of the assembling process of the optical module according to the second embodiment of the present invention.

Next, in the step of FIG. 10, a geometrical calculation is made for a position F ($x_6$, $y_6$, $z_6$) at which an image 12b" of the laser diode 12b is formed in the state that the prism 19A is provided at an end of the optical fiber 19, based upon the foregoing position D. Similarly, a calculation is made for a position G ($x_7$, $y_7$, $z_7$) in which an image 12d" of the photodiode 12d is formed for the state where the prism 19A is provided at the end of the optical fiber 19, based upon the foregoing position E. Further, the offset δ of the lens 12a in the x-direction is adjusted such that the foregoing position F and the foregoing position G coincide with each other ($x_6=x_7$, $y_6=y_7$).

Figure 11A:
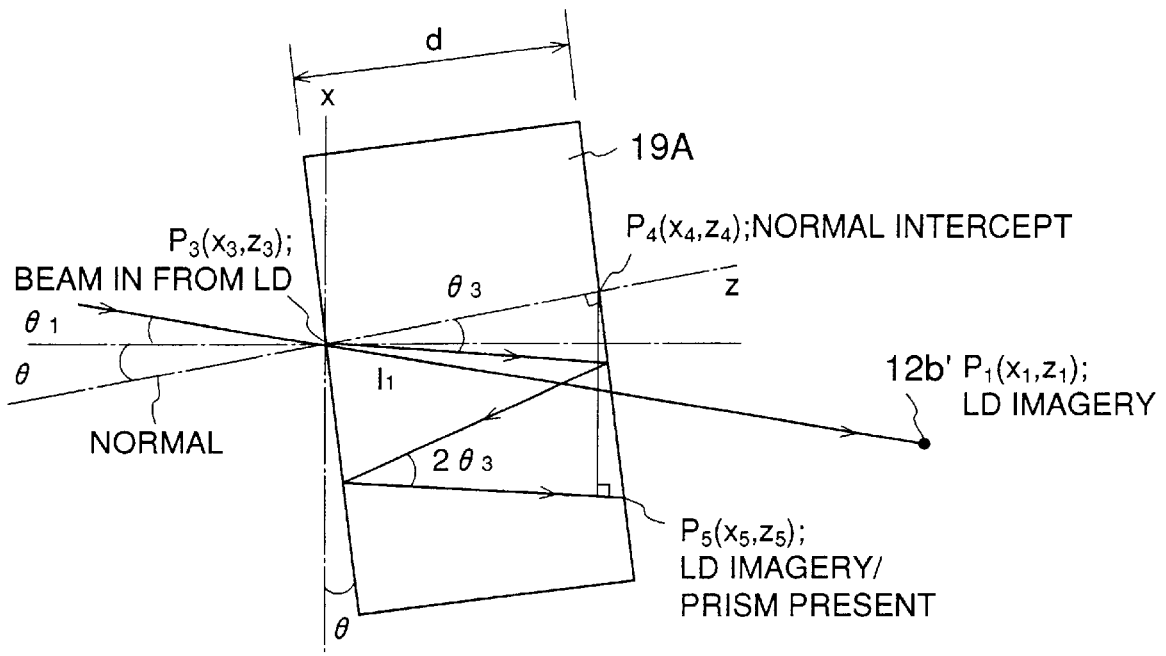
FIGS. 11A and 11B are diagrams showing the examples of corrections carried out in the assembling process of the optical module according to the second embodiment of the present invention.

FIG. 11A is a diagram explaining the foregoing calculation for obtaining an imagery position $P_5$ ($x_5$, $y_5$) of the image 12b" of the laser diode 12b for the case in which the prism 19A is provided, based upon an imagery position $P_1$ ($x_1$, $z_1$) of the image 12b' of the laser diode 12b. It should be noted that FIG. 11A shows the optical path conversion occurring in the x-z plane for the optical beam emitted from the laser diode 12b. In the explanation below, the y-axis will be omitted, as all the points in FIG. 11A have a common y-coordinate.

Referring to FIG. 11A, the prism 19A has a refractive index n and a length d, and is provided with an inclination angle Θ with respect to the z-axis. Thereby, the following relationship holds for an optical beam that is emitted from the laser diode 12b and is incident with an angle of $Θ_1$ with respect to the z-axis in the x-z plane:

$$\sin(Θ_1+Θ)=n\times\sin Θ_3,$$

hence $$Θ_3=\sin^{-1}(\sin(Θ_1+Θ)/n), \text{ and}$$

$$l_1\times\cos Θ_3=d,$$

hence $$l_1=d/\cos Θ_3,$$

wherein the angle $Θ_1$ may be assumed to be a general value of 4° in view of the fact that the angle $Θ_1$ does not affect the imagery position $P_5$. It should be noted that an object and an image of the object correspond to each other in a one-to-one relationship, and this relationship is not affected by the inclination of rays between the object and the image.

Thus, the optical path length $lz_2$ of the optical beam in the prism 19A in the z-direction is given by:

$$lz_2=(3\times d\times\cos(Θ_3-Θ))/(n\times\cos Θ_3),$$

and the coordinate ($x_3$, $z_3$) of a point $P_3$ where the optical beam is incident to the prism 19A, the coordinate ($x_4$, $z_4$) of a point $P_4$ where a hypothetical normal drawn from the point $P_3$ intersects the exit side of the prism 19A, and the coordinate ($x_5$, $y_5$) of the imagery position $P_5$ of the optical beam via the prism 19A is given as follows:

$$x_3=x_1-lz_2\times\tan Θ$$

$$z_3=z_1-lz_2$$

$$x_4=x_3-d\times\sin Θ$$

$$z_4=z_3-d\times\sin Θ$$

$$x_5=x_4+3\times l_1\times\sin Θ_3\times\cos Θ$$

$$z_5=z_4+3\times l_1\times\sin Θ_3\times\sin Θ$$

wherein the imagery point $P_5$ corresponds to the imagery point 12b".

On the other hand, the imagery point $P_7$ of the image 12d" of the photodiode 12d for the case where the prism 19A is provided, is obtained as follows.

Figure 11B:
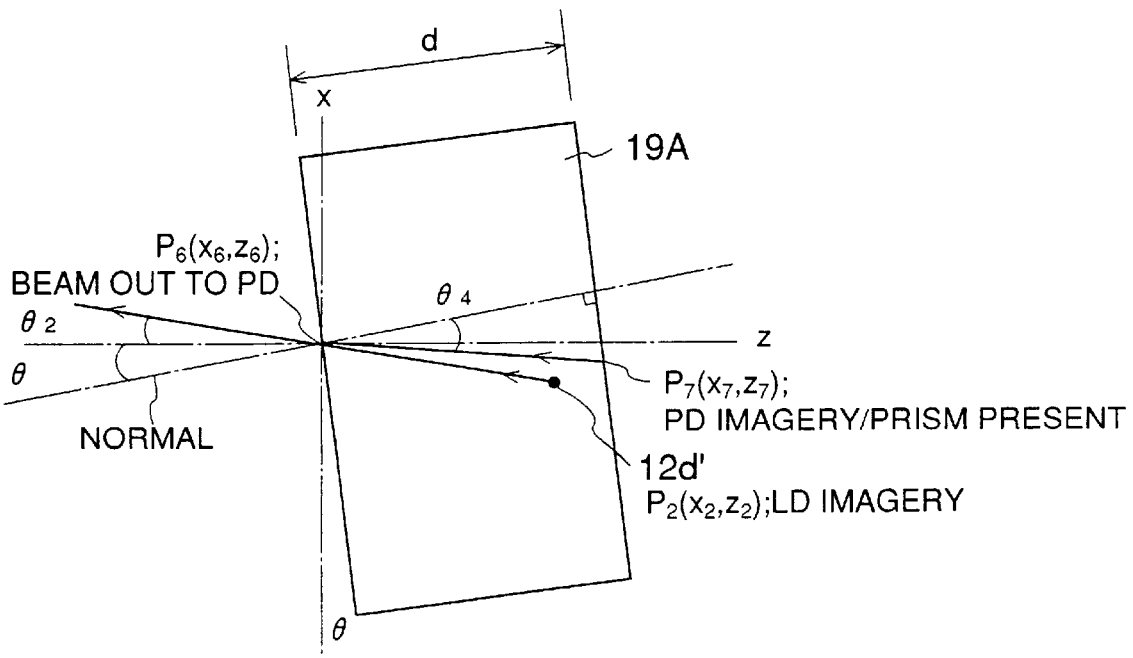

Designating the position of the image 12d' of the photodiode for the case in which the prism 19A is eliminated, by a position $P_2$ ($x_2$, $z_2$), it will be understood from FIG. 11B that the following relationship holds for the optical beam emitted from the prism 19A toward the photodiode 12d with an angle Θ with respect to the z-axis:

$$\sin(Θ_2+Θ)=n\times\sin Θ_4,$$

hence $$Θ_4=\sin^{-1}(\sin(Θ_2+Θ)/n), \text{ and}$$

$$l_3\times\cos Θ_4=d,$$

hence $$l_3=d/\cos Θ_4.$$

Here, the angle $Θ_2$ does not affect the imagery position $P_7$, which position $P_7$ being for the case where the prism is provided. Thus a general value of 4° is assumed for the angle $Θ_2$. Again, it should be noted that an object and an image of the object correspond to each other in a one-to-one relationship, and this relationship is not affected by the inclination of the rays between the object and the image. The foregoing relationship indicates that the angle $Θ_4$ is determined once the angle $Θ_2$ and the prism inclination Θ are determined.

Thus, the optical path length of the optical beam in the z-direction in the prism 19A is given as $$lz_{3\ l}=(d\times\cos(Θ_4-Θ))/(n\times\cos Θ_3),$$

and the coordinate of the point $P_6$ at which the optical beam exits from the prism 19A and the coordinate of the point $P_7$ at which the optical beam enters into the prism 19A, are given, in terms of the foregoing optical path length $lz_3$, as follows.

$$x_6=x_2-lz_3\times\tan Θ_2,$$

$$z_6=z_2-lz_3,$$

$$x_7=x_6+l_3\times\sin(Θ_4-Θ), \text{ and}$$

$$z_7=z_6+l_3\times\cos(Θ_4-Θ,$$

where $x_2$ and $z_2$ represent the x- and y-coordinates of the photodiode image 12d' as viewed over the lens 12a, respectively. It should be noted that the point $P_7$ corresponds to the imagery position 12d" of FIG. 10.

Further, by moving the lens 12a in the x-direction such that the points $P_5$ and $P_7$, in which the existence of the prism 19A is assumed, coincide with respective predetermined positions at the core edge of the optical fiber 19, the adjustment for the LD assembly 12 and the lens 12a is completed.

Next, a fine adjustment is made between the LD assembly 12 and the optical fiber 19.

In the fine adjustment between the LD assembly 12 and the optical fiber 19, the optical fiber 19 is moved slightly for an optimum optical coupling while maintaining the foregoing state, such that the intensity of the optical beam observed at the other end of the optical fiber 19 becomes maximum.

FIG. 12 shows the construction of an assembling rig used in the present embodiment, wherein those parts described previously are designated by the same reference numerals and the description thereof will be omitted.

In the apparatus of FIG. 12, the control unit 17 controls the xyz-stage 11 via a stage controller 11A, wherein the stage 11 carries thereon the Θ-stage 11b and the chuck mechanism 11a which holds the substrate 12e that carries thereon the laser diode 12b and the photodiode 12d.

In the present embodiment, the lens 12a is held separately from the laser diode 12b or the photodiode 12d, on an x-y-stage 20 that is controlled by the control unit 17 via a stage controller 20A, such that the lens 12a is movable in the x-y plane. In other words, the present embodiment carries out the optical alignment of the lens 12a with respect to the laser diode 12b or the photodiode 12d and the optical alignment between the optical module 12, in which the laser diode 12b, the photodiode 12d and the lens 12a are integrated, and the optical fiber 19 that carries the prism 19A at the end thereof, separately and independently.

Figure 13:
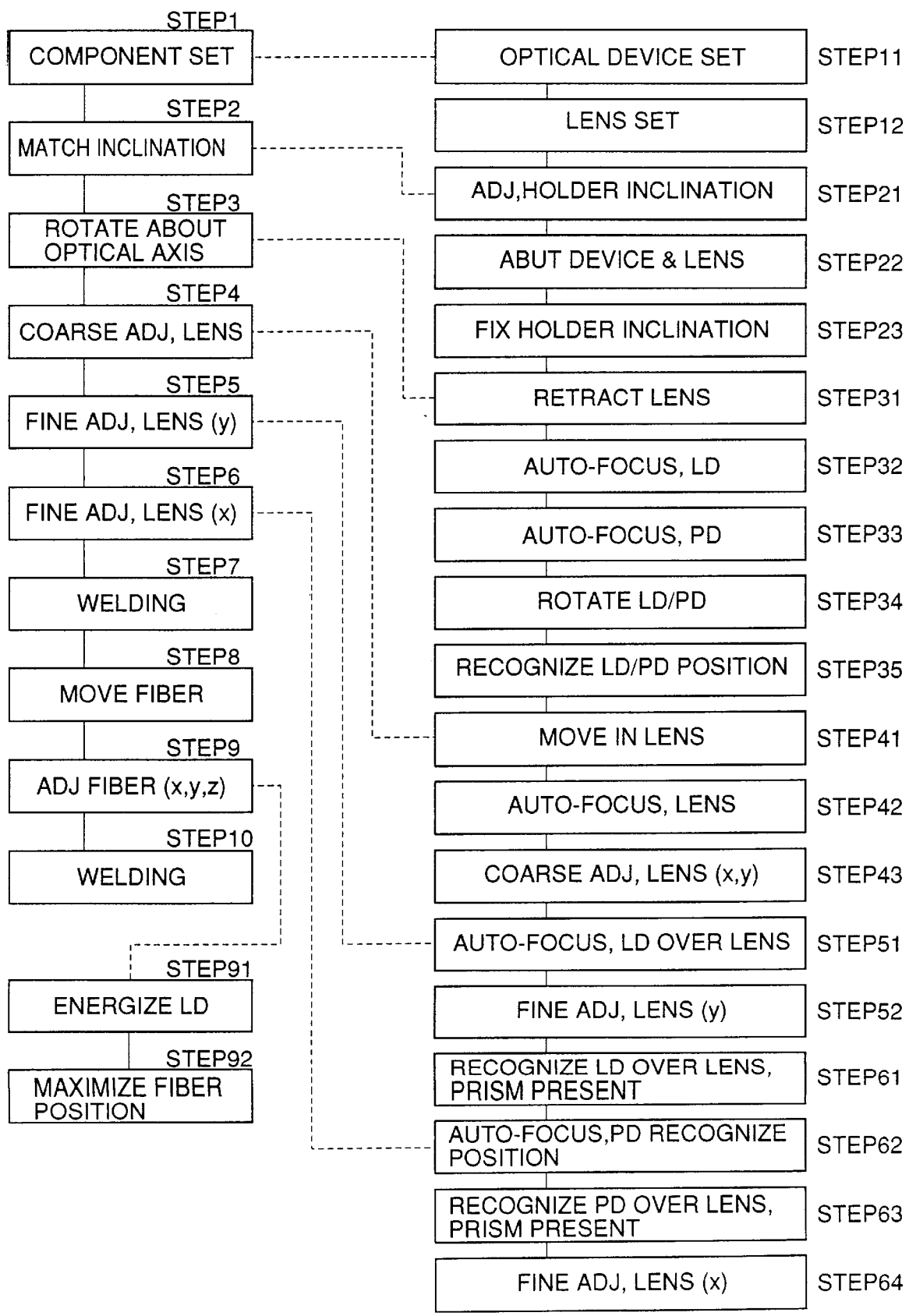
FIG. 13 is a flowchart explaining the process of assembling of the optical module carried out in the production rig of FIG. 12.

FIG. 13 shows the process steps described above and conducted by the rig of FIG. 12 in the form of a flowchart.

Referring to FIG. 13, the assembling process generally includes: a step 1 in which the substrate 12e and the lens 12a are mounted upon respective stages; a step 2 for matching the inclination angles of the substrate 12e and the lens 12a; a step 3 for adjusting the rotational angle of the substrate 12e about the optical axis; a step 4 for coarse adjustment of the lens 12a; a step 5 for fine adjustment of the lens 12a in the y-direction; a step 6 for fine adjustment of the lens 12a in the x-direction; a step 7 for welding the case 12f of the LD element to the case 12g of the lens 12a to form the LD assembly 12; a step 8 for moving the optical fiber 19 to a predetermined position; a step 9 for adjusting the position of the optical fiber 19 such that the intensity of the optical beam in the optical fiber 19 becomes maximum; and a step 10 for welding the LD assembly to the optical fiber 19, wherein the step 1 includes a sub-step 11 for mounting the substrate 12e on the chuck mechanism 11a of the stage 11 and a sub-step 12 for mounting the lens 12a on a chuck mechanism of the stage 20.

The step 2, on the other hand, includes a sub-step 21 for activating a gimbal of the chuck mechanism 11a such that the inclination angle of the substrate 12e matches the inclination angle of the lens 12a, a sub-step 22 for causing the case 12g of the lens 12a to abut the case 12f of the LD element while maintaining the foregoing mating state such that the LD element and the lens 12a as a whole form a predetermined inclination angle, and a sub-step 23 for fixing the gimbal of the chuck mechanism 11a, which holds the substrate 12e thereon, in the adjusted state.

Further, the step 3 includes a sub-step 31 for taking the lens 12a out of the region in which the image acquisition is made by the camera 13, a sub-step 32 for conducting an automatic focusing of the camera 13 upon the laser diode 12b in the state that the lens 12a is removed, to obtain the coordinate $(x_1, y_1, z_1)$ of the point A shown in FIG. 7, a sub-step 33 for conducting an automatic focusing of the camera 13 upon the photodiode 12d in the state that the lens 12a is removed, to obtain the coordinate $(x_2, y_2, z_2)$ of the point B shown in FIG. 7, a sub-step 34 for rotating the substrate 12e until a hypothetical line connecting the points A and B becomes parallel to the x-z plane, and a sub-step 35 for recognizing the position of the points A and B after the rotation.

The step 4, on the other hand, includes a sub-step 41 for bringing the lens 12a again into the region in which the camera 13 carries out the image acquisition, a sub-step 42 for obtaining the lens position by an automatic focusing process of the camera 13 that uses the frame 12g of the lens 12a as a mark, and a sub-step 43 for coarsely aligning the lens 12a in the x-y plane by driving the stage 20 according to the lens position obtained in the previous sub-step 42. Further, the step 5 actually includes a sub-step 51 for obtaining the coordinate $(x_3, y_3, z_3)$ of the imagery position C by picturing the image 12b' of the laser diode 12b over the lens 12a and by conducting an automatic focusing process, and a sub-step 52 for adjusting the lens 12a in the y-direction with high precision.

Figure 14:
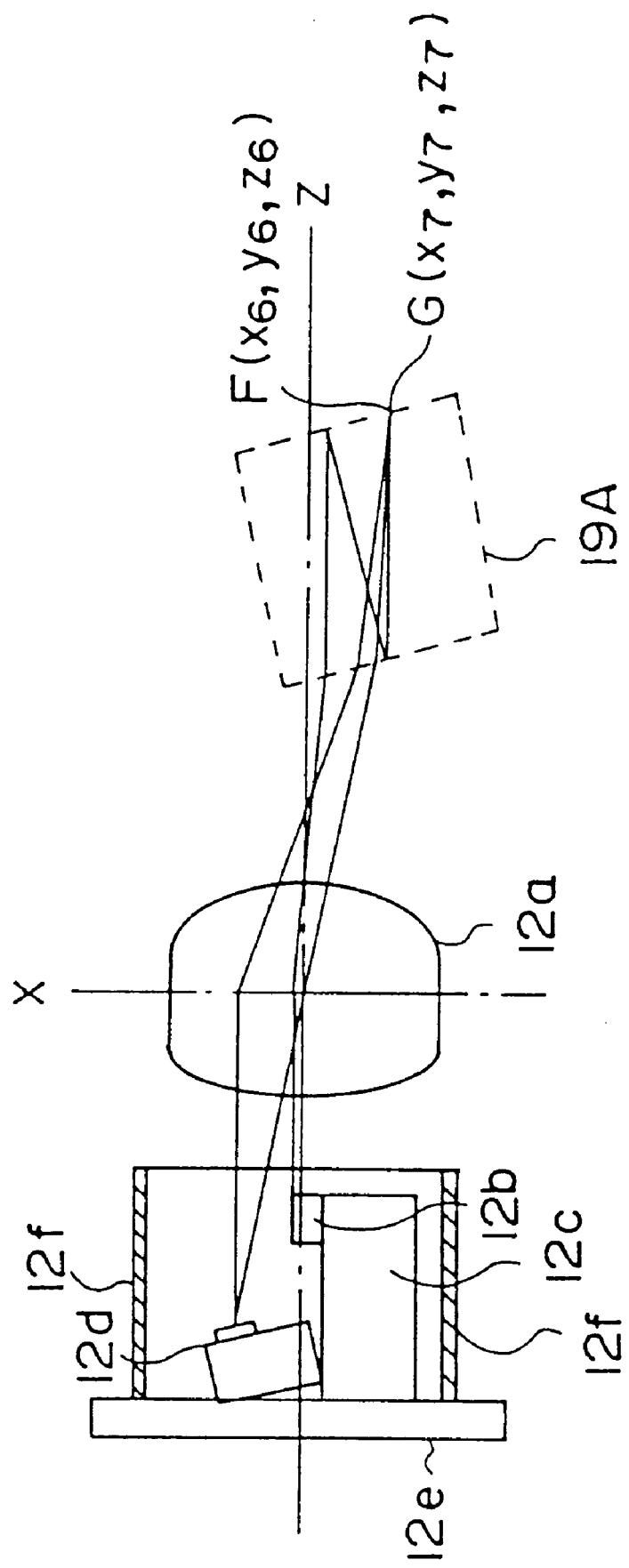
FIG. 14 is a diagram showing an ideal optical coupling achieved in the second embodiment of the present invention.

The step 6, in turn, includes: a sub-step 61 for moving the lens 12a along the x-axis to a position designed as being nominally optimum, in other words approximately optimum, in the state that the prism 19A is provided, acquiring the image 12b' of the laser diode 12b as viewed over the lens 12a by the camera 13 by conducting an automatic focusing process to obtain the coordinate $(x_4, y_4, z_4)$ of the position D from the image 12b' thus acquired, and further for acquiring the image 12b" of the laser diode 12b in the state in which the prism 19A is provided to obtain the coordinate $(x_6, y_6, z_6)$ of the position F from the image 12b" thus acquired; a sub-step 62 for acquiring the image 12d' of the photodiode 12d by the camera 13 over the lens 12a by conducting an automatic focusing process to obtain the coordinate $(x_5, y_5, z_5)$ of the position E from the image 12d' thus obtained; a sub-step 63 for calculating the coordinate $(x_7, y_7, z_7)$ of the position G of the image 12d". The position G corresponds to the state in which the prism 19A is provided, from the coordinate $(x_5, y_5, z_5)$ of the foregoing position E; and a sub-step 64 for driving the stage 20, based upon the coordinates of the positions F and G thus calculated, such that the lens 12a is moved in the x-direction by a minute amount. It should be noted that the foregoing position F corresponds to the position $P_5$ of FIG. 11A while the position G corresponds to the position $P_7$ of FIG. 11B. As a result of such an adjustment shown in FIG. 13, the position F agrees to the position G as indicated in FIG. 14.

Further, the step 7 includes a welding process for welding the case 12f of the LD element to the lens case 12g by means of a YAG welding unit 51 to form a unitary LD assembly 12. See FIG. 13. Further, the core edge of the optical fiber 19 is positioned in alignment with the foregoing position F and hence the position G in the step 8 for achieving an optical coupling between the laser diode 12b or the photodiode 12d in the LD assembly 12 and the core of the optical fiber 19. In this state, the step 9 is continued. As the step 9 includes a sub-step 91 for energizing the laser diode 12b for causing an emission of the optical beam therefrom, and a sub-step 92 for conducting a fine adjustment of the optical fiber position while observing the output optical beam of the laser diode 12b at the other end of the optical fiber. After the step 9, the LD assembly 12 and the optical fiber 19 are welded with each other by the YAG welding unit 51.

In the assembling process described heretofore with reference to the present embodiment, the optical coupling process between the laser diode 12b or the photodiode 12d and the lens 12a to form the LD assembly 12 is conducted independently to the optical coupling process between the LD assembly 12 thus formed and the optical fiber 19. This means that one may conduct both optical coupling processes in parallel by using two separate assembling rigs when producing the optical module assembly. Thereby, the efficiency of production of the optical module is improved substantially.

Third Embodiment

Figure 15:
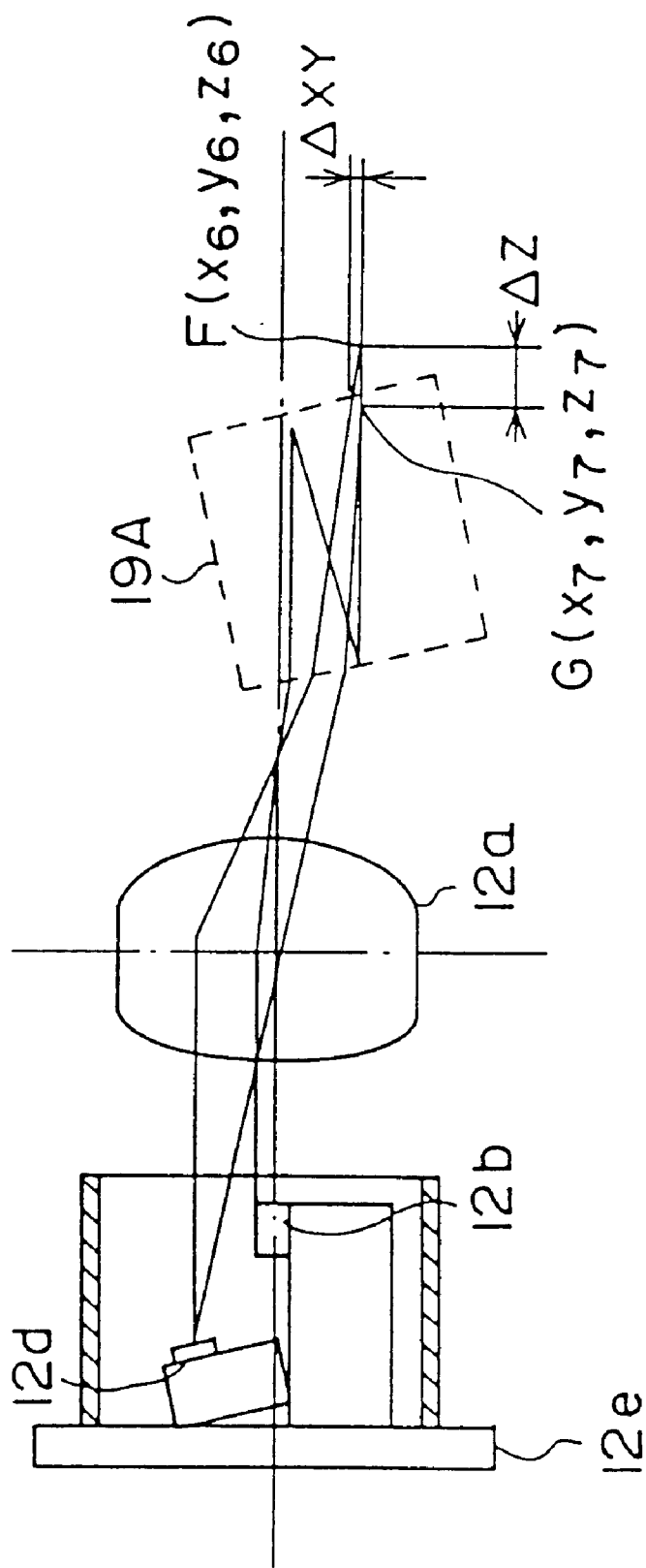
FIG. 15 is a diagram showing the necessity of correction of the optical coupling generally occurs when attempting the ideal optical coupling of FIG. 14.

In the LD assembly 12 thus obtained, the optimum position F may offset in the z-direction with respect to the position G as a result of the foregoing optimization as indicated in FIG. 15 when there are errors in any of the lens 12a, the prism 19A, the laser diode 12b, the photodiode 12d, the substrate 12e or the arm 12c that holds the photodiode 12d. When the position F offsets in the z-direction with respect to the position F as such, the x-coordinate of the position F offsets also with respect to the x-coordinate of the position G, and optical loss increases between the LD assembly 12 and the optical fiber 19 which has the prism 19A at the end thereof.

Hereinafter, a third embodiment of the present invention for minimizing such an optical loss will be described.

Figure 16A:
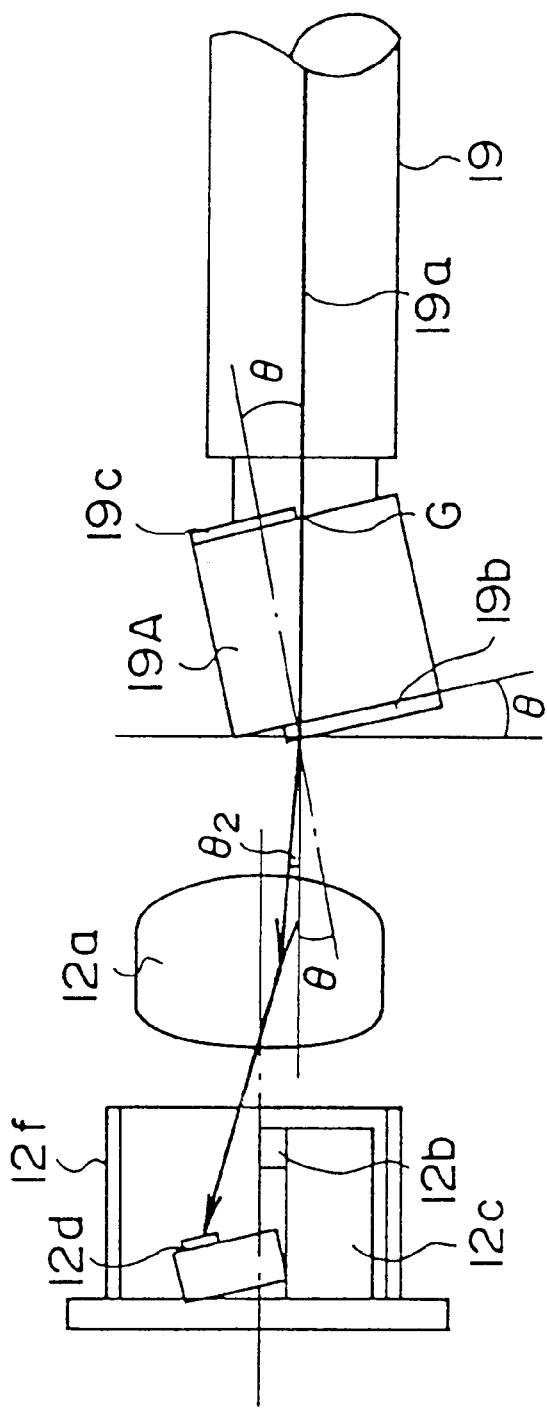
FIGS. 16A and 16B are diagrams showing a correction process according to a third embodiment of the present invention.

Referring to FIG. 16A showing an optical module formed of the LD assembly 12 and the optical fiber 19, it is assumed that the coordinate $(x_7, y_7, z_7)$ of the image 12b'' at the position G is offset by a distance $\Delta z$ in the z-direction to a position G' having a coordinate $(x_7', y_7', z_7')$. In this case, there holds the Snell's relationship as follows.

$$\sin(\Theta_2 + \Theta) = n \times \sin\Theta,$$

wherein n represents the refractive index of the prism 19A and $\Theta$ represents the inclination angle of the prism 19A as defined already.

Figure 16B:
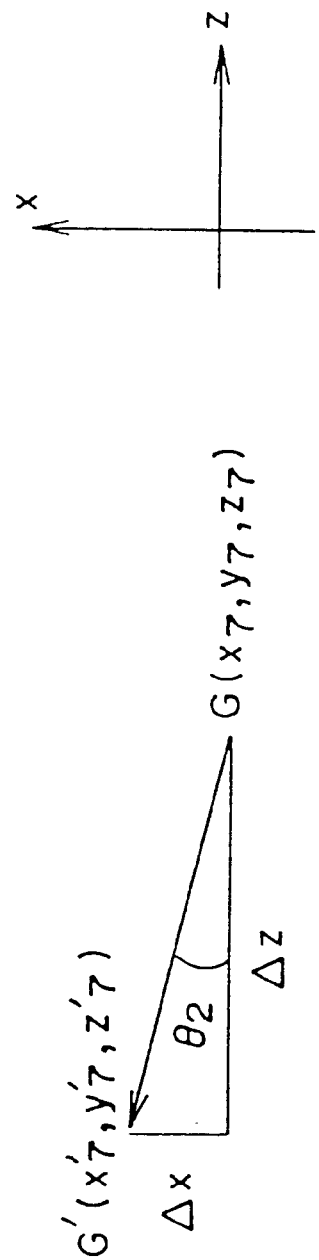

Further, in view of the geometrical relationship shown in FIG. 16B, it will be noted that the position G' is offset also in the x-direction by an amount represented as follows.

$$\Delta x = \Delta z \times \tan\Theta_2.$$

Thus, in view of the foregoing relationships, the actual position G' of the image 12b'' is given according to the equation $$x_7' = x_7 + \Delta x$$

$$y_7' = y_7$$

$$z_7' = z_7 + \Delta z.$$

In the present embodiment, the position of the lens 12a is adjusted, in view of the deviation $\Delta x$ in the x-direction associated with the deviation $\Delta z$ in the z-direction, such that the position F for the image 12b'' of the laser diode 12b and the position G for the image 12d'' of the photodiode 12d coincide with each other both in the x-direction and in the z-direction.

More specifically, the deviation between the position F and the position G in the z-direction is obtained according to the equation $$\Delta z = z_7 - z_6.$$

From above, the coordinate of the position G' is given as $$x_7' = x_7 + (\Delta z \times \tan\Theta_2)$$

$$y_7' = y_7$$

$$z_7' = z_7 + \Delta z.$$

Next, the deviation between the position G' and the position F in the x-direction is obtained according to the equation $$\Delta x = x_6 - x_7',$$

and the lens 12a is moved in the x-direction such that the foregoing parameter $\Delta x$ becomes zero. After the movement of the lens 12a as such, the lens 12a is fixed at the position where the parameter $\Delta x$ is zero.

According to the present embodiment, it is possible to achieve an optical coupling in a short time even when the components such as the lens 12a, the laser diode 12b, the photodiode 12d, and the like, are fabricated with a substantial precision tolerance.

Next, the assembling process of the optical module that uses a visible wavelength beam for illuminating the surface of the optical devices when conducting the coarse optical alignment will be described with reference to FIG. 2, wherein those parts described previously are designated by the same reference numerals and the description thereof will be omitted.

Figure 18:
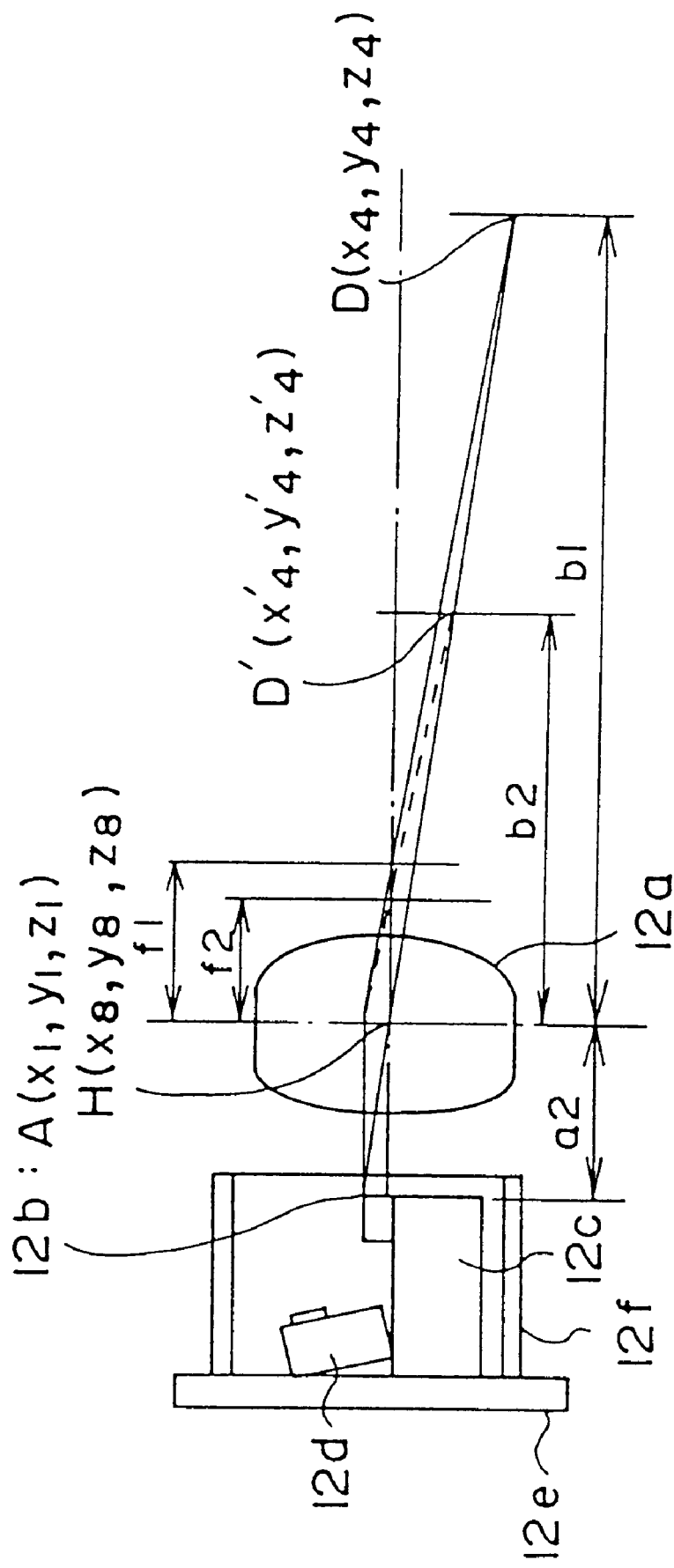
FIG. 18 is a diagram explaining the correction of wavelength according to the third embodiment of the present invention.

Referring to FIG. 18, it will be noted that the lens 12a has a center H located at the coordinate $(x_8, y_8, z_8)$ and has a first focal distance $f_1$ for the infrared beam having a wavelength corresponding to the optical beam emitted from the laser diode 12b. Further, the lens 12a has a second focal distance $f_2$ for a visible optical beam. The center H is offset in the z-direction by a distance $a_2$ from the optical surface of the laser diode 12b, from which the output optical beam is emitted. Thereby, the lens 12a focuses the output optical beam of the laser diode 12b of the infrared wavelength to the position D, which is offset from the position H in the z-direction by a distance $b_1$. On the other hand, if the laser diode 12b had produced an output beam with a visible wavelength, such a visible beam would have been focused at a position D', which is offset from the position H by a distance $b_2$ ($b_2 < b_1$).

In such a construction, the camera 13 acquires the image of the optical surface of the laser diode 12b at the position D' provided that the illumination of the optical surface is made by a visible beam of the foregoing visible wavelength. Therefore, there arises a need for converting the coordinate $(x_4', y_4', z_4')$ of the position D' to the coordinate $(x_4, y_4, z_4)$ of the position D. In this correction process for correcting the chromatic aberration of the lens 12a, it will be noted that the correction for the y-direction is not necessary, as the relationship of FIG. 18 holds in a common x-z plane.

From FIG. 18, the following relationship holds:

$$a_2 = |z_1 - z_6|$$

$$b_2 = |z_4' - z_8|$$

$$b_1 = |z_4 - z_8|$$

$$(1/a_2) + (1/b_2) = 1/f_2$$

$$(1/a_1) + (1/b_1) = 1/f_1$$

$$b_1/a_2 = |x_4 - x_8|/|x_1 - x_8|.$$

As the coordinate $(x_8, z_8)$ of the lens center H is known and also the coordinate $(x_4', z_4')$ of the position D', which is known as a result of the image acquisition conducted by the camera 13 under the visible illumination, it is possible to obtain the coordinate $(x_4, z_4)$ of the position D for the infrared illumination from the coordinates $(x_8, z_8)$ and $(x_4', z_4')$ by using the foregoing relationship.

As other processes are substantially identical to the process described previously, further description thereof will be omitted.

Figure 17:
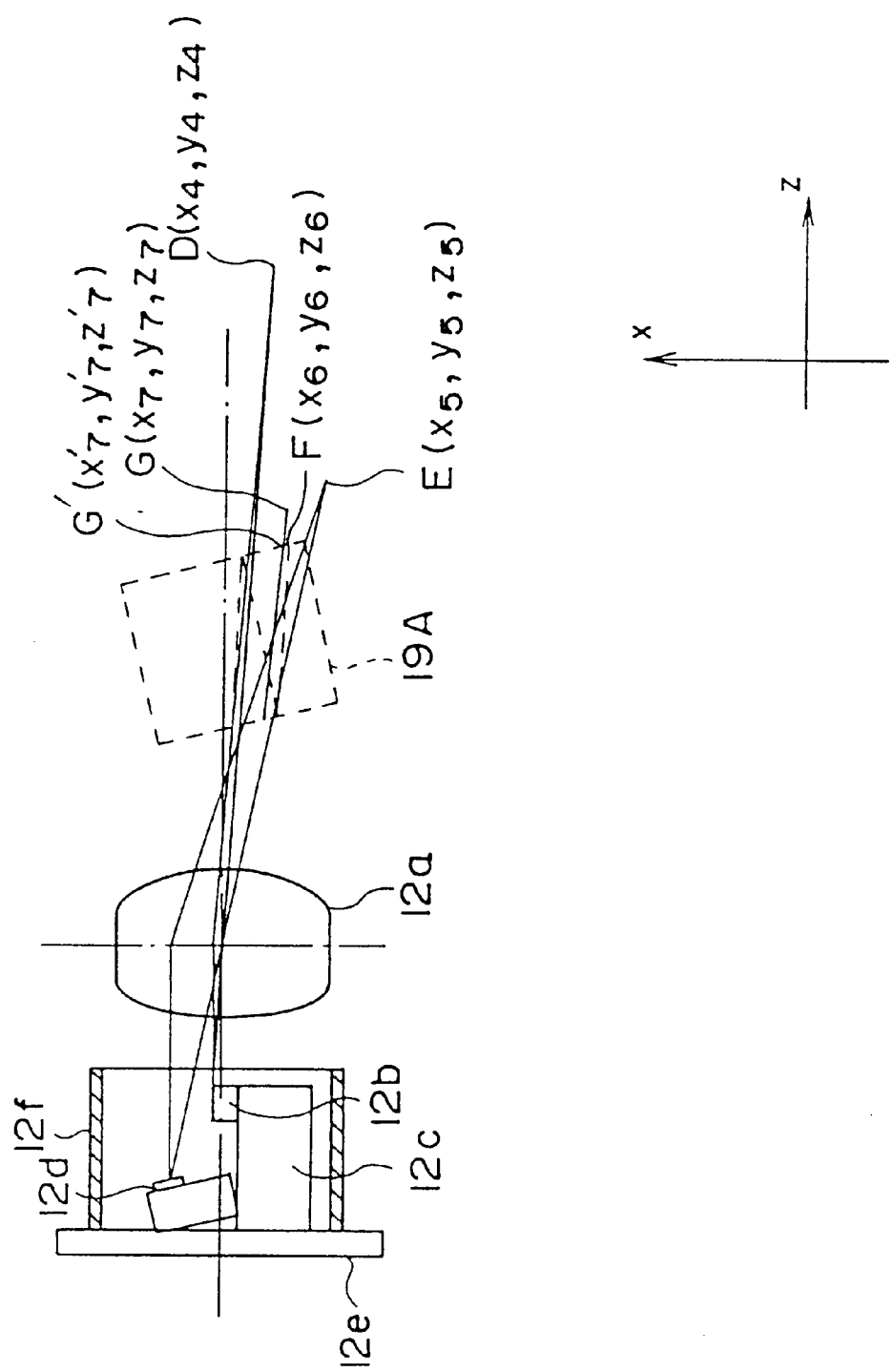
FIG. 17 is another diagram explaining the correction according to the third embodiment of the present invention.

In the foregoing correction process explained with reference to FIG. 17, it was assumed that the inclination angle Θ of the prism 19A is already known. On the other hand, it is also possible to determine the angle Θ simultaneously with the correction.

Figure 19:
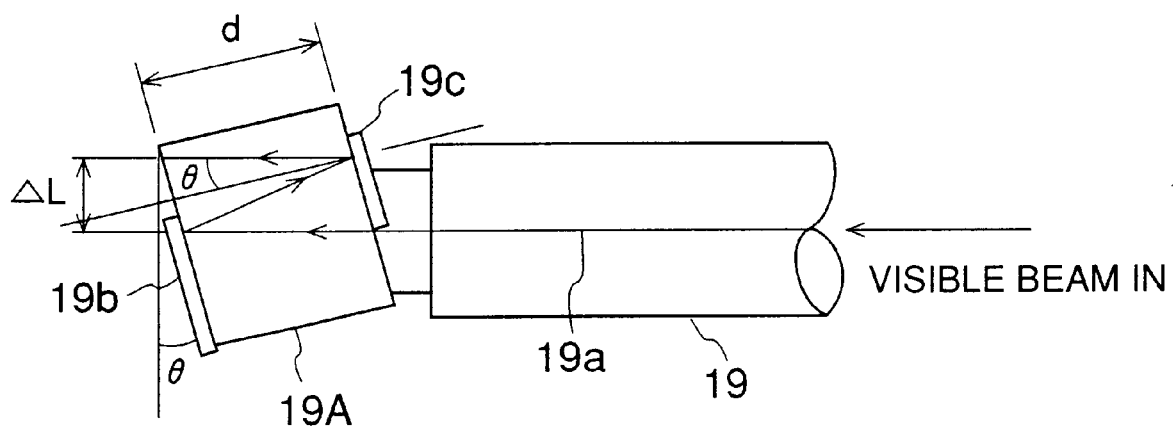
FIG. 19 is a diagram explaining the process for obtaining an inclination angle of a prism according to the third embodiment of the present invention.

Referring to FIG. 19, an optical beam is injected to the optical fiber 19 at the end opposite to the end that carries the prism 19A, wherein the optical beam travels along the core 19a and exits therefrom at the foregoing end that carries the prism 19A. The optical beam thus exiting the core 19a is then reflected by the semi-transparent mirror 19b of the prism 19A, followed further by a reflection by the full reflection mirror 19c, before it exits from the prism 19A. This means, that there two luminous spots appear, when viewed from the exit side of the prism 19A, one corresponding to the optical beam passed through the semi-transparent mirror 19b and the other corresponding to the optical beam reflected by the full reflection mirror 19c.

Thereby, a relationship $$\Delta L = 2 \times d \times \cos^2 \Theta$$

exits between the foregoing two luminous spots, wherein $\Delta L$ represents the distance or separation between the foregoing two luminous spots while d stands for the thickness of the prism 19A.

The foregoing relationship indicates that one can evaluate the real inclination angle Θ by measuring the foregoing distance $\Delta L$.

Fourth Embodiment

In the construction of the assembling rig of FIG. 3 or FIG. 12, it will be noted that the imaging optical system 13a of the camera 13 includes a beam splitter 13b for deflecting the illumination beam produced by the optical source 15, such that the beam splitter 13b deflects the illumination beam produced by the optical source 15 and guided to the camera via the optical fiber 15a, such that the illumination beam travels parallel to the optical axis of the imaging optical system 13a toward the LD assembly 12 after being deflected by the beam splitter 13b. In the illustrated example, the optical system 13a includes a lens $(13a)_1$ and a lens $(13a)_2$.

In the optical system 13a having such a construction, it will be noted that a part of the illumination beam thus deflected by the beam splitter 13b may be reflected back by the lens $(13a)_2$ toward the camera 13, resulting in the formation of saturation or halation, which disturbs the camera 13 from acquiring a clear image of the LD assembly 12. It should be noted that such a halation appears generally at the center of the image acquired by the camera 13.

In order to avoid the problem of halation, the assembling rig of FIG. 3 or FIG. 12 uses an additional illumination optical source 15A, in addition to the illumination optical source 15, such that the additional optical source 15A illuminates the LD assembly 12 obliquely. Further, the rig of FIG. 12 uses a ring illumination system 15B that avoids illumination of the object at the central part thereof, such that only the marginal part of the object is illuminated.

Figure 21:
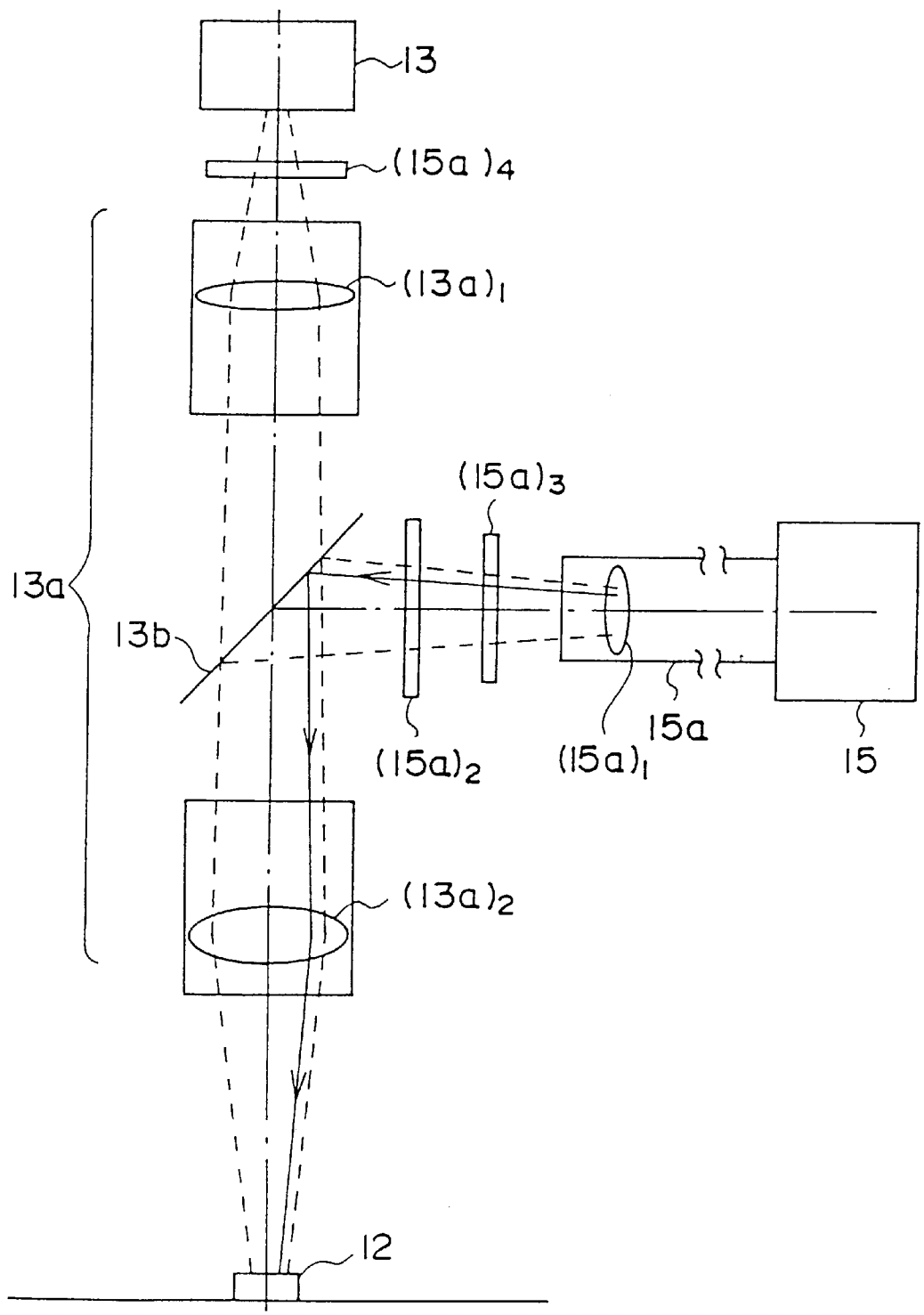
FIG. 21 is a diagram showing the construction of an illumination system according to a fourth embodiment of the present invention.

FIG. 21, on the other hand, shows a simplified illumination system according to the present embodiment.

Referring to FIG. 21, an optical beam that has exited a lens $(15a)_1$ at a tip end of the optical fiber 15a is passed through a first polarizer $(15a)_3$ having a first polarization plane and further through a beam shaping mask $(15a)_2$ that shapes the illumination beam passing therethrough. The beam shaping mask $(15a)_2$ thereby cuts a central part of the illumination beam that coincides with the optical axis of the lens $(13a)_2$. After illuminating the LD assembly 12, the illumination beam is passed consecutively through the lens $(13a)_2$ and the lens $(13a)_1$ and enters the camera 13 after passing through a second polarizer $(15a)_4$ having a second polarization plane.

Figure 22:
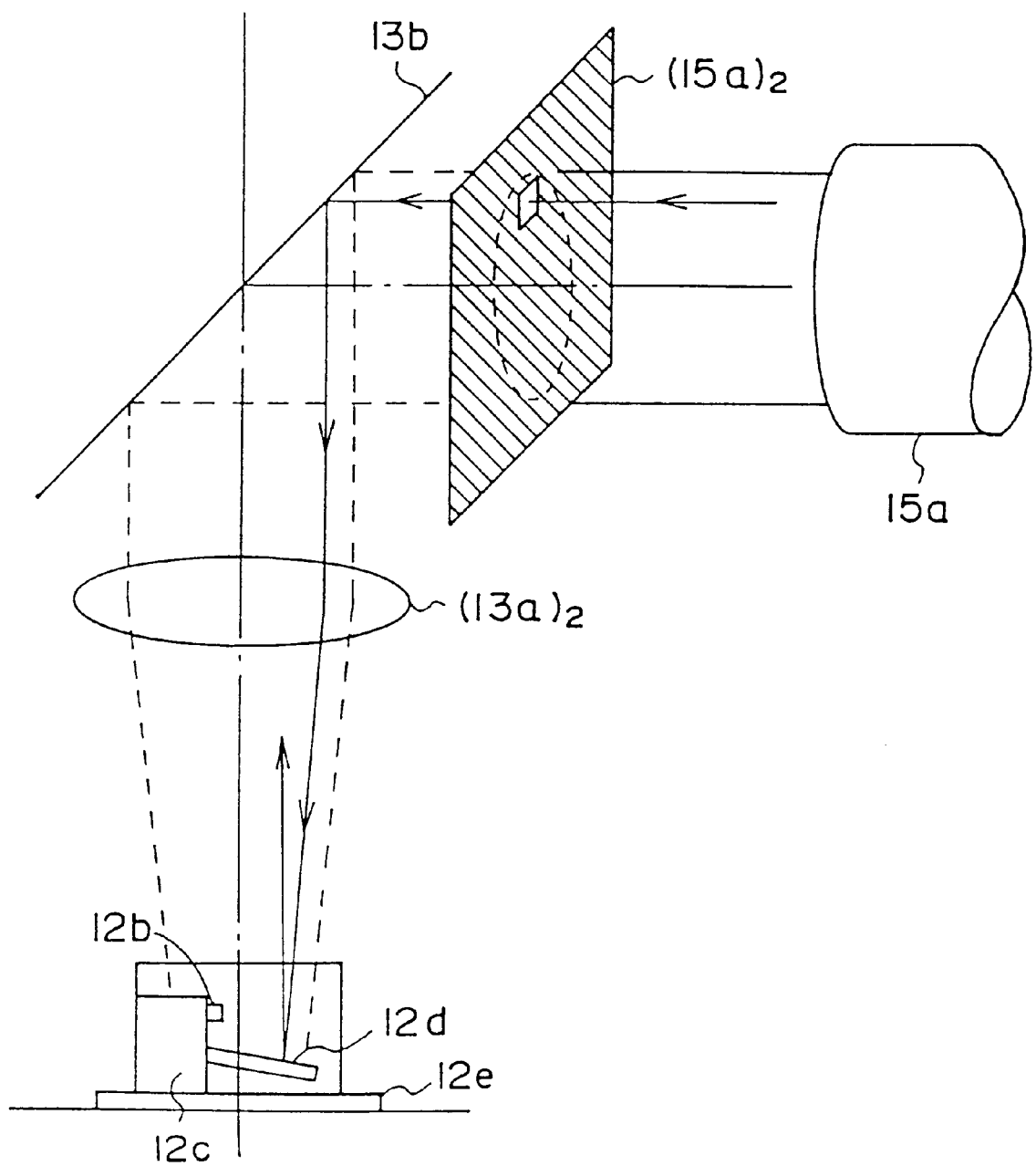
FIG. 22 is a diagram showing a detailed construction of the illumination system of FIG. 21.

FIG. 22 shows an example of the mask $(15a)_2$, wherein the example of FIG. 22 shows a case in which the mask $(15a)_2$ carries a window at the position offset from the optical axis of the optical fiber 15a that is set coincident to the optical axis of the imaging optical system 13a. Thereby, the mask $(15a)_2$ cuts the beam except for those parts passing through the window. By cutting the part of the optical beam that travels along the optical axis, one can successfully eliminate the problem of halation caused by the reflection of the illumination beam at the lens $(13a)_2$.

Figure 23:
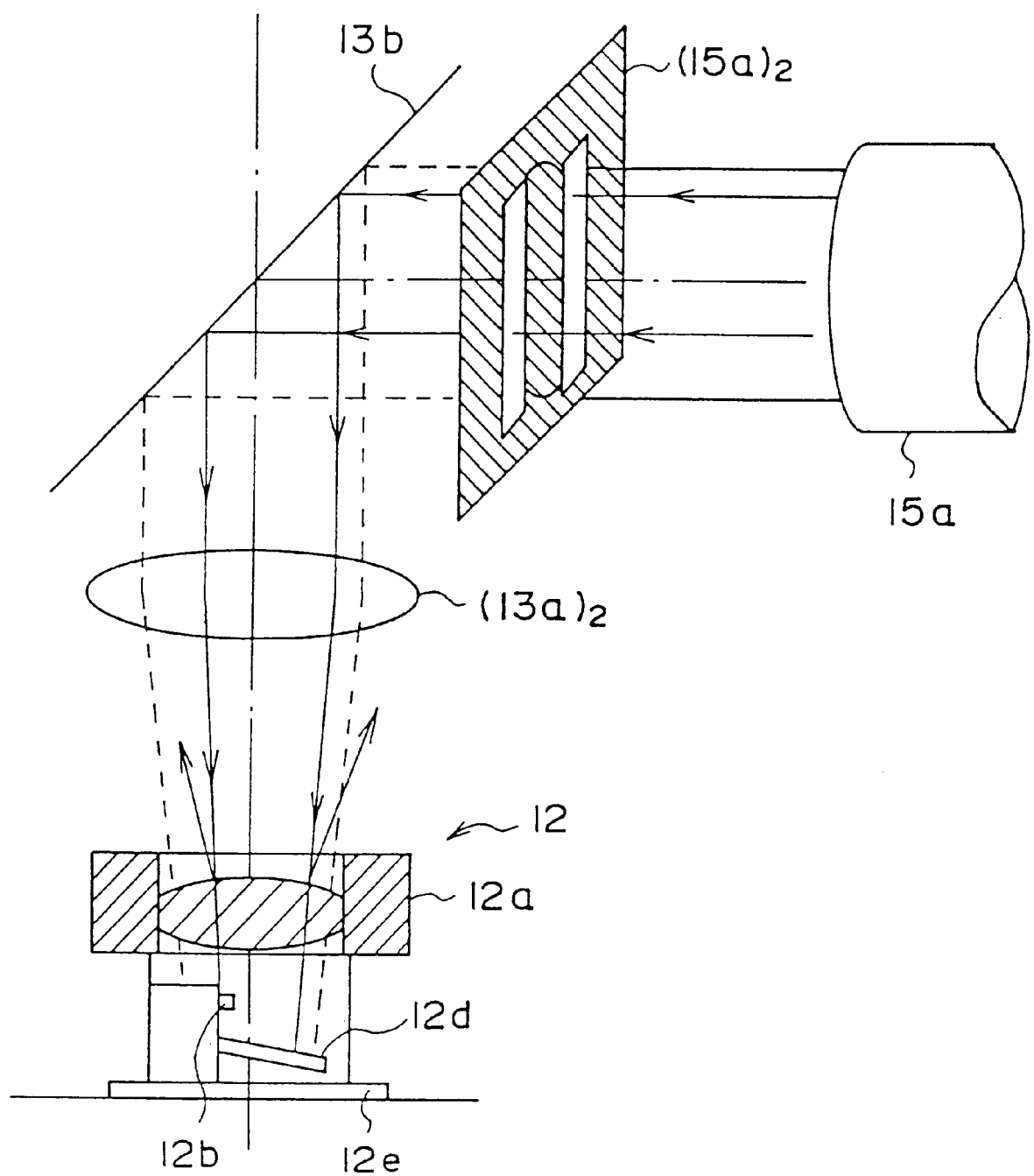
FIG. 23 is a diagram showing another detailed construction of the illumination system of FIG. 21.

FIG. 23 shows another example of the mask $(15a)_2$. In the illustrated example, the mask $(15a)_2$ includes a pair of slits that are formed with an offset from the optical axis of the imaging optical system 13a. Thus, the illumination system of FIG. 23 successfully avoids the illumination at the central part of the lens $(13a)_2$ as well as at the central part of the lens 12a.

Figure 20:
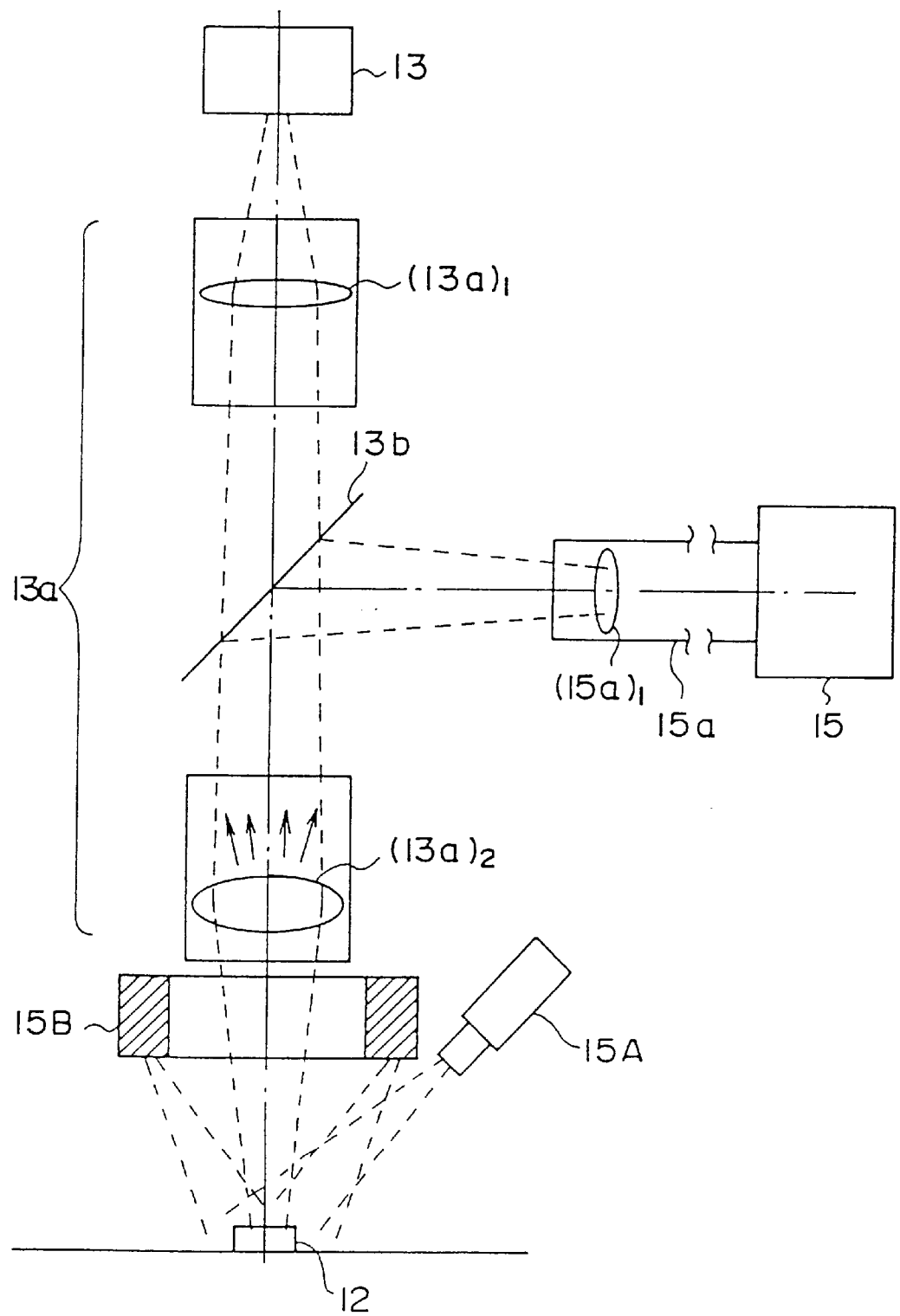
FIG. 20 is a diagram showing the construction of an illumination system used in the production rig of FIG. 3 or FIG. 12.
Figure 24A:
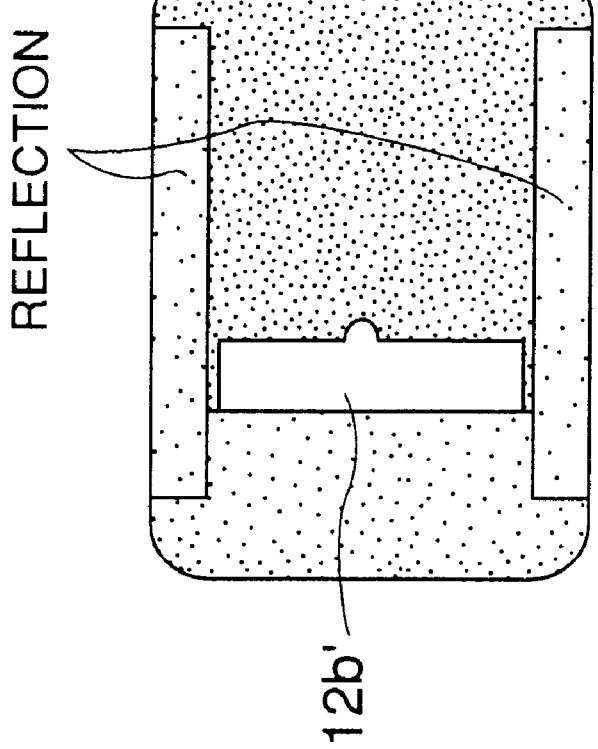
FIGS. 24A and 24B are diagrams showing the examples of images acquired by using the illumination system of FIG. 20 and the illumination system of FIG. 23 respectively.
Figure 24B:
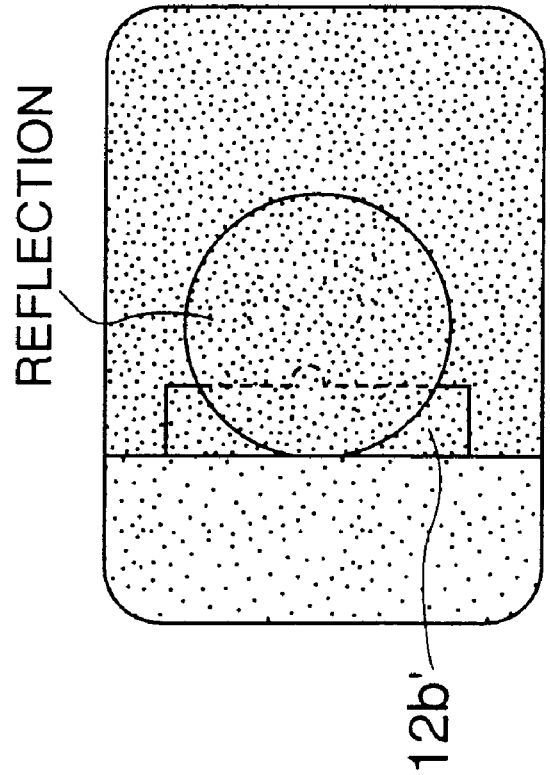

FIGS. 24A and 24B compare the image 12b' of the laser diode 12b respectively for the case in which the conventional illumination system of FIG. 20 is used and for the case in which the illumination system of FIG. 23 is used.

Referring to FIG. 24A, it will be noted that the whole image acquired by using the conventional illumination system shows a halation caused either by the lens $(13a)_2$ or the lens 12a, and the recognition of the image thus acquired is difficult. It should be noted that such a halation causes a serious problem in the present invention, as the present invention obtains the z-coordinate of the position D of the image 12b' by conducting a focusing process upon the image 12b'. In the second or third embodiment of the present invention, the problem of halation was avoided by using the oblique illumination system that uses the optical source 15A.

In the case of FIG. 24B, on the other hand, the reflection occurs only at the marginal part of the lens $(13a)_2$. No substantial reflection occurs at the central part of the lens $(13a)_2$. Thereby, it is possible to acquire the image 12b' of the laser diode 12b with very high and clear contrast.

Figure 25:
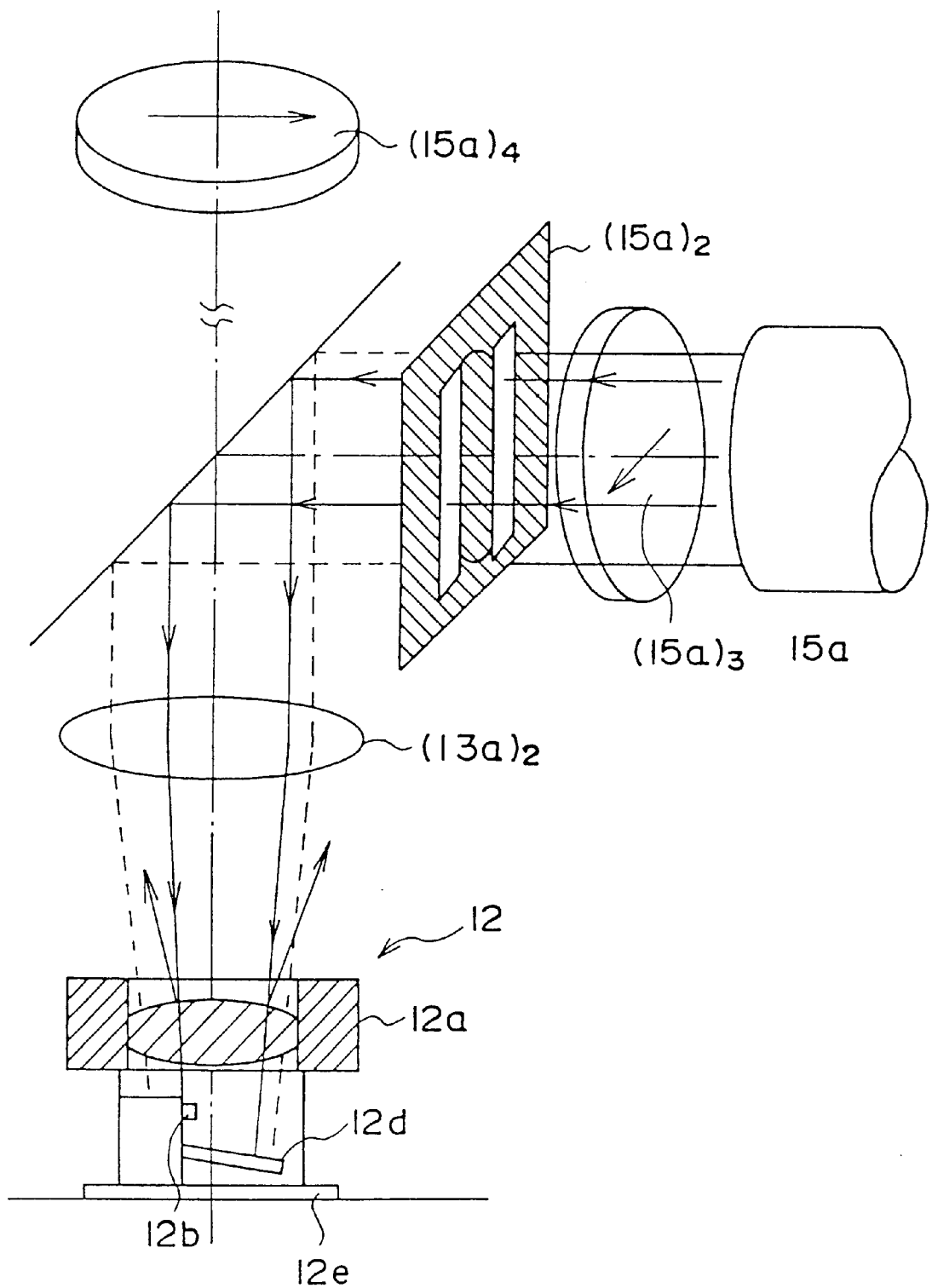
FIG. 25 is a diagram showing a detailed construction of the illumination system in which a polarizer is inserted into the construction of FIG. 23 for eliminating reflection.

FIG. 25 shows a modification of the illumination system of FIG. 23 in which the polarizer $(15a)_3$ and the polarizer $(15a)_4$ of FIG. 21 are added, wherein the arrows indicate the respective planes of polarization. It will be noted that the plane of polarization of the polarizer $(15a)_3$ intersect perpendicularly to the plane of polarization of the polarizer $(15a)_4$. Thereby, it is possible to more or less eliminate the reflection shown in FIG. 24B completely.

Figure 26:
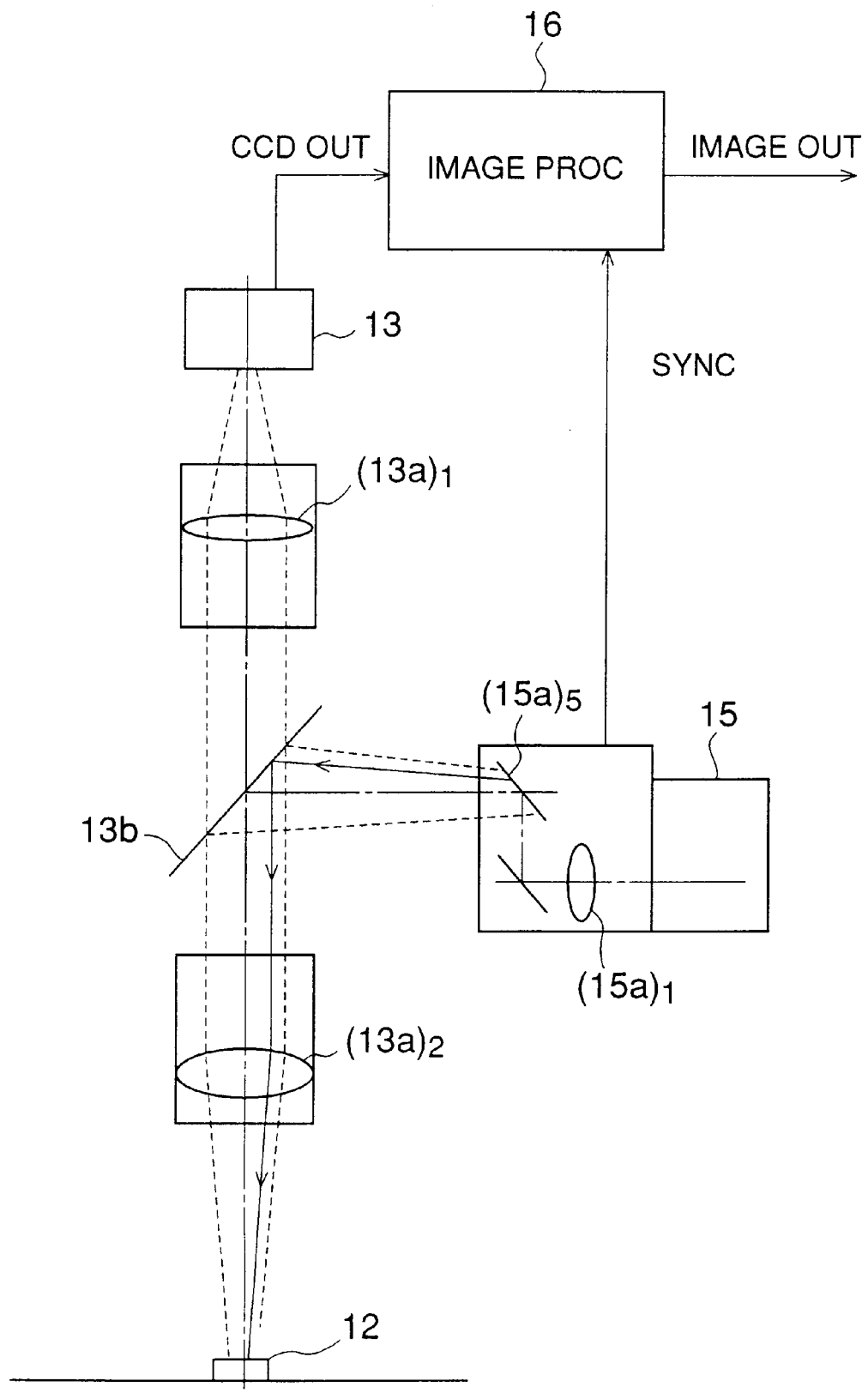
FIG. 26 is a diagram showing still another example of the illumination system of FIG. 21.

FIG. 26 shows a further improvement of the illumination system.

Referring to FIG. 26, there is provided a galvanometric mirror $(15a)_5$ for deflecting the illumination beam passed through the lens $(15a)_1$ such that the illumination beam scans over the surface of the LD assembly 12 in response to the movement of the galvanometric mirror $(15a)_5$. Further, a synchronization signal is supplied to the image processing unit 16 in synchronization to the movement of the galvanometric mirror $(15a)_5$, wherein the synchronization signal is used for cutting the reflection by the lens $(13a)_2$.

Figure 27A:
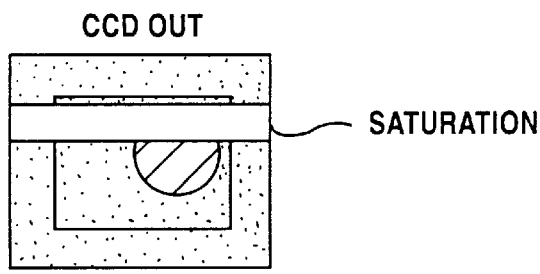
FIGS. 27A–27C are diagrams showing an example of operation of the illumination system of FIG. 21.
Figure 27B:
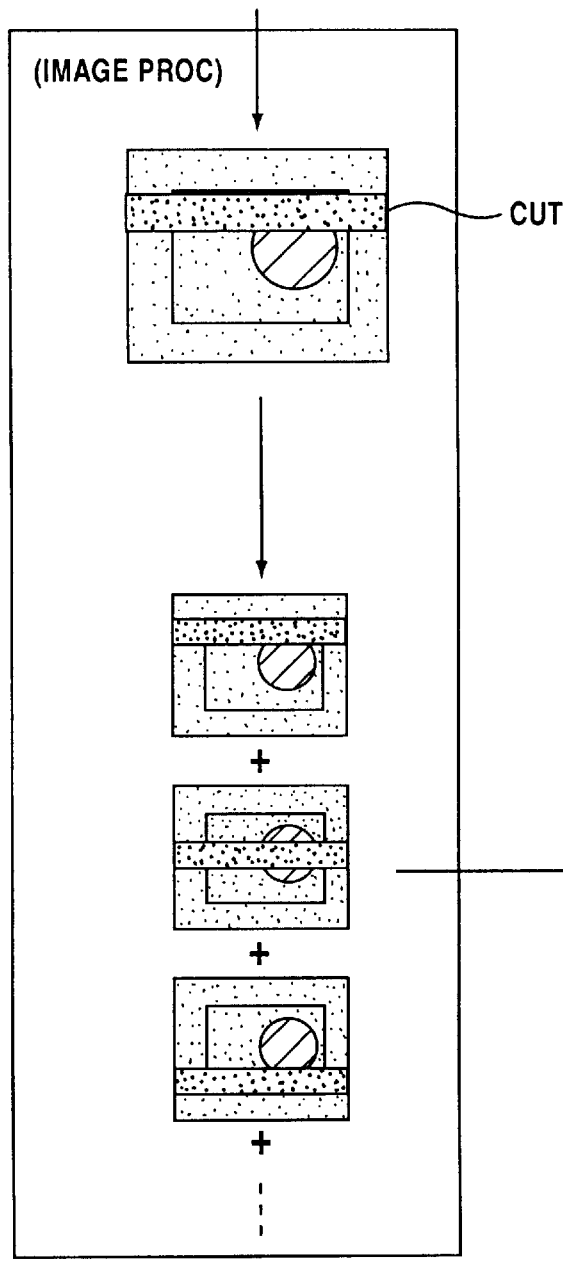
Figure 27C:
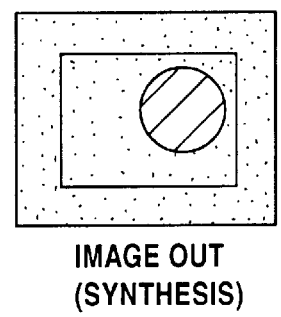

FIGS. 27A–27C show an example of the image acquisition conducted on the LD assembly 12 by the camera 13 while using the illumination system of FIG. 26.

Referring to FIG. 27A in which a cylindrical lens is used for the lens $(15a)_1$ in the illumination system of FIG. 26, the cylindrical lens $(15a)_1$ deforms the illumination beam produced by the beam source 15 to produce a line or band of beam, and such a line or band scans over the LD assembly 12 in response to the driving of the galvanometric mirror $(15a)_5$.

As a result of such a scanning of the line-shaped illumination beam, there appears a saturation region in the image acquired by the camera 13 as indicated in FIG. 27A as a result of reflection at the surface of the lens $(13a)_2$, wherein the construction of FIG. 26 uses the image processing unit 16 for purging the area where the saturation has occurred. By superposing images of various scanning states as indicated in FIG. 27B, a clear image free from halation as indicated in FIG. 27C is synthesized.

Figure 28A:
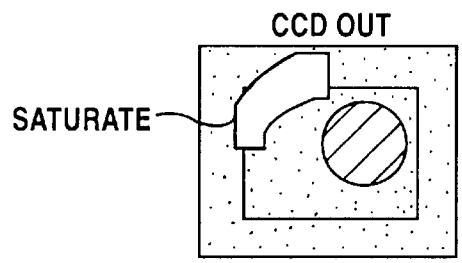
FIGS. 28A–28C are diagrams showing another example of operation of the illumination system of FIG. 21.
Figure 28B:
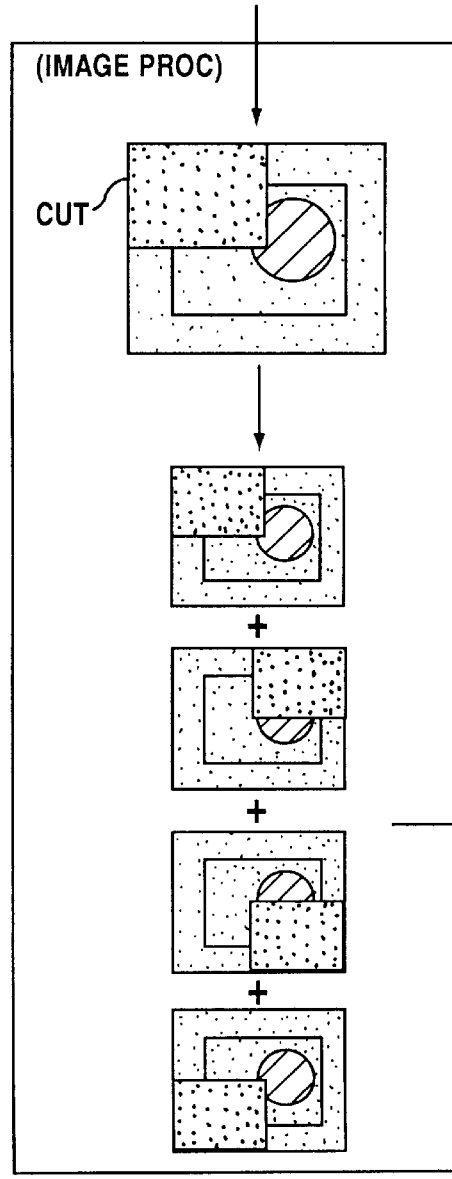
Figure 28C:
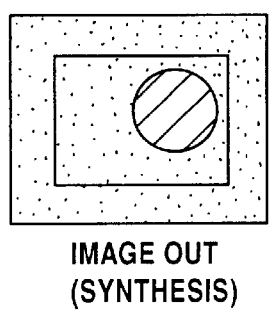
Figure 29:
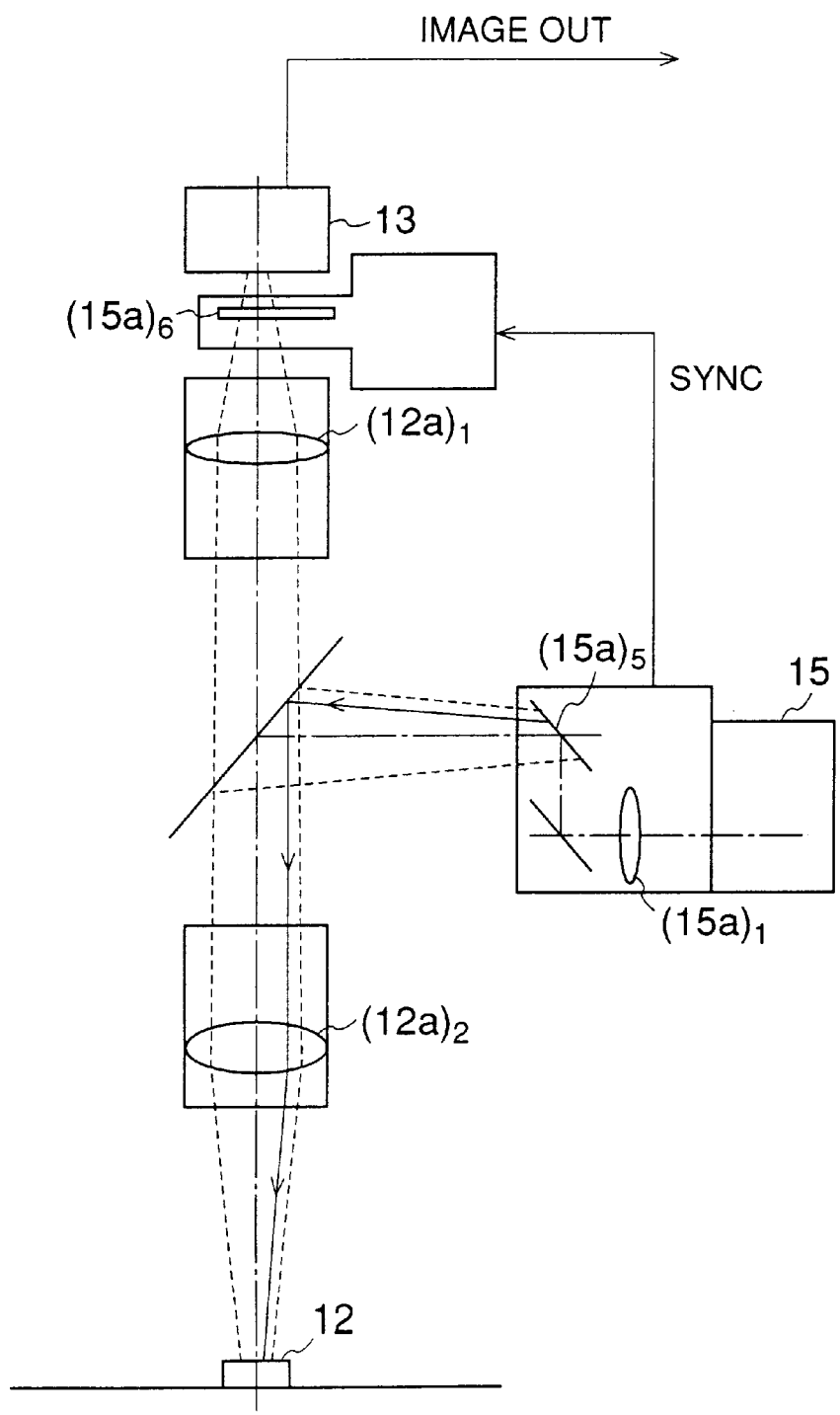
FIG. 29 is a diagram showing still another example of the illumination system of FIG. 21.

FIGS. 28A–28C show another example of image acquisition conducted by the illumination system of FIG. 21.

Referring to FIG. 28A, the galvanometric mirror $(15a)_5$ deflects the illumination beam of the beam source 15 such that the illumination beam scans the surface of the LD assembly 12 consecutively from first through fourth quadrants thereof, and the image processing unit 16 cuts the area where the saturation or halation occurs as indicated in FIG. 28B. Further, by superposing the images of the first through fourth quadrants thus obtained, one can synthesize a clear image as indicated in FIG. 28C.

The process of FIG. 27B or 28B for removing the saturated area from the image of the camera 13 may be conducted physically rather than using the image processing unit 16, by providing an opaque mask $(15a)_6$ carrying an opaque pattern before the camera 13 and by switching the opaque pattern one after another in synchronization to the movement of the foregoing galvanometric mirror $(15a)_5$.

Figure 30:
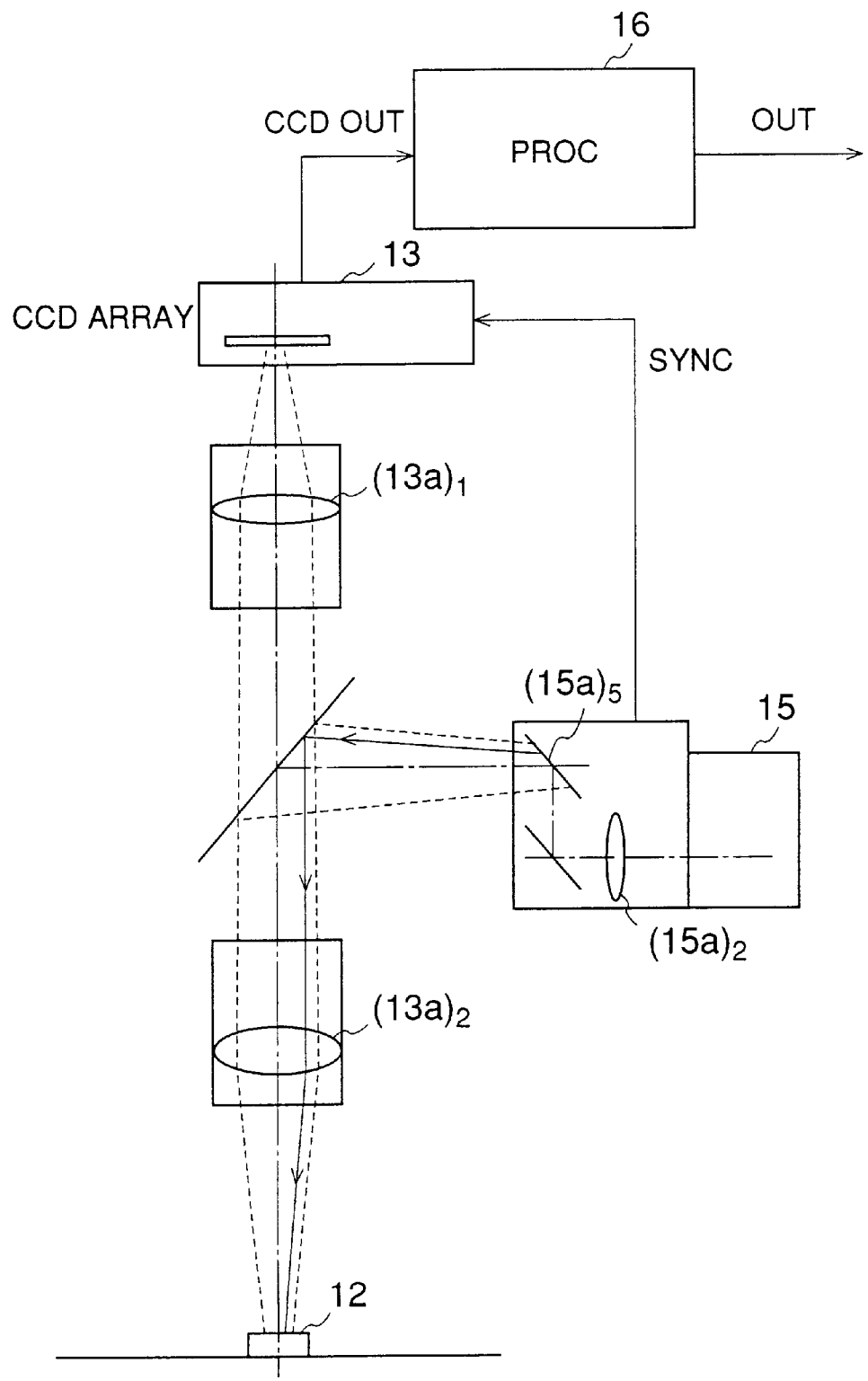
FIG. 30 is a diagram showing still another example of the illumination system of FIG. 21.
Figure 31A:
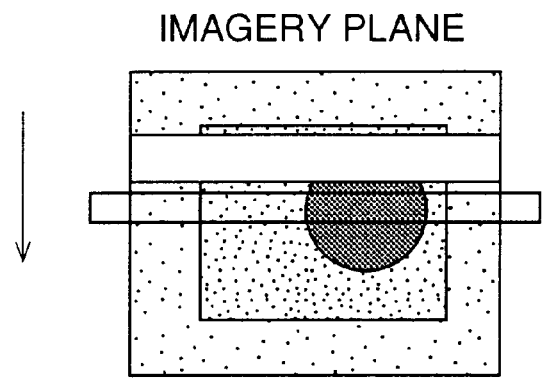
FIGS. 31A–31C are diagrams showing an example of operation of the illumination system of FIG. 30.
Figure 31B:
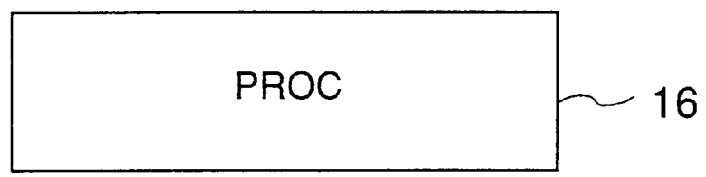
Figure 31C:
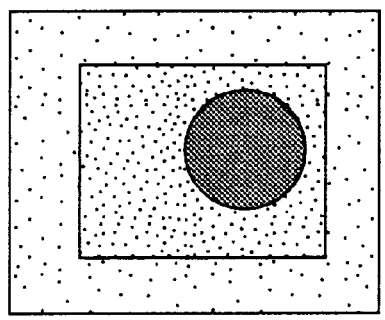

Further, it is possible to use a camera equipped with a CCD array sensor for the camera 13, as indicated in FIG. 30. In this case, the line-shaped illumination beam scans over the surface of the LD assembly 12 as indicated in FIG. 31A, and a scanning is made in the CCD array sensor of the camera 13 line sequentially in synchronization to the scanning of the line-shaped illumination beam. Thereby, the CCD array produces a number of one-dimensional images of the LD assembly 12 consecutively, and the image processing unit 16 extracts the one-dimensional images except for the part where the halation has been caused as a result of the line-shaped illumination. By synthesizing such one-dimensional images in the signal processing unit 16 as indicated in FIG. 31B, one obtains a halation-free image as indicated in FIG. 31C.

Fifth Embodiment

Next, the automatic focusing of the camera 13 used in the assembling rig of FIG. 3 or FIG. 12 will be explained.

Figure 32:
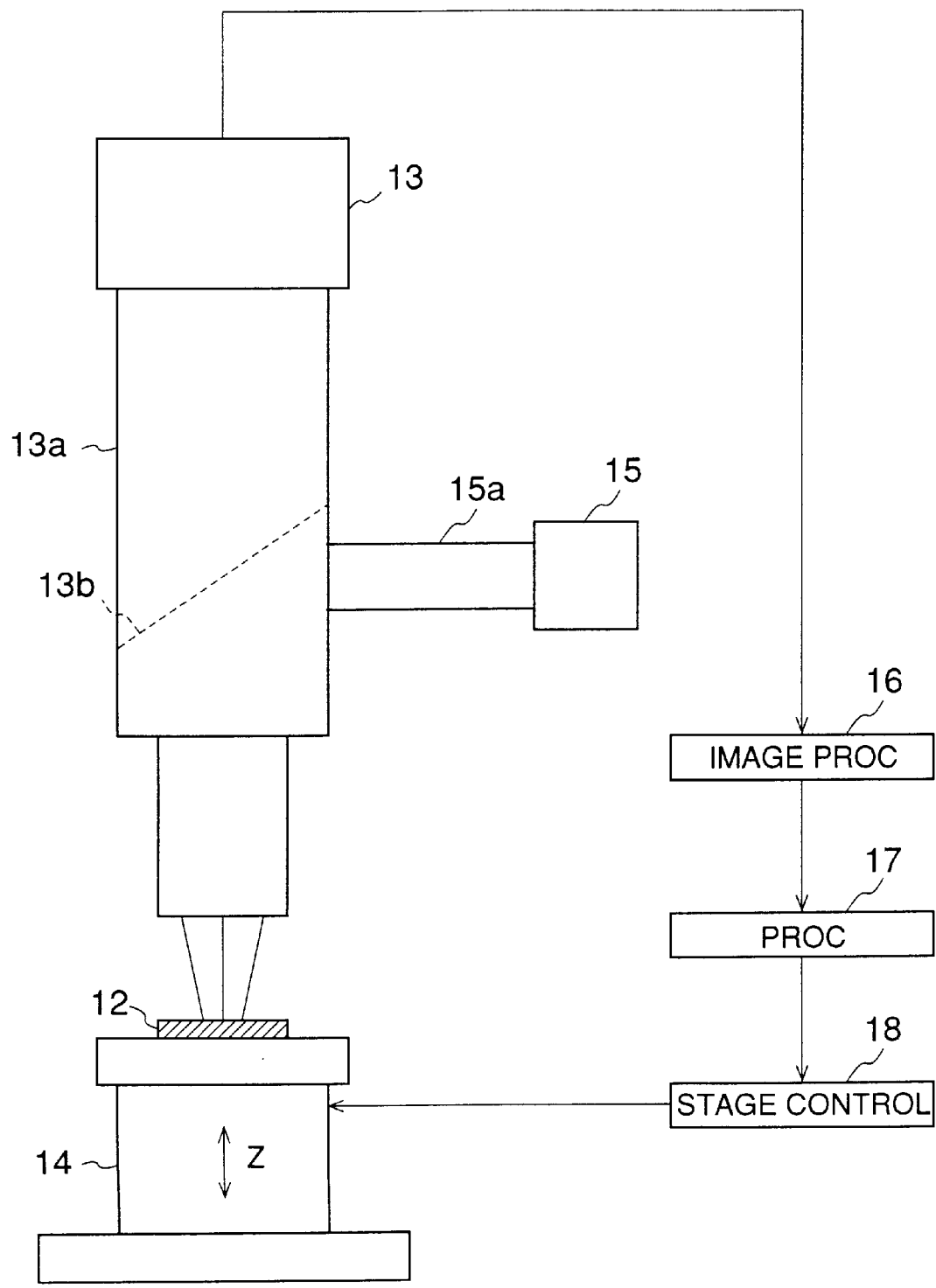
FIG. 32 is a diagram showing the construction of an imaging optical system used in the production rig of FIG. 3 or FIG. 12, according to a fifth embodiment of the present invention.

FIG. 32 is a block diagram showing a part of the rig of FIG. 3 or FIG. 12 that is related to the automatic focusing of the camera 13 in detail.

Referring to FIG. 32, an evaluation unit 17, which may be formed of a computer, decides whether or not the image of the LD assembly 12 thus acquired by the imaging optical system 13a and processed further by the image processing unit 16, is properly focused. If the result is NO, the evaluation unit 17 controls the stage controller 18 such that the stage 14 is moved in the z-direction in search of a proper focusing state.

In ordinary VTR cameras, the detection of focusing is made based upon the sharpness of the obtained image. In the case of the present invention applied to the LD assembly, however, such a focusing detection is generally inappropriate, as the LD assembly includes the photodiode 12d in an oblique state on the substrate 12e. In such a structure that includes an oblique element, a proper focusing is always achieved at some part of the oblique element. As the present invention relies upon the automatic focusing process for obtaining the optimum position of the optical fiber 19 with respect to the LD assembly 12, such an automatic focusing process must be reliable and should be able to be carried out quickly.

FIGS. 33A–33D explain the principle of automatic focusing of the imaging optical system 13a according to the present embodiment.

Figure 33A:
FIGS. 33A–33D are diagrams explaining an automatic focusing process that uses a registration pattern according to the fifth embodiment of the present invention.

Referring to FIG. 33A, the evaluation unit 17 holds a registration pattern corresponding to the pattern of a specific part of the LD assembly surface at which the focusing is to be made. Thus, the evaluation unit 17 carries out a pattern matching between the image acquired by the camera 13 and the foregoing registration pattern by evaluating a nominal correlation between the acquired image and the registration pattern for various z-positions of the stage 14. The proper focusing position is thereby obtained as the z-position that provides the maximum nominal correlation.

Figure 33B:
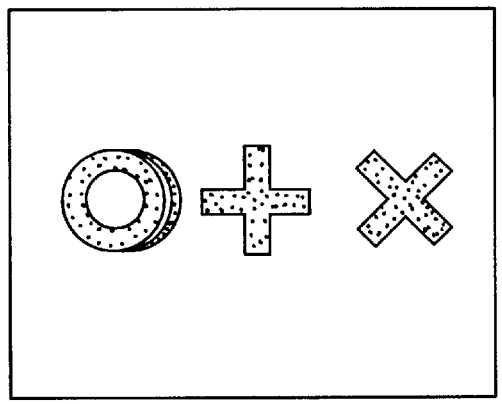
Figure 33C:
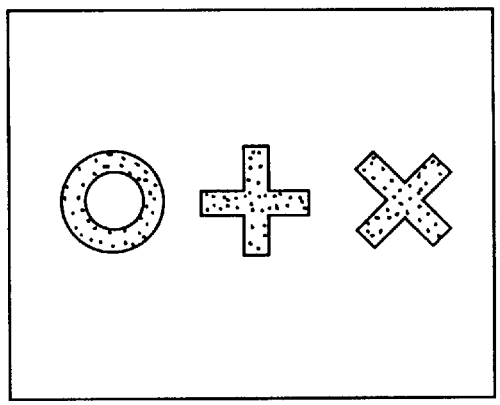
Figure 33D:
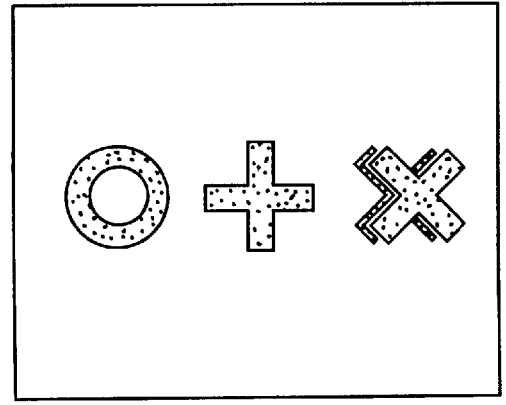

By using such an automatic focusing process, it is possible to achieve proper focusing for the selected part corresponding to the registration pattern shown in FIG. 33A with reliability, even in the case shown in FIGS. 33B–33D in which the surface of the LD assembly is inclined. It should be noted that FIG. 33C shows the on-focus state while FIGS. 33B and 32D indicate an off-focus state. In the state of FIG. 33B, it will be noted that the focusing is made for the cross-mark pattern, while in the state of FIG. 33D, the focusing is made for the ring-shaped pattern.

Figure 34A:
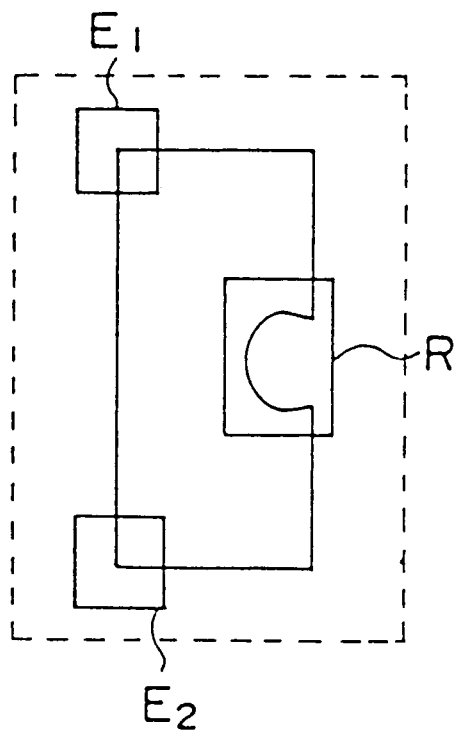
FIGS. 34A and 34B are diagrams showing an example of extracting a registration pattern.
Figure 34B:
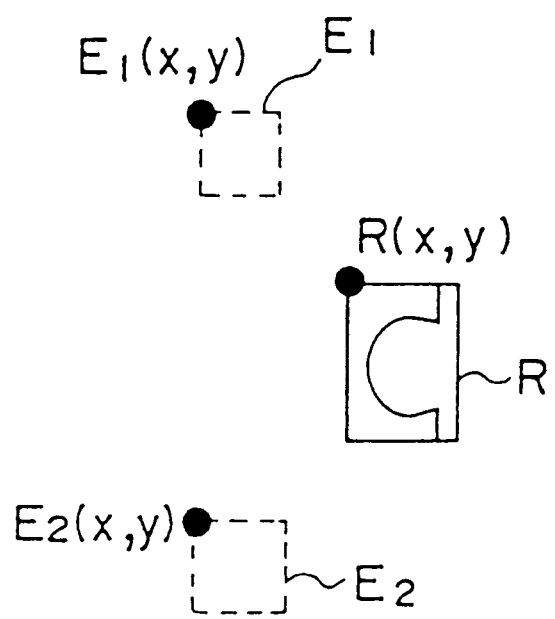

FIGS. 34A and 34B show an example of extracting the registration pattern used for focusing of the LD assembly 12.

Referring to FIG. 34A, a region R including the luminous point of the laser diode 12b or the photoreception point of the photodiode 12d is extracted, together with edge patterns $E_1$ and $E_2$ that are suitable for sharpness detection by carrying out a differentiation, wherein the edge patterns $E_1$ and $E_2$ are used for confirming that the focusing position obtained by the pattern matching process explained above is the true on-focus position. Thereby, the evaluation unit 17 stores the coordinates of the respective patterns R(x,y), $E_1(x,y)$ and $E_2(x,y)$ as indicated in FIG. 34B.

As noted already, the pattern matching is conducted while driving the stage 14 in the z-direction via the stage controller 18 in search of the maximum of the foregoing nominal correlation.

Figure 35A:
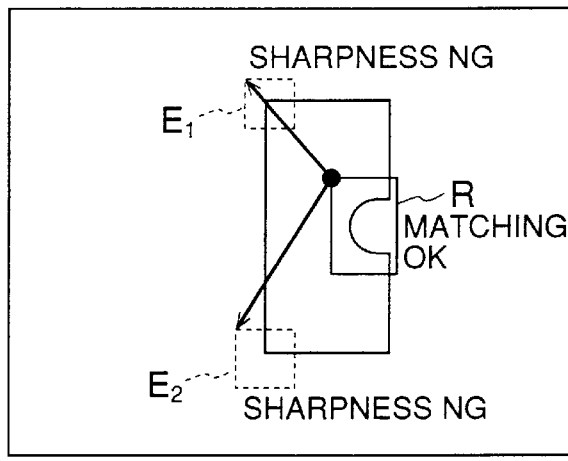
FIGS. 35A–35D are diagrams showing the automatic focusing process that uses a normal correlation of a registration pattern according to a fifth embodiment of the present invention.
Figure 35B:
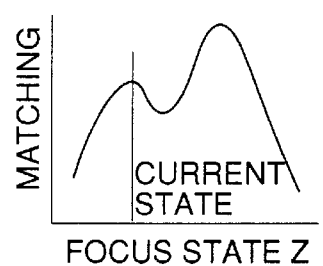

FIGS. 35A and 35B show the examples of such a maximum of the nominal correlation, wherein FIG. 35A shows the case of a false focusing state in which the obtained maximum of the nominal correlation is only one of a plurality of maxima. In order to exclude the possibility of such a detection of erroneous focusing state, the present embodiment employs a sharpness detection at the foregoing registered edge positions $E_1$ and $E_2$ by carrying out a differentiation of the acquired image.

FIGS. 35A and 35B show an example of the false focusing state in which the sharpness of the image is low, while the nominal correlation merely corresponds to one of a plurality of maxima.

Figure 35C:
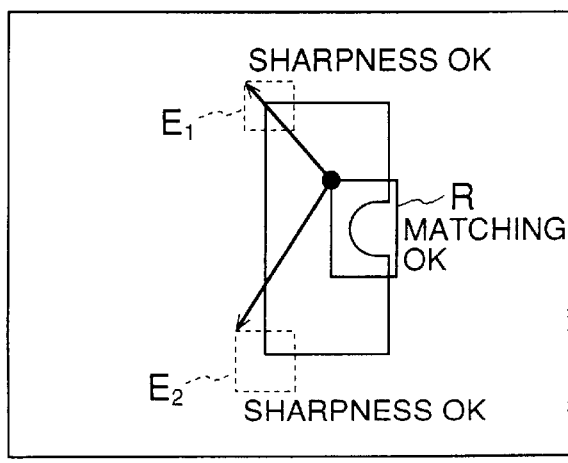
Figure 35D:
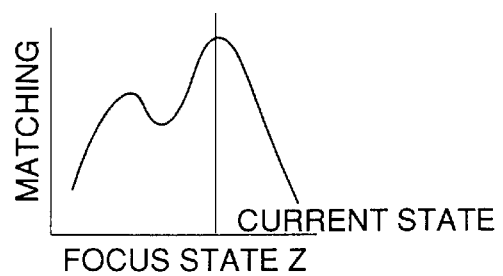

On the other hand, FIGS. 35C and 35D show the proper focusing state in which both the nominal correlation for the registered pattern R and the pattern sharpness for the edge patterns $E_1$ and $E_2$ both provide respective maxima.

Thus, according to the present embodiment, it is possible to obtain the proper focusing position of the camera 13 and hence the optimum position of the optical fiber 19 with respect to the LD assembly 12 for optimum optical coupling, quickly and with reliability.

Sixth Embodiment

Figure 36:
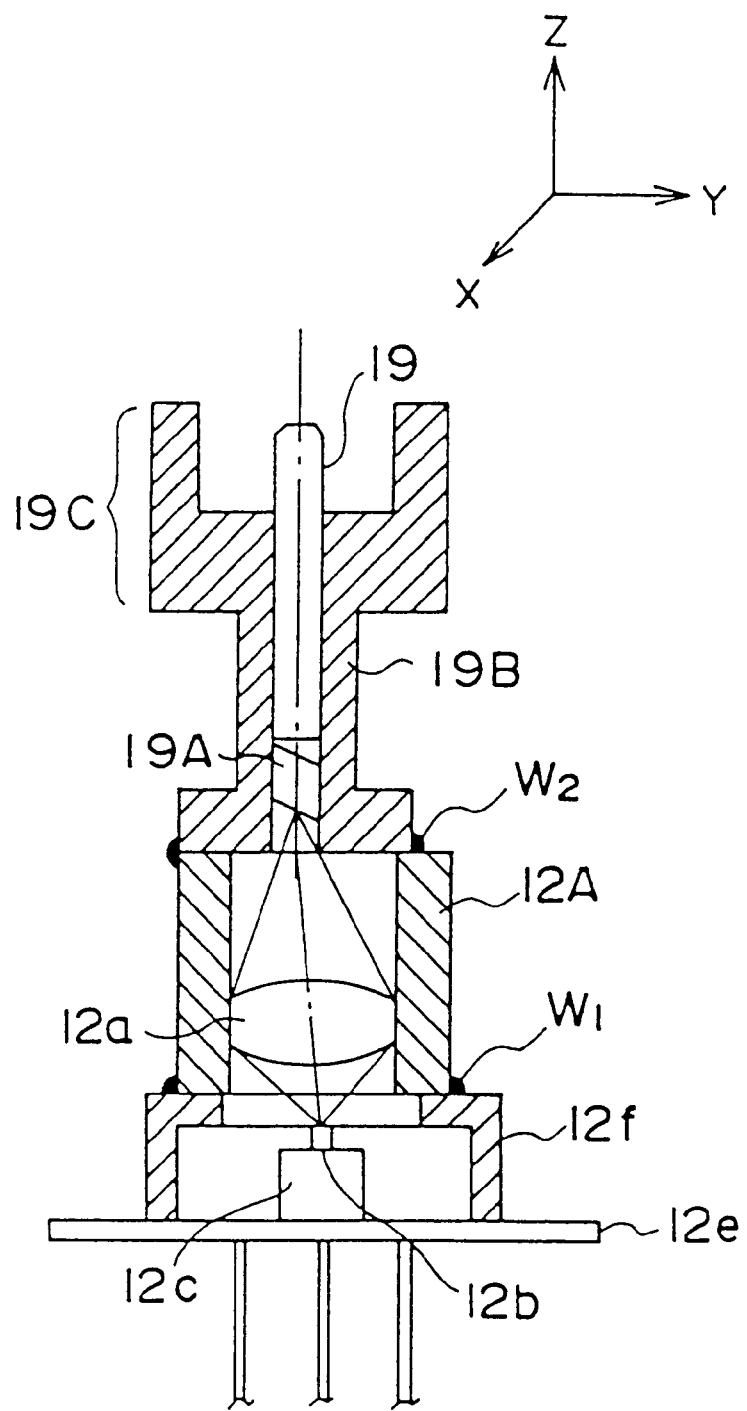
FIG. 36 is a diagram showing a completed optical module assembly.

After optimization for the optical coupling in the assembling rig of FIG. 3 of FIG. 12, the LD assembly 12 and the optical fiber 19 are fixed to each other by welding at the foregoing optimized relationship, to form an optical module indicated in FIG. 36.

Referring to FIG. 36, the lens 12a is held in a frame 12A and is welded upon the case 12f that encloses the laser diode 12b and the photodiode 12d (not shown), at a welding point $W_1$. Further, the optical fiber 19 is held in a fiber holder 19B together with the prism 19A, and the fiber holder 19B is welded upon the foregoing lens frame 12A at a welding point $W_2$. The fiber holder 19B further carries a socket 19C at the side opposite to the side abutted to the lens frame 12A, for connection to other optical fiber(s).

Figure 37:
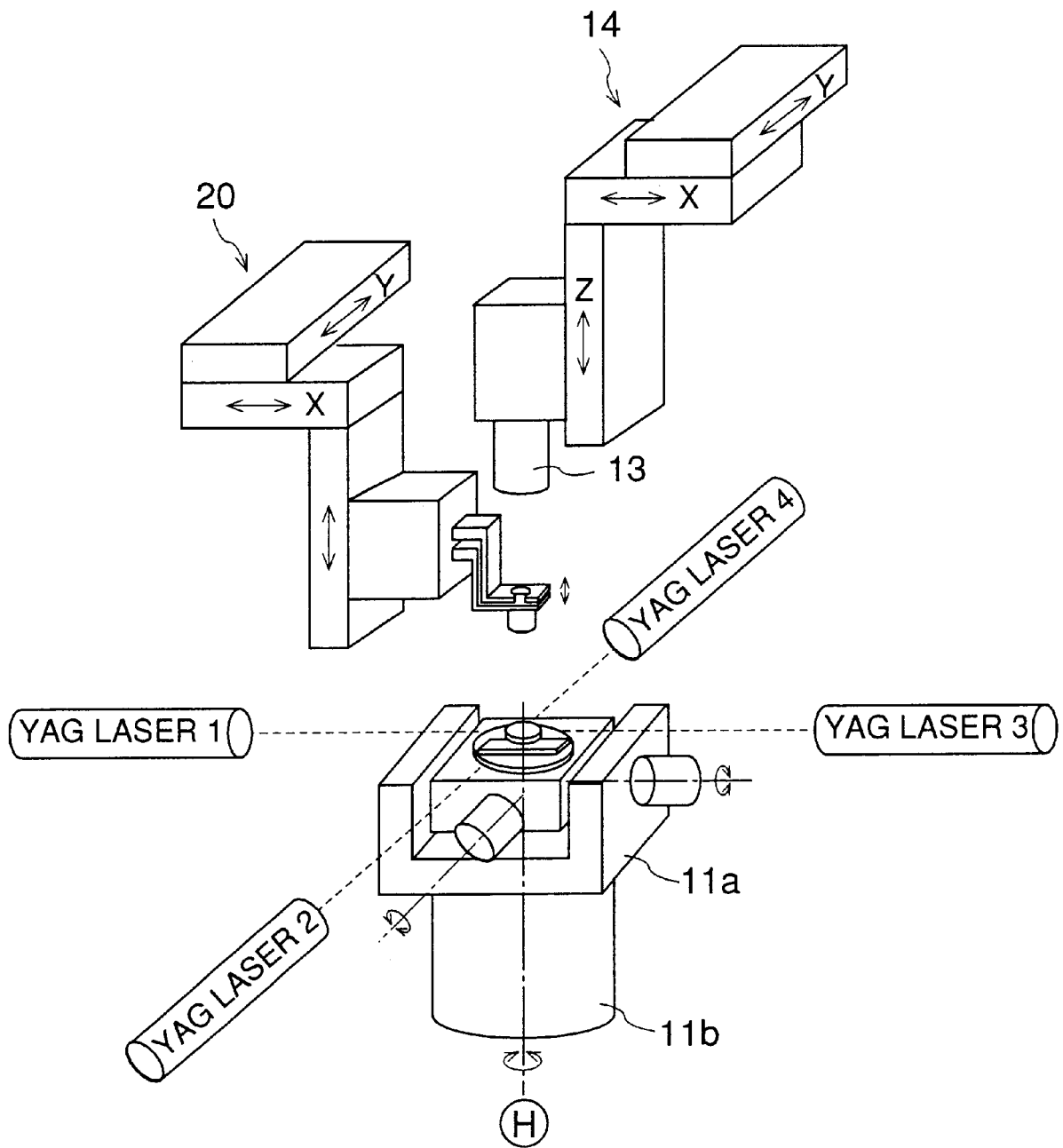
FIG. 37 is a diagram showing a welding rig for welding an optical module with an optimum state.

Generally, such an optical module is assembled by welding, in which four YAG lasers, disposed at four locations about the z-axis, are energized to produce four laser beams aiming respective welding points as indicated in FIG. 37. On the other hand, such a conventional construction has a drawback that, because of the construction for supporting the four YAG lasers on respective four xyz-stages, the proper aiming of the laser beams needs a complex adjustment process of the xyz-stages.

Figure 38:
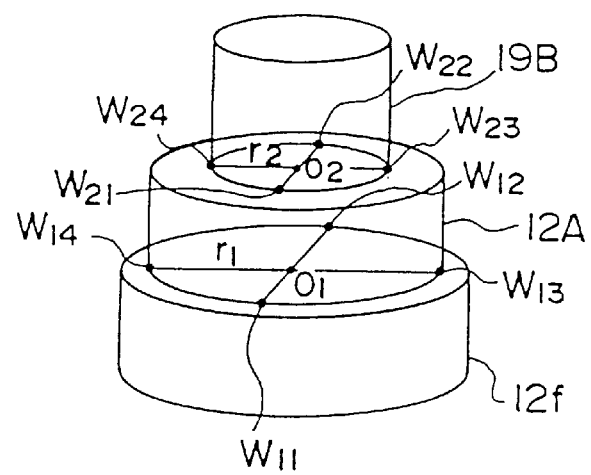
FIG. 38 is a diagram explaining the principle of a welding mechanism used for welding an optical module assembly according to a sixth embodiment of the present invention.

When carrying out laser welding upon the optical module of FIG. 36, on the other hand, it is not necessary to adjust the YAG lasers independently as in the case of FIG. 37, but it is sufficient to carry out the welding, first upon welding points $W_{11}$, $W_{12}$, $W_{13}$, $W_{14}$ aligned on a first common circle $O_1$, and next upon welding points $W_{21}$, $W_{22}$, $W_{23}$, $W_{24}$ aligned on a next, second common circle $O_2$, as schematically illustrated in FIG. 38.

Figure 39:
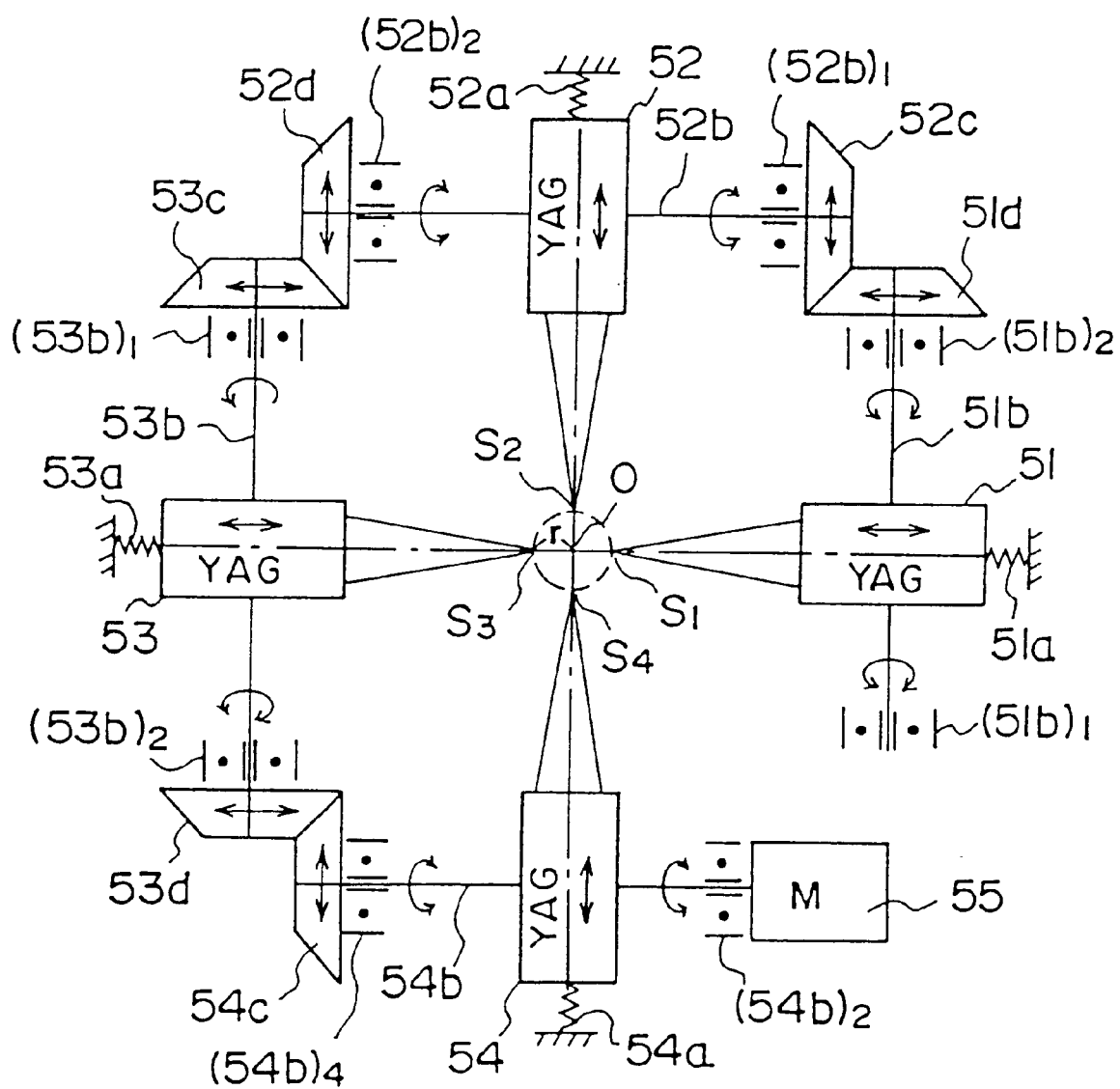
FIG. 39 is a diagram showing the construction of the welding mechanism according to the sixth embodiment of the present invention.

FIG. 39 shows the construction of the welding mechanism used for aiming the laser beams of the YAG lasers to the welding points aligned on a circumference.

Referring to FIG. 39, the welding mechanism includes first through fourth YAG lasers 51–54 disposed symmetrically about a symmetry axis passing through a center O, wherein the YAG lasers 51–54 are disposed so as to aim points $S_1$–$S_4$ aligned on a circle centered at the point O by respective laser beams. Thereby, each of the YAG lasers such as the YAG laser 51 is held on a shaft 51b that extends perpendicularly to the direction connecting the foregoing center O and the laser 51 in a plane extending perpendicularly to the foregoing symmetry axis, wherein the YAG laser 51 is held on the shaft 51b via a linear motion conversion mechanism that converts the rotational motion of the shaft 51b to a linear motion such that the YAG laser 51 moves to and fro with respect to the center O. The shaft 51b is thereby supported by bearings $(51b)_1$ and $(51b)_2$ at both ends thereof, and one end of the shaft 51b is formed with a bevel gear 51d. The YAG laser 51 is urged toward the center O by a spring 51a.

A similar construction is formed also for the YAG lasers 52, 53 and 54, wherein a bevel gear 52c formed at an end of a shaft 52b, which carries a YAG laser 52 thereon, meshes with the bevel gear 51d of the shaft 51b. Similarly, a bevel gear 53c formed at an end of a shaft 53b carrying thereon a YAG laser 53, meshes with a bevel gear 52d formed at the other end of the shaft 52b. Further, a bevel gear 54c formed at an end of a shaft 54b carrying thereon a YAG laser 54, meshes a bevel gear 53d formed on the shaft 53b at the other end.

It should be noted that a motor 55 is connected to the other end of the shaft 54b, and all of the shafts 51b–54b are caused to rotate simultaneously in response to the driving of the motor 55. Further in response to the simultaneous rotation of the shafts 51b–54b, the YAG lasers 51–54 move to and fro with respect to the center O simultaneously. Associated with the movement of the YAG lasers 51–54, the radius r of a circle, on which the foregoing points $S_1$–$S_4$ are aligned, increases and decreases.

Thus, by using the welding mechanism of FIG. 39 in combination with the assembling rig of FIG. 3 or FIG. 12, one can achieve an efficient welding by merely driving the motor 55, such that the laser beams are directed to the welding points $S_1$–$S_4$ of an arbitrary radius r.

Figure 40:
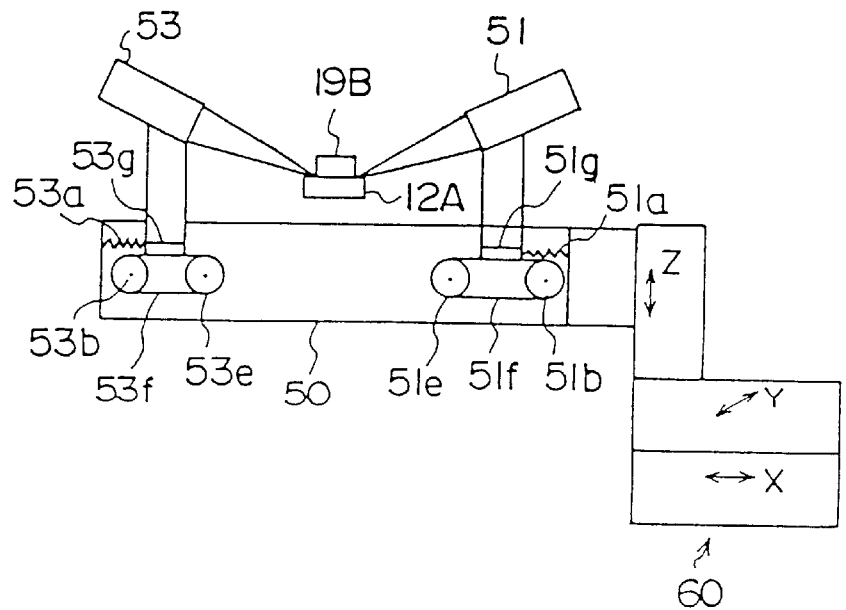
FIG. 40 is another diagram showing the construction of the welding mechanism according to the sixth embodiment of the present invention.

FIG. 40 shows the mechanism of FIG. 39 in a side view, wherein it will be noted that FIG. 40 shows the construction of FIG. 39 as viewed from the upward direction with respect to the sheet of the drawing. While FIG. 40 shows only YAG lasers 51 and 53, a similar construction is provided also for the YAG lasers 52 and 54.

Referring to FIG. 40, the YAG lasers 51 and 53 are carried on a common frame 50 and are held by respective linear guides 51g and 53g so as to be movable freely to and fro with respect to the foregoing center O. In the illustrated example, follower wheels 51e and 53e are provided respectively in correspondence to the rotational shafts 51b and 53b, such that the YAG laser 51 is moved along the linear guide 51g by a belt 51f provided between the shaft 51b and the follower wheel 51e. Similarly, the YAG laser 53 is moved along the linear guide 53g by a belt 53f provided between the shaft 53b and the follower wheel 53e. Further, the frame 50 of the welding mechanism is carried on a xyz-stage 60 and is moved to the center O of the welding as necessary.

By using the construction of FIG. 40 in combination with the assembling rig of FIG. 3 or FIG. 12, it is possible to improve the throughput of production of the optical module significantly.

Seventh Embodiment

Next, a description will be given of a production rig of the optical module that combines the rig of FIG. 3 or FIG. 12 and the welding mechanism of FIG. 39 or FIG. 40, with reference to FIG. 41.

Figure 41:
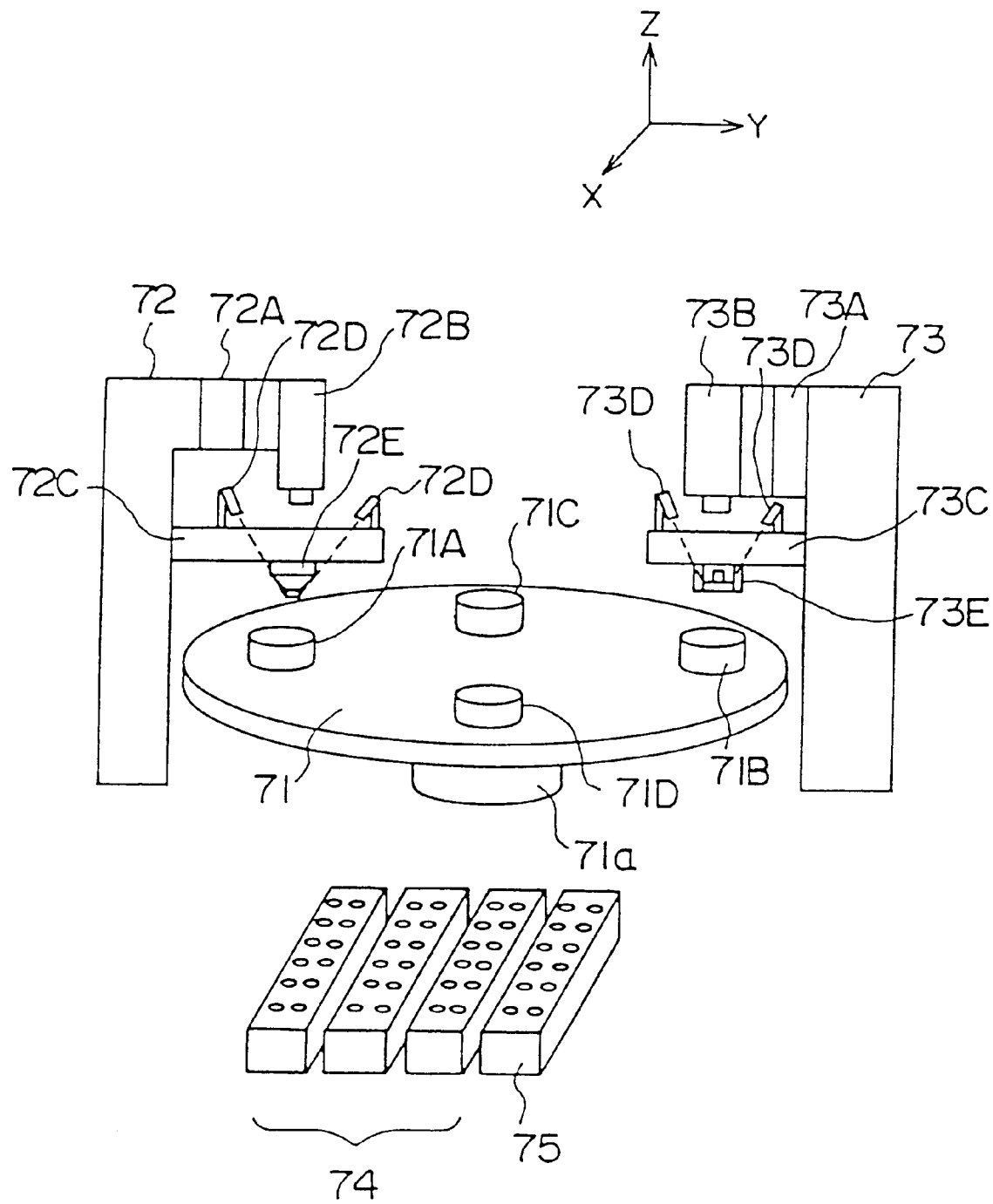
FIG. 41 is a diagram showing the construction of a production rig of the optical module assembly, according to a seventh embodiment of the present invention.

Referring to FIG. 41, the production rig of the optical module includes a turn-table 71 rotatable about an axis 71a and a pair of pillars 72 and 73 disposed diametrically to the foregoing turn-table 71. On the pillar 72, a first xyz-stage 72A is provided for supporting a camera 72B corresponding to the camera 13 described previously and a second xyz-stage 72C for supporting a conical element 72E that holds any of the case 12f of the LD assembly 12, the frame 12A of the lens 12a, or the fiber holder 19B.

Similarly, the pillar 72 carries thereon an xyz-stage 73A supporting a camera 73B corresponding to the camera 13 and another xyz-stage 73C wherein the xyz-stage 73C supports a conical element 73E that holds any of the case 12f of the LD assembly 12, the frame 12A of the lens 12a, or the fiber holder 19B.

Further, adjacent to the foregoing turn-table 71, there is provided a component supply palette 74 and a product recovery palette 75. The supply palette 74 holds any of the LD assemblies 12 in the state in which the lenses 12a are not yet mounted thereon (in the state of LD element), the lenses 12a in the state held in the respective frames 12A and the fiber holders 19A, while the recovery palette 75 holds the completed optical modules.

In addition, the turn-table 71 carries thereon LD holders 71A and 71B positioned in a diametrically opposing relationship with respect to the center of the turn-table 71 for holding the LD assembly 12 in a half-product state in which the lens 12a is not yet mounted upon the case 12f that accommodates therein the laser diode 12d and the photo-diode 12b (see FIG. 5), wherein the turn-table 71 further carries thereon holders 71C and 71D for holding the lens frame 12A and the fiber holder 19A, such that the holders 71C and 71D are disposed also at a diametrically opposing relationship with respect to the center of the turn-table 71, with an angular relationship such that the line connecting the holders 71C and 71D intersects perpendicularly to the line connecting the holders 71A and 71B. It should be noted that the lens frame 12A and the fiber holder 19A have a common outer shape and dimension and can be accepted in any of the holders 71C and 71D.

Figure 42A:
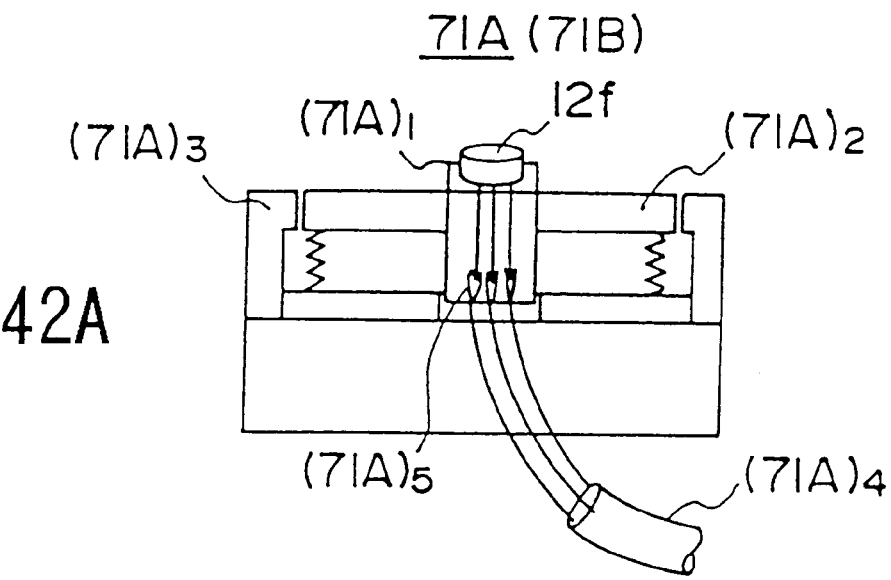
FIGS. 42A–42C are diagrams showing the construction of a holder base used in the production rig of FIG. 41.

FIG. 42A shows the construction of the holders 71A and 71B.

Referring to FIG. 42A, each of the holders 71A and 71B includes a chuck mechanism $(71A)_1$ for holding the case 12f of the LD assembly 12 in the half-product state (LD element), a surface-profiling plate $(71A)_2$ urged by a spring and movable in upward and downward directions, and a clamp $(71A)_3$ for holding the surface-profiling plate $(71A)_2$. Further, each of the holders 71A and 71B includes a contact $(71A)_5$ for connecting the laser diode 12b included in the half-product of the LD assembly 12 to a cable $(71A)_4$.

Figure 42B:
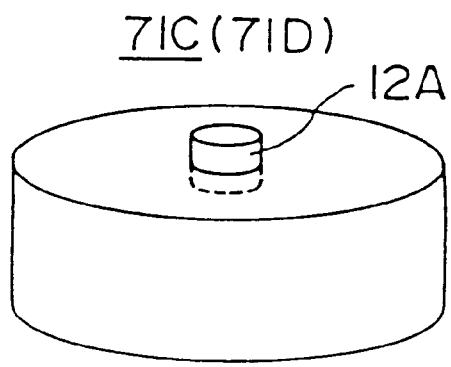
Figure 42C:
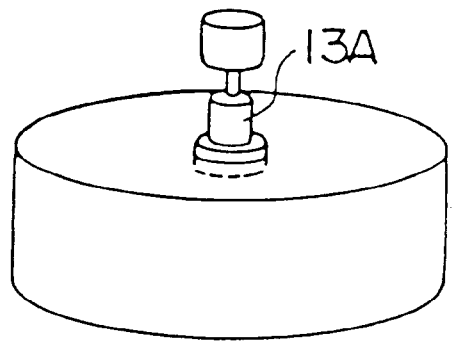

On the other hand, the holders 71C and 71D have substantially the same construction and holds the lens frame 12A as indicated in FIG. 42B or the fiber holder 13A as indicated in FIG. 42C.

Hereinafter, the production of the optical module using the production rig of FIG. 41 will be explained.

Figure 43A:
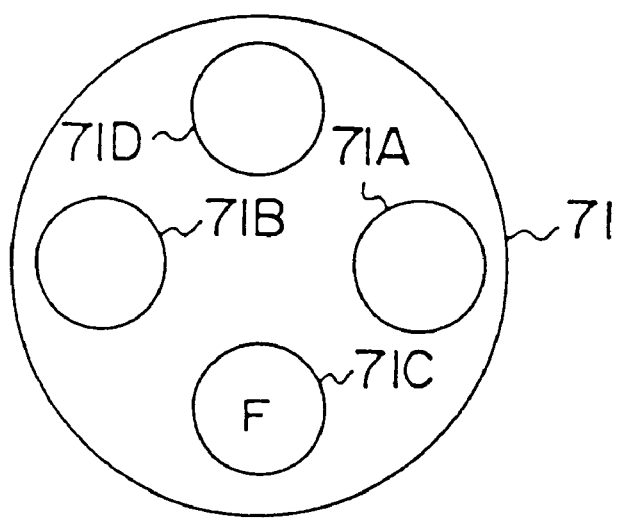
FIGS. 43A–43J are diagrams showing a production step of the optical module assembly carried out by the production rig of FIG. 41.
Figure 43B:
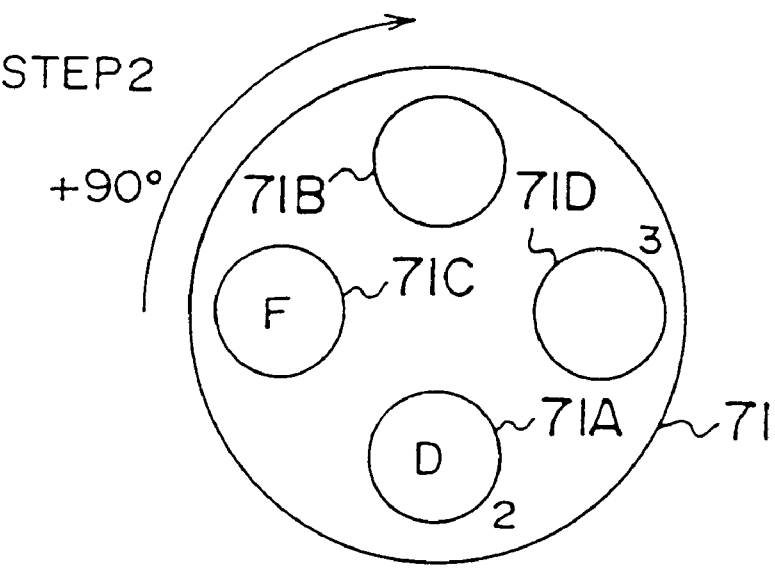
Figure 43C:
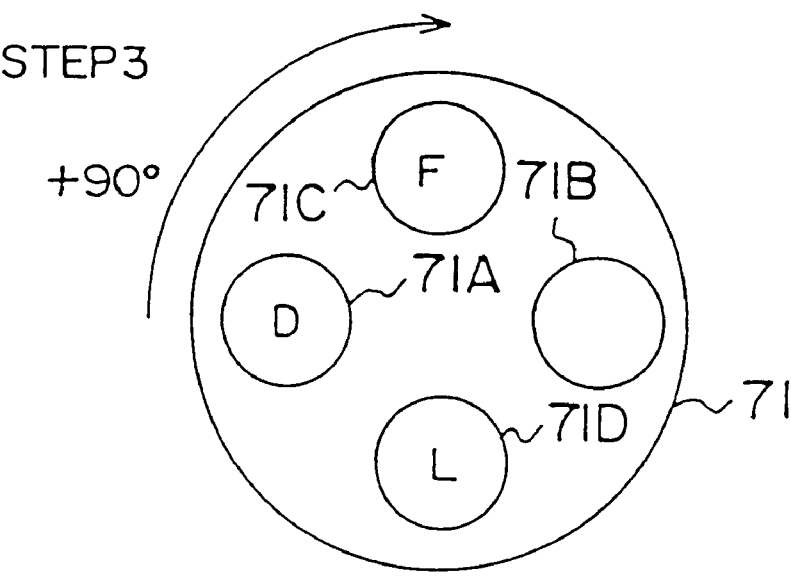

Referring to FIGS. 43A–43J, a first step of FIG. 43A is conducted for supplying a fiber holder 19A to the holder 71C on the turn-table 71 as indicated by "F," followed by a step of FIG. 43B in which the turn-table 71 is rotated in the clockwise direction by 90°. In this state, a half-product of the LD assembly 12 (LD element) is supplied to the holder 71A as indicated by "D," and the step of FIG. 43C is conducted subsequently. In the step of FIG. 43C, the turn-table 71 is rotated further in the clockwise direction by 90°, and the position of the half-product D held in the holder 71A is detected by the camera 72B for the optimum position of the lens 12a. Further, a lens 12 is supplied in this state to the holder 71D together with a frame 12A, as indicated by "L."

Figure 43D:
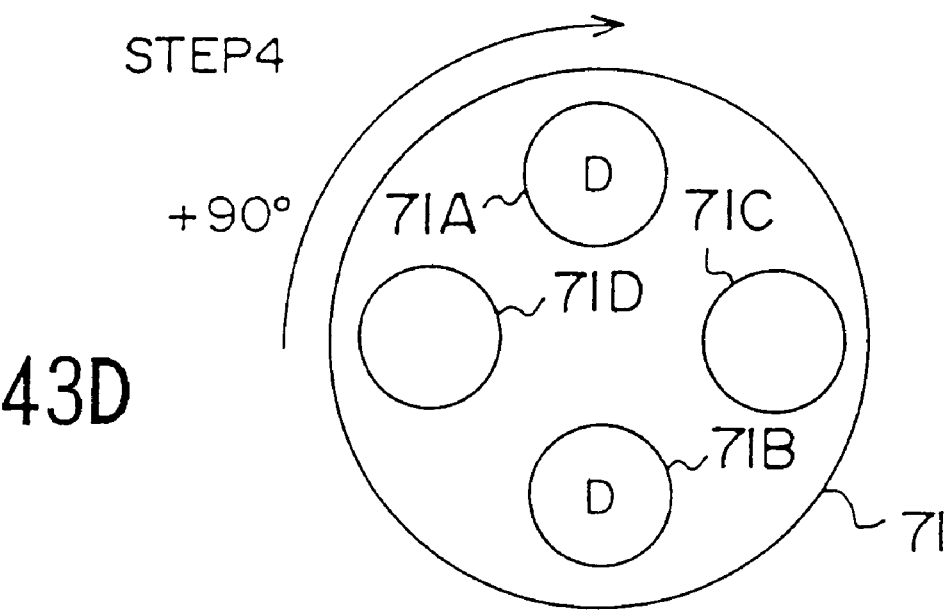
Figure 43E:
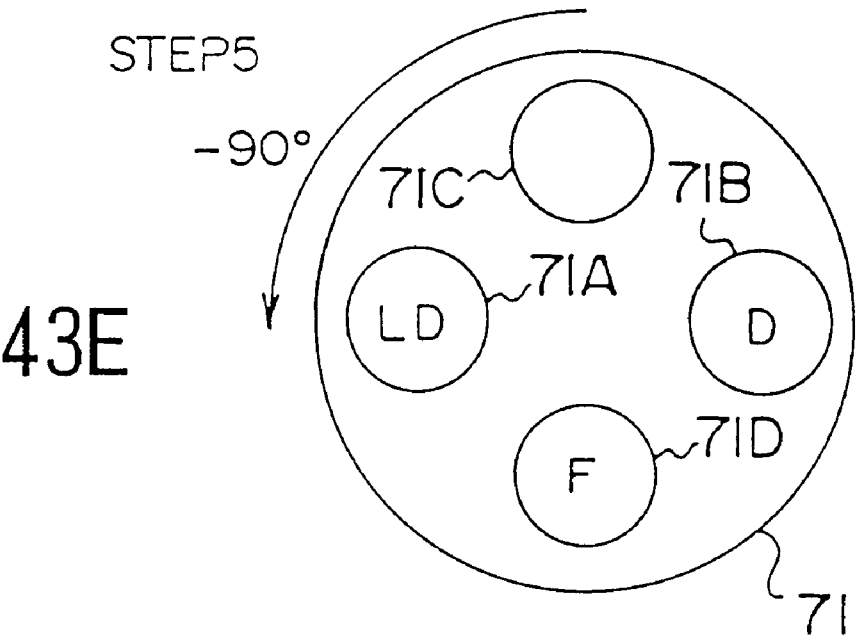

Next, the turntable 71 is turned further in the clockwise direction by 90° in the step of FIG. 43D, and the element 72E is activated for picking up the lens L from the holder 71D. Simultaneously, the element 73E is activated in the step of FIG. 43D wherein the fiber holder F is picked up from the holder 71C. Further, a step of FIG. 43E is activated in which the turn-table 71 is rotated in the counterclockwise direction by a rotational angle of 90s°, and the foregoing lens L, held by the element 72E, is welded upon the half-product D of the LD assembly held on the holder 71A in the optimized state. Further, a new fiber holder F is supplied to the holder 71D in this state.

Figure 43F:
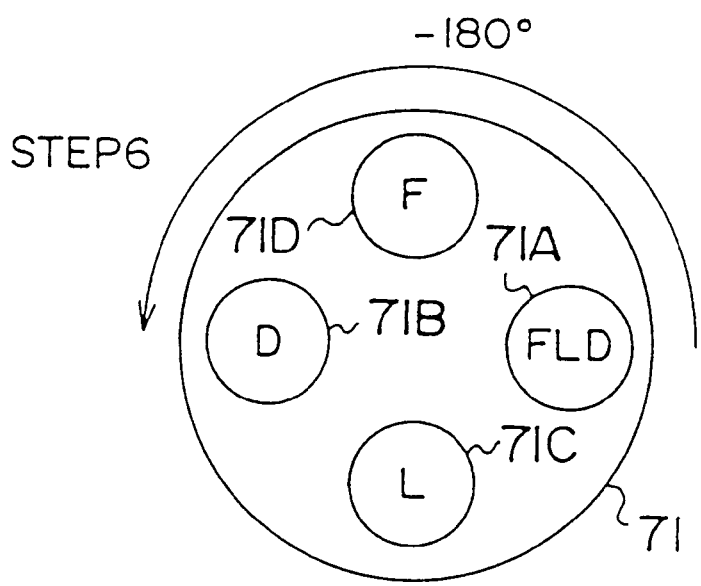

Next, in the step of FIG. 43F, the turn-table 71 is rotated in the counterclockwise direction by 180°, wherein the position of the LD assembly formed in the step of FIG. 43F and held in the holder 71A is detected by the camera 73B. After the detection of the position of the LD assembly as such, the fiber holder F previously picked up by the element 73E is welded to the LD assembly LD held by the holder 71A. Further, the camera 72B is activated in the step of FIG. 43F to detect the position of the half-product D of the LD assembly held in the holder 71B.

Figure 43G:
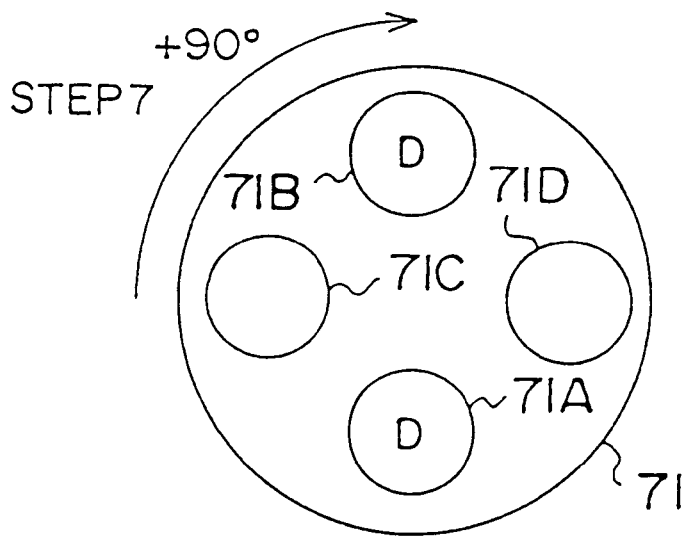

Next, in the step of FIG. 43G, the turn-table 71 is rotated in the clockwise direction by 90°, wherein the completed optical module in the holder 71A is replaced by a new half-product D of the LD assembly. Further, the element 72E is activated for picking up the lens L from the holder 71C, together with the element 73E that picks up the fiber holder F from the holder 71D.

Figure 43H:
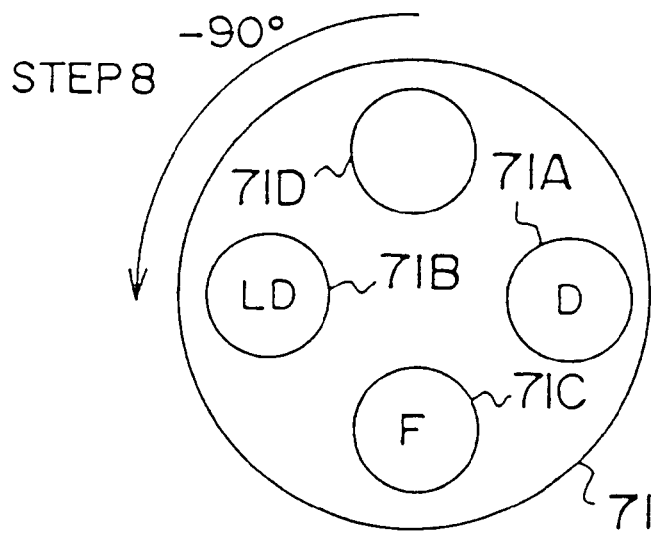

Further, in the step of FIG. 43H, the turn-table 71 is rotated in the counterclockwise direction by 90°, and the element 72E places the lens L held therein, upon the half-product D of the LD assembly, which is now held in the holder 71B. Thereby, the lens L is fixed to the LD assembly by welding.

Figure 43I:
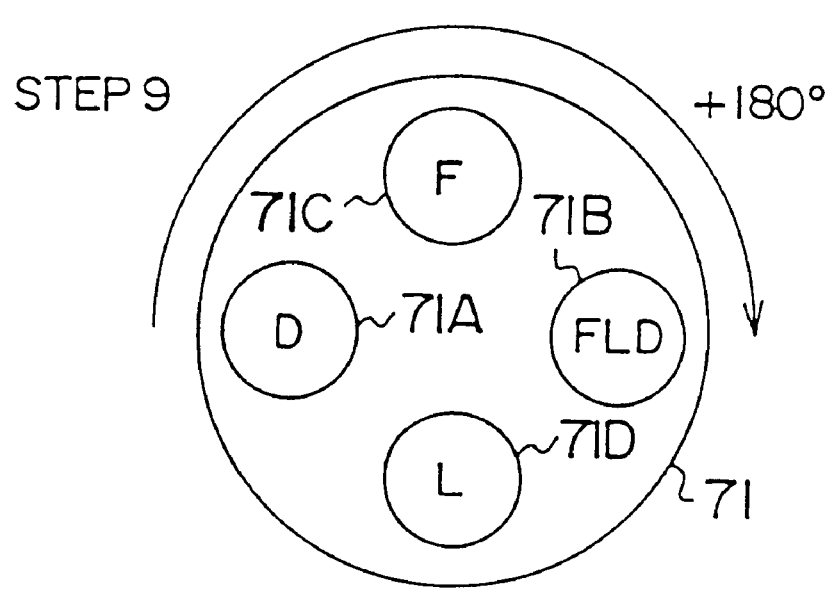

Next, in the step of FIG. 43I, the turn-table 71 is rotated in the clockwise direction by 180°, wherein the camera 73B is activated for detecting the position of the LD assembly held on the holder 71B. Further, the element 73E is activated, wherein the fiber holder F, previously picked up by the element 73E in the step of FIG. 43G and is still held in the element 73E, is placed on the LD assembly LD on the holder 71B, followed by a welding process for welding the fiber holder F to the LD assembly LD. Thereby, a completed optical module FLD is produced in the holder 71B. Further, simultaneously to the foregoing step of FIG. 43I, the position of the half-product D in the holder 71A is detected by the camera 72B.

Figure 43J:
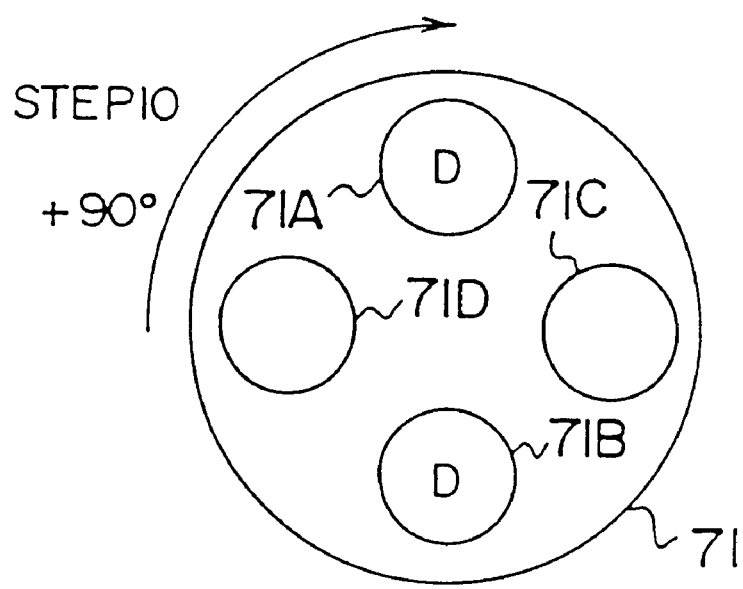

Further, in the step of FIG. 43J, the turn-table 71 is rotated in the clockwise direction by 90°, and the completed optical module FLD in the holder 71B is replaced by a new half-product D of the LD assembly.

Simultaneously to the foregoing step of FIG. 43J, the element 72E is activated for picking up the lens L from the holder 71D. Further, the element 73E is activated also in the step of FIG. 43J for picking up the fiber holder F from the holder 71C, and the process returns to the step of FIG. 43E.

Thereby, it is possible to produce the optical modules consecutively and with high efficiency by repeating the foregoing steps of FIGS. 43E–43J. Particularly, the present invention is advantageous for efficient production of the optical modules by carrying out the optimization of the optical coupling between the half-product D of the LD assembly 12 and the lens L and the optimization of the optical coupling between the LD assembly 12 carrying a lens and the fiber holder 19A, separately from each other.

Figure 44:
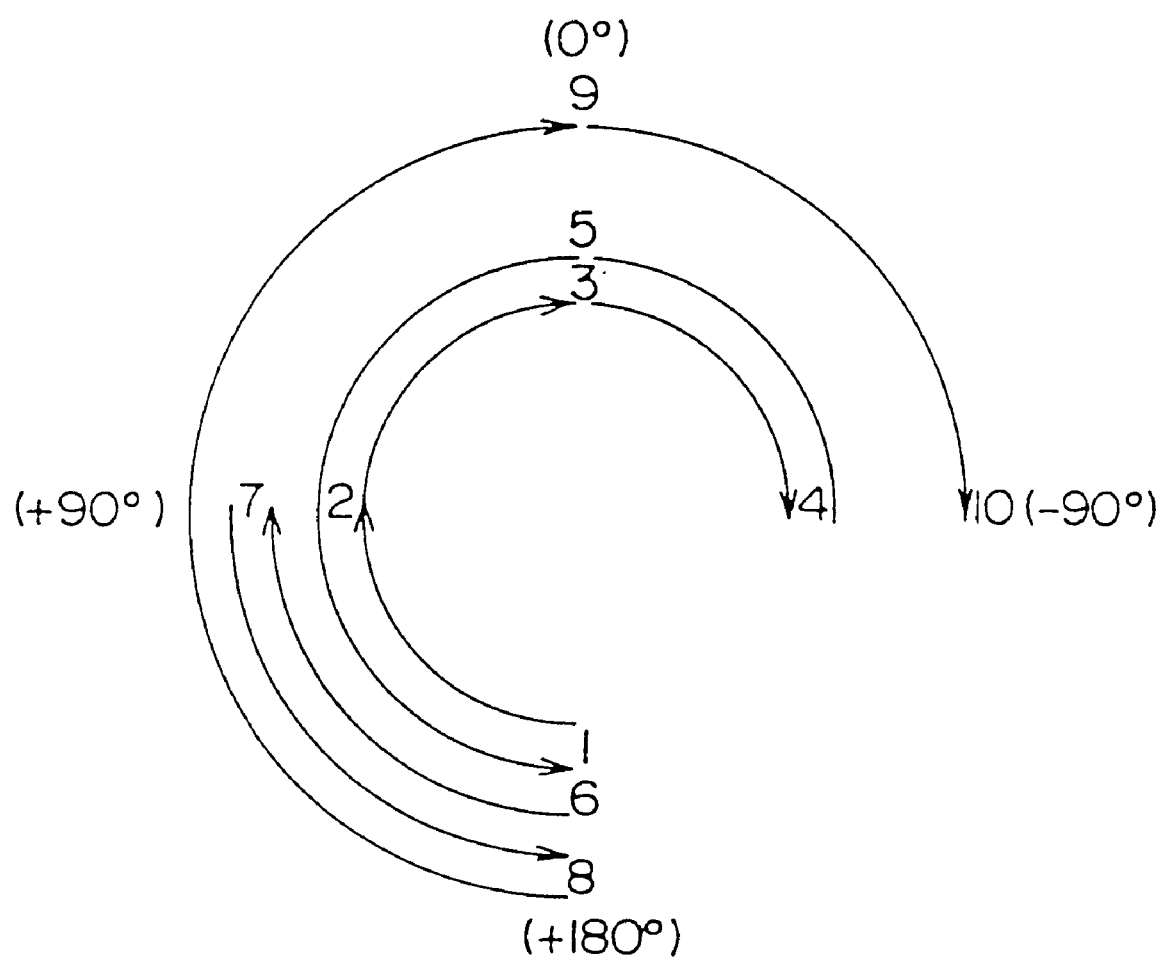
FIG. 44 is a diagram showing the trace of a turn-table in the production rig of FIG. 41.

FIG. 44 shows the trace of the rotation of the turn-table 71 explained in the foregoing steps of FIGS. 43A–43J.

Referring to FIG. 44, it will be noted that the range of rotational angle of the turn-table 71 is limited within 270° and never exceeds 360°. Thereby, one can successfully avoid the problem of disconnection of the cable that is connected to the holder 71A or 71B for driving the laser diode 12b held therein.

Eighth Embodiment

Next, a description will be made of a welding mechanism used for welding the case 12f of the LD element and the lens frame 12A in the optically aligned state, with reference to FIGS. 45–48. Although the description hereinafter assumes the use of the turn-table of FIG. 41, it should be noted that the welding mechanism of the present embodiment is by no means limited to such a construction that uses a turn-table but is applicable also to the case in which no such a turn-table is used. Further, the welding mechanism of the present embodiment can be combined with other types of assembling rigs.

Figure 45:
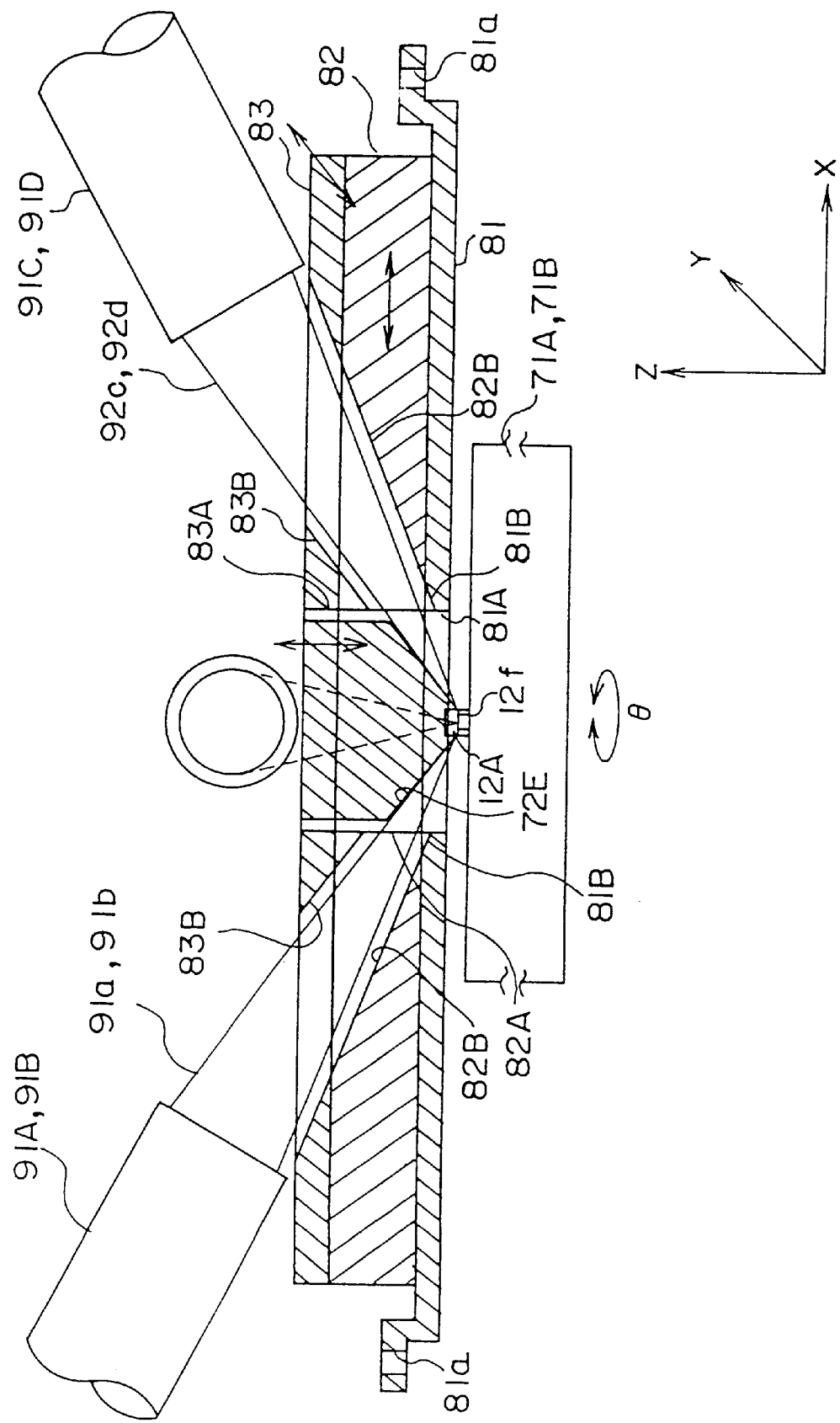
FIG. 45 is a diagram showing the construction of a production rig of an optical module assembly according to an eighth embodiment of the present invention.

Referring to FIG. 45, the welding mechanism includes a holder such as the holder 71A or 71B provided on a base body such as the turn-table 71 in a manner rotatable about an axis Θ for holding the case 12f of the LD element, and a first layer stage mechanism 81 is provided above the holder such as the holder 71A or 71B such that the stage mechanism 81 is fixed to the base body by screws or similar attaching elements. It will be noted that the stage mechanism 81 includes a screw hole 81a for this purpose.

On the stage mechanism 81, there is provided a second layer stage mechanism 82 so as to be movable in the x-direction, and a third layer stage mechanism 83 is provided on the second layer stage mechanism 82 so as to be movable in the y-direction. In addition, the third layer stage mechanism 83 carries thereon a z-stage that is movable in the z-direction. In FIG. 45, it should be noted that the z-stage is not illustrated.

The z-stage, on the other hand, carries at a bottom part thereof, the element 72E for holding the lens frame 12A, and the first through third stage mechanisms 81–83 have, at respective central parts thereof, generally circular cutouts 81A–83A in alignment in the z-direction, for accepting the insertion of the element 72E therein.

In the welding mechanism having such a construction, it will be noted that one can adjust the position of the lens frame 12A with respect to the case 12f of the LD element and hence the position of the LD element itself in the x-y plane by driving the second and third layer stage mechanisms 82 and 83, while the distance between the LD element and the lens frame 12A is adjusted by driving the z-stage 84. Further, the adjustment about the Θ-axis is achieved by causing the holder 71A or 71B to rotate with respect to the turn-table 71. Such an adjustment is of course carried out by using the camera 72B as explained previously.

In the construction of FIG. 45, it should further be noted that YAG lasers 91A–91D are provided separately from the YAG lasers described already such as the laser 72D, such that the YAG lasers 91A–91D focus the respective laser beams 91a–91d to the welding points $W_1$, $W_2$ shown in FIG. 36. In order to allow passage of the laser beams 91a–91d, the stage mechanisms 81–83 are formed with respective passage 81B–83B of the laser beams. As a result of such a welding, the case 12f of the LD element and the frame 12A of the lens are firmly connected.

Figure 46:
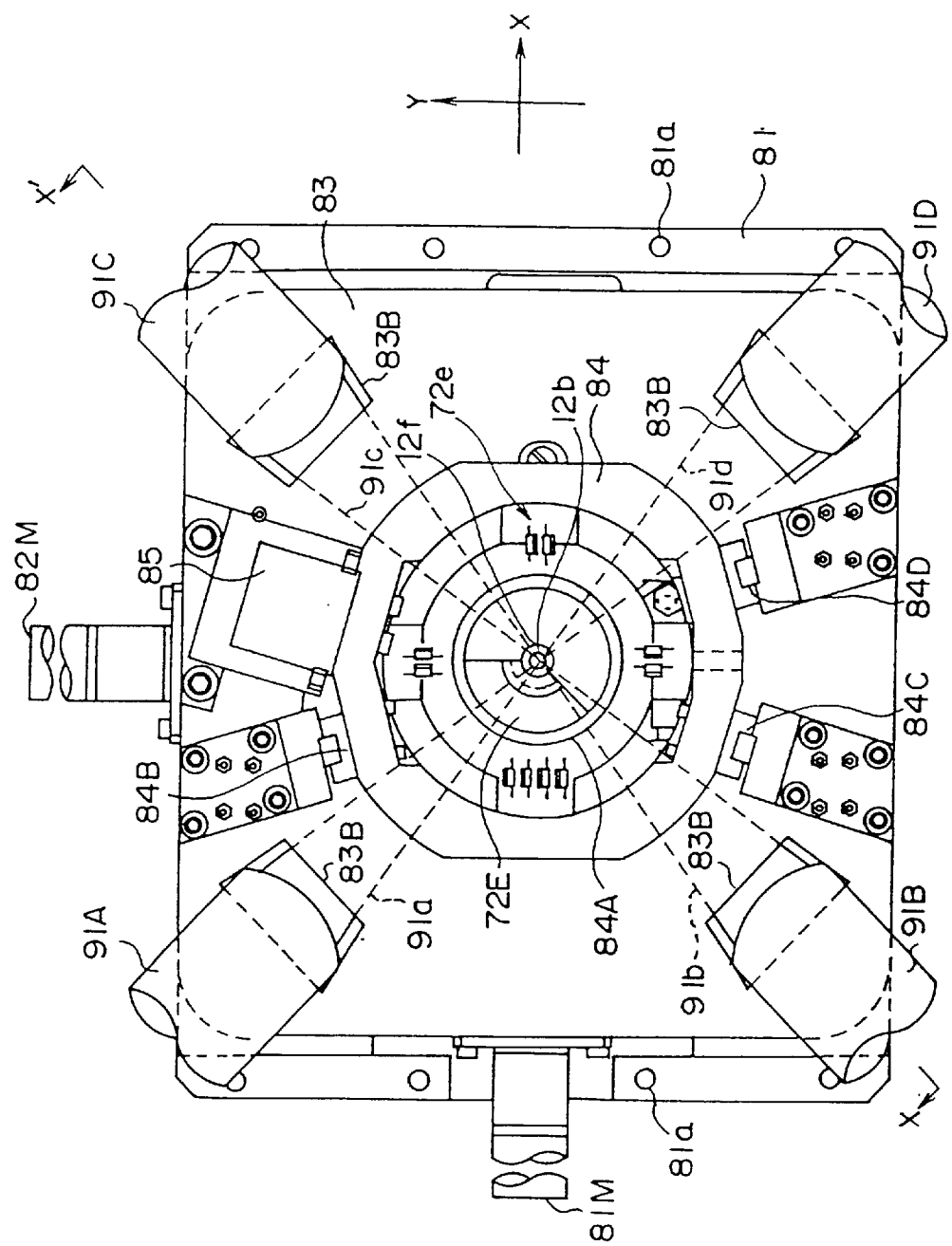
FIG. 46 is a diagram showing a part of the production rig of FIG. 45 in a plan view.

FIG. 46 shows the welding mechanism of FIG. 45 in a plan view, wherein FIG. 45 corresponds to a cross sectional view of the welding mechanism of FIG. 46 taken along a line X-X'.

Referring to FIG. 46 showing the uppermost, third layer stage mechanism 83, the stage mechanism 83 carries thereon YAG lasers 91A–91D and is provided with windows 83B corresponding to the paths of the laser beams 91a–91d that are emitted from the foregoing YAG lasers, such that each of the laser beams passes through a corresponding one of the windows 83B obliquely from the upward side of the stage mechanism 83 to the downward side thereof.

The stage mechanism 83 further carries linear guides 84B–84D for guiding the z-stage in the z-direction as well as a drive mechanism 85 that drives the z-stage 84 in the z-direction. The drive mechanism 85 includes a drive motor 85A not illustrated in FIG. 46 wherein the drive motor 85A moves the z-stage 84 up and down. Further, FIG. 46 shows a drive motor 83M for driving the stage mechanism 83 in the x-direction and a drive motor 82M that drives the stage mechanism 82 in the y-direction.

As will be noted from FIG. 46, the z-stage 84 is formed with an opening 84C generally at the center thereof in correspondence to the element 72E, wherein the opening 84C exposes the LD case 12f or the laser diode 12b in the LD assembly or the LD element to the camera 72B in the state that the LD element or the LD assembly is held by the element 72E. Further, the element 72E carries thereon various force sensors 72e that detect anomalous engagement between the element 72E and the case 12f of the LD element. It should be noted that the opening 84C is formed in alignment with the central cutout 83A of the stage 83.

Figure 47:
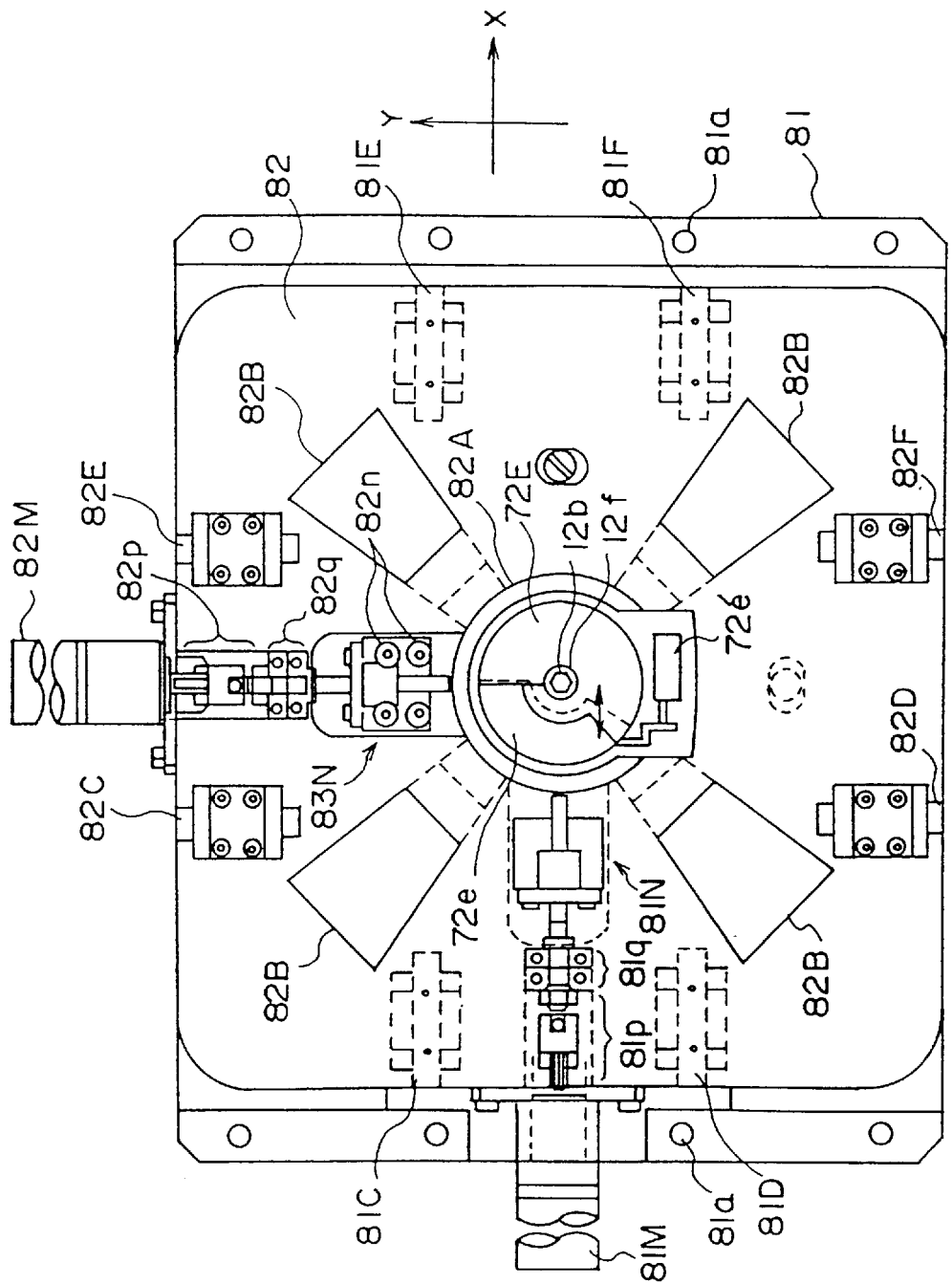
FIG. 47 is a diagram showing a part of the production rig of FIG. 45 in a plan view.

FIG. 47 shows the construction of the second layer stage mechanism in a plan view.

Referring to FIG. 47, it will be noted that the stage mechanism 82 includes the central cutout 82A in alignment with the central cutout 83A for allowing the entrance of the element 72E thereinto. Further, the stage mechanism 82 is also formed with windows 82B in correspondence to the passage of the laser beams, and the laser beam that has passed through a window 83B of the stage mechanism 83 passes subsequently through a corresponding window 82B, from an upward direction of the stage mechanism 82 to a downward direction thereof.

The stage mechanism 82 is further provided with motors 81M and 82M, wherein the motor 81M drives a corresponding ball-nut mechanism 81N fixed to the upper side of the stage mechanism 81 via a coupling 81p and a bearing 81q both provided on a lower side of the stage mechanism 81. Thereby, the stage mechanism 82 is moved, with respect to the stage mechanism 81, in the x-direction in response to the energization of the motor 81M. On the other hand, the motor 82M drives a ball-nut mechanism 83N fixed to the lower side of the stage mechanism 83 by a bolt 82n, via a coupling 82p and a bearing 82q, both provided on the upper side of the stage mechanism 82. Thereby, the stage mechanism 83 is moved in the y-direction with respect to the stage mechanism 82 in response to the energization of the motor 82M.

On the upper side of the stage mechanism 82, there are disposed linear guides 82C–82F each acting as a guide in the y-direction, generally symmetrically about the foregoing case 12f so that the case 12f is held in the element 72E. In such a construction, the linear guides 81C–81F and the linear guides 82C–82F support the stage mechanisms 81 and 82 from both lateral sides of the case 12f that is subjected to the welding. Thereby, any reaction force exerted upon the stages 81 and 82 at the time of welding is successfully and evenly supported by the linear guides disposed generally symmetrically about the site of the welding. It should be noted that a welding is generally accompanied with dilation and contraction. As a result of such a support by the linear guides from two lateral directions, the deformation of the stage mechanisms is minimized and a stable welding becomes possible. Further, such a construction can reduce the overall thickness of the stages 81–83 as compared with the conventional case in which these stages are merely stacked, in view of the construction thereof in which the motors 81M and 82M as well as the cooperating force transmission systems 81p and 81q or 82p and 82q are all provided on the same, common stage mechanism 82. Thereby, the laser beam is readily focused upon the welding point $W_1$ even when the focal length of the YAG lasers 91A–91D is limited.

As indicated in FIG. 47, the element 72E includes a movable cone 72e driven by a cylinder 72e', wherein the movable cone 72e holds the case 12f. It should be noted that the cylinder 72e' is mounted upon the lower side of the z-stage 84 together with the element 72E.

Figure 48:
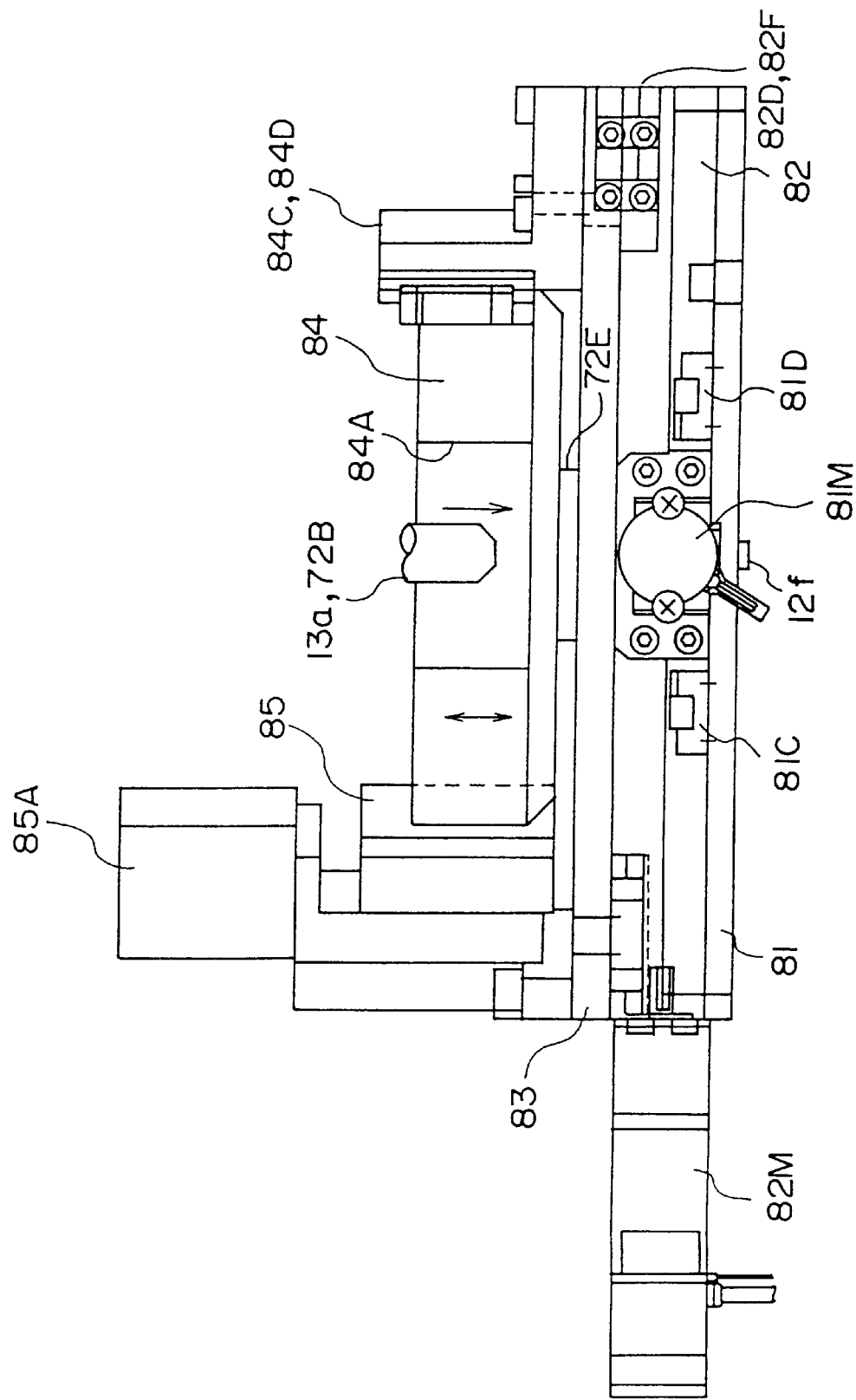
FIG. 48 is a diagram showing the production rig of FIG. 45 in a side view.

FIG. 48 shows the construction of FIGS. 46 and 47 in the projection viewed from the x-direction, wherein the illustration of the holders 71A and 71B or the lasers 91A–91D is omitted for the sake of simplicity.

Referring to FIG. 48, the z-stage 84 is held on the stage mechanism 83 and movable up and down by means of the linear guides 84C and 84D as well as by a linear guide 84B not illustrated in FIG. 48, wherein the z-stage 84 is moved up and down by the drive mechanism 85 that includes the motor 85A. Further, the conical element 72E accepted inside the central cutout 84A of the z-stage 84 holds the LD case 12f at the lower end part thereof. The element 72E is further adapted for accepting the objective lens 13a forming the optical system of the camera 72B. The objective lens 13a has a conical tip end and is suitable for close-up pictures the LD element.

As noted already, the construction of FIGS. 45–48 is by no means limited to the particular automatic assembling process that uses the turn-table of FIG. 41, but is applicable to other automatic assembling processes or even a manual assembling process in which the case 12f and the lens 12A are supplied manually.

In the embodiments explained before, a construction is provided in which the efficiency of coupling for the optical fiber edge and the optical devices is maximized. The present invention is by no means limited to such a case where the optimum state is searched but is applicable for searching a position that is offset from the optimum state. It should be noted that such a search includes a search of a position intentionally avoiding the optimum state.

Further, one should note that the optical device in the LD assembly is not limited to the laser diode or photodiode but also includes passive optical elements such as a prism or a lens.

Further, the present invention is by no means limited to the embodiments described heretofore, but variations and modifications may be made without departing from the scope of the invention.

What is claimed is:

1. A method for producing an optical module assembly including an optical module and an optical fiber coupled optically to said optical module, said optical module including a lens, said method comprising the steps of:
    (a) illuminating an optical surface of an optical device included in said optical module through said lens;
    (a) illuminating an optical surface of an optical device included in said optical module through said lens;
    (b) acquiring an image of said optical surface as viewed through said lens;
    (c) obtaining a position of an end surface of said optical fiber with respect to said optical surface of said optical device, as viewed through said lens, based upon said image of said optical surface acquired through said lens; and
    (d) positioning said end surface of said optical fiber at said position as viewed through said lens and obtained in said step (c).

2. A method as claimed in claim 1, wherein said step (a) for illuminating the optical surface of the optical device is conducted by said illumination optical beam having a wavelength substantially identical to a wavelength of another optical beam that is guided through said optical fiber, said another optical beam causing an interaction with said optical device.

3. A method as claimed in claim 1, wherein said step (a) for illuminating the optical surface of the optical device is conducted by said illumination optical beam being a monochromatic optical beam having a visible wavelength which is substantially different from a wavelength of a signal optical beam guided through said optical fiber, said signal optical beam causing an interaction with said optical device.

4. A method as claimed in claim 3, wherein said step (c) includes the steps of:
    obtaining a first position of said end surface of said optical fiber with respect to said optical surface of said optical device at which a maximum optical coupling is achieved between said optical device and said optical fiber for said monochromatic optical beam; and
    obtaining a second position, based upon said first position, of said end surface of said optical fiber with respect to said optical surface of said optical device such that a maximum optical coupling is achieved between said optical device and said optical fiber for said signal optical beam.

5. A method as claimed in claim 1, wherein said step (c) includes:
    obtaining a first position of said end surface of said optical fiber with respect to said optical device, by carrying out said steps (a) and (b) by a first sub-step, in which an optical path conversion element is removed from between said optical device and said end surface of said optical fiber;
    obtaining a second position of said end surface of said optical fiber with respect to said optical device for a state in which said optical path conversion element is provided between said optical device and said edge surface of said optical fiber by using a second sub-step; and
    positioning said end surface of said optical fiber to said second position with respect to said optical device by using a third sub-step.

6. A method as claimed in claim 5, wherein said first step further includes a lens optimization step for optimizing a relative position of a lens with respect to said optical device, said lens being interposed between said optical device and said end surface of said optical fiber in cooperation with said optical device, based upon an image of said optical surface of said optical device of said step (b) over said lens, while illuminating said optical surface of said optical device in said step (a).

7. A method as claimed in claim 6, wherein said optical device includes a light emitting device and a photoreception device, said photoreception device being separated from said light emitting device, wherein said lens optimization step includes the steps of: rotating said optical device about an optical axis; and changing a relative position of said lens with respect to said optical device in a plane perpendicular to said optical axis.

8. A method as claimed in claim 1, wherein said optical device includes a light emitting device, a photoreception device, and a lens, said lens being provided commonly to, and in cooperation with, said light emitting device and said photoreception device, and wherein said step (c) includes the sub-steps of:
    obtaining a first position of said end surface of said optical fiber with respect to said optical surface of said optical device for each of said light emitting device and said photoreception device, in which an optical path conversion element is removed from a region between said optical device and said end surface of said optical fiber, based upon an image of said optical surface of said optical device, by carrying out said steps (a) and (b) when said lens is present and said optical path conversion element is removed;

calculating, from said first position, a second position of said end surface of said optical fiber with respect to said optical surface of said optical element when said optical path conversion element is present, for each of said light emitting device and said photoreception device;

obtaining a difference between said second position of said light emitting device and said second position of said photoreception as measured in a direction of an optical axis of said optical fiber at said end surface thereof;

moving said lens in a plane perpendicular to said optical axis, based upon said difference, such that a position of said light emitting device coincides with a position of said photoreception device within a plane perpendicular to said optical axis.

9. A method as claimed in claim 8, wherein said step of moving said lens includes the steps of:

obtaining a first beam position of an optical beam emitted from said end surface of said optical fiber by providing a light into said optical fiber at an opposite end of said optical fiber;

obtaining a second beam position of an optical beam emitted from said end surface of said optical fiber and passed through said optical path conversion element;

calculating an inclination angle of a prism forming said optical path conversion element with respect to said optical axis, based upon said first and second positions; and obtaining an amount of movement of said lens in said plane from said difference and said inclination angle.

10. A method as claimed in claim 1, wherein said step (a) for illuminating said optical surface of said optical device includes the step of interrupting said illumination optical beam at a part corresponding to said optical axis.

11. A method as claimed in claim 10, wherein said step (a) further includes a step for polarizing said illumination optical beam so as to have a first polarization plane; and wherein said step (b) includes a step for analyzing an optical beam produced at said optical surface as a result of reflection of said illumination optical beam, in a second, perpendicular direction.

12. A method as claimed in claim 11, wherein said step (a) for illuminating said optical surface includes a plurality of illumination steps conducted with respective, mutually different masks for shaping said illumination optical beam, each of said plurality of illumination steps producing an image of said optical surface; and wherein said step (b) for acquiring said image of said optical surface includes a step of synthesizing said image of said optical surface by superposing said plurality of images.

13. A method as claimed in claim 1, wherein said step (a) for illuminating said optical surface includes the steps of: introducing said illumination optical beam to also travel generally parallel to an optical axis of a lens cooperating with said optical surface and which forms a part of said optical module; shaping said illumination beam by cutting a part thereof coincident to said optical axis by a mask; and scanning said optical beam thus shaped over said optical surface; and wherein said step (b) for acquiring said image of said optical surface includes the steps of:

reproducing an image of said optical surface from an optical beam reflected from said optical surface;

extracting a part of said reproduced image of said optical surface not covered by said mask, in synchronization to said scanning; and synthesizing said image of said optical surface from said parts extracted from said reproduced image, wherein said step of extracting is conducted so as to avoid a reflection of said illumination beam from said lens.

14. A method as claimed in claim 1, wherein said step (b) for acquiring the image of said optical surface includes: obtaining a nominal correlation between the image of said optical surface illuminated in said step (a) and a registered pattern of said optical surface; and adjusting a focusing of said optical system used in said step (b).

15. A method as claimed in claim 14, wherein said step for adjusting the focusing includes differentiating said optical surface to obtain a contour thereof, and confirming the sharpness of said contour thus obtained.

16. An apparatus for producing an optical module assembly in which an optical module is coupled optically to an optical fiber, comprising:

a holder of said optical module, said optical module including a lens;

an illuminating device that illuminates said optical module through said lens when said optical module is held by said holder;

an imaging device acquiring an image of said optical module through said lens when said optical module is held by said holder;

a triaxial stage carrying said illuminating device and said imaging device in a manner movable in three different directions; and an image processor obtaining a position of said optical fiber at which said optical fiber aligns optically to said optical module in accordance with said image acquired by said imaging device through said lens.

17. An apparatus as claimed in claim 16, wherein said holder includes a rotational mechanism for rotating said optical module about an optical axis of said optical module.

18. An apparatus as claimed in claim 16, wherein said imaging device comprises a camera having an imaging optical system, and wherein said illuminating device includes; a light source; a light guide for guiding an illumination light produced by said light source as an illumination optical beam; and an optical device for passing the illumination optical beam into said imaging optical system, said optical device directs said illumination optical beam to travel parallel to an optical axis of said imaging optical system.

19. An apparatus as claimed in claim 16, wherein said holder includes a gimbal mechanism and a rotary mechanism held on said gimbal mechanism, said rotary mechanism holding said optical module in a manner rotatable about an optical axis of said optical module, and wherein said apparatus further comprises a lens holder for holding a lens which is a part of said optical module, said lens holder holding said lens in a manner movable in a plane substantially perpendicular to said optical axis of said optical module.

20. An apparatus as claimed in claim 18, wherein said illumination device includes a mask mechanism disposed between said light source and said optical injection device, for shaping said illumination optical beam.

21. An apparatus as claimed in claim 20, wherein said mask mechanism interrupts a part of said illumination optical beam traveling coincident to the optical axis of said imaging optical system.

22. An apparatus as claimed in claim 20, wherein said mask mechanism includes: a plurality of mask elements each interrupting a part of said illumination optical beam; and a mask switching mechanism for selectively inserting one of said plurality of mask elements into a path of said illumination optical beam.

23. An apparatus as claimed in claim 20, wherein said mask mechanism includes a cylindrical lens that deforms said illumination optical beam to produce an illumination beam band and a scanning mechanism for scanning said optical surface of said optical module by said illumination beam band, and wherein said image processor extracts image elements from said image acquired by said imaging device, said image processor synthesizes an image of said optical module from said image elements thus extracted.

24. An apparatus as claimed in claim 16, further comprising:
   first through fourth rotational shafts disposed on a common flat plane so as to form a generally square shape;
   a force transmission system for mechanically coupling said first through fourth rotational shafts such that a rotation of one of said first through fourth rotational shafts is transmitted to another shaft;
   a driving mechanism for driving one of said first through fourth rotational shafts;
   first through fourth motion-conversion mechanisms provided respectively on said first through fourth rotational shafts, each of said first through fourth motion-conversion mechanisms converting a rotational motion of a corresponding rotational shafts into a linear motion moving in a direction perpendicular to said rotational shafts; and
   first through fourth laser welding units respectively carried by said first through fourth motion-conversion mechanisms, said first through fourth laser welding units being disposed so as to focus respective output laser beams at a common central point;
   said first through fourth motion-conversion mechanisms causing a simultaneous movement of said first through fourth laser welding units to and from said common central point, in response to an energization of said driving mechanism.

25. An apparatus for producing an optical module assembly, said optical module assembly including an optical device, a lens and an optical fiber connector adapted for connection to an optical fiber; said apparatus comprising:
   a turn-table;
   a first assembling unit provided at a first location adjacent to said turn-table, said first assembling unit mounting a lens on an optical device with an optical coupling to said optical device;
   a second assembling unit provided at a second location adjacent to said turn-table and spaced from said first location, said second assembling unit mounting an optical fiber connector to a lens mounted on an optical device;
   a first component holder provided on said turn-table at a first angular position that corresponds to said first assembling unit when said turn-table is in a first angular state;
   a second component holder provided on said turn-table at a second angular position offset from said first angular position in a first angular direction;
   a third component holder provided on said turn-table at a third angular position offset from said second angular position in said first angular direction;
   a fourth component holder provided on said turn-table at a fourth angular position offset from said third angular position in said first angular direction,
   said third angular position being set so as to correspond to said second assembling unit when said turn-table is in said first angular state;
   said second and said fourth angular positions being set to correspond respectively to said first and second assembling units when said turn-table is in a second angular state;
   each of said first through fourth component holders being capable of holding any of said optical device, said lens and said optical fiber connector;
   said first assembling unit picking up a lens from one of said first through fourth component holders which is located at a position corresponding to said first assembling unit, said first assembling unit further mounting said lens onto an optical device held in another component holder with optical alignment so that said another component holder is located at the position corresponding to said first assembling unit;
   said second assembling unit picking an optical fiber connector from one of said first through fourth component holders located at a position corresponding to said second assembling unit, said second assembling unit further mounting said optical fiber connector to a lens mounted on a corresponding optical device in other component holder with optical alignment so that said other component holder is located at the position corresponding to said second assembling unit.

26. An apparatus as claimed in claim 25, wherein said first through fourth component holders are provided on said turn-table with a mutual separation of substantially 90°, and wherein said first and second assembling units are disposed adjacent to said turn-table with a mutual separation of substantially 180° about a center of said turn-table.

27. An apparatus as claimed in claim 25, wherein said turn-table has a maximum rotational angle of substantially 180° in first and second rotational directions.

28. An apparatus for producing an optical module assembly, said optical module assembly including an optical device and a lens, said apparatus comprising:
   a holder base for rotatably holding an optical device;
   a first layer stage provided on said holder base;
   a second layer stage provided on said first layer stage so as to be movable in a first direction with respect to said first layer stage;
   a first drive mechanism for driving said second layer stage with respect to said first layer stage in said first direction;
   a third layer stage provided on said second layer stage so as to be movable in a second, different direction;
   a second drive mechanism for driving said third layer stage with respect to said second layer stage in said second direction;
   a z-stage provided on said third layer stage so as to be movable in a vertical direction substantially perpendicular to said first and second directions, said z-stage carrying a lens holding mechanism for holding a lens;
   a z-drive mechanism for driving said z-stage on said third layer stage in said vertical direction; and
   a welding mechanism for welding said optical device and said lens with each other;

said first through third layer stages being provided with first through third openings respectively, said first through third openings allowing intrusion of said lens holding mechanism thereinto;

said z-stage having an opening for allowing intrusion of an imaging device thereinto, said imaging device detecting an optical alignment between said optical device and said lens;

said first layer stage carrying thereon a plurality of first guide mechanisms, said first guide mechanisms are provided between said first and second layer stages and guide said second layer stage in said first direction with respect to said first layer stage;

said second layer stage carrying thereon a plurality of second guide mechanisms, said second guide mechanisms are provided between said second layer stage and said third layer stage and guide said third layer stage in said second direction with respect to said second layer stage.

29. An apparatus as claimed in claim 28, wherein said first guide mechanisms are disposed generally symmetrically with respect to said second opening, and wherein said second guide mechanisms are disposed generally symmetrically with respect to said third opening.

30. An apparatus as claimed in claim 28, wherein said welding mechanism includes a plurality of lasers, and wherein each of said first through third layer stages is provided with cutouts for allowing passage of laser beams produced by said plurality of lasers.

31. An apparatus as claimed in claim 28, wherein said second layer stage carries said first guide mechanism at a lower side thereof, said second layer stage further carrying said second guide mechanism at an upper side thereof.

32. An apparatus as claimed in claim 28, wherein said first and second drive mechanisms include first and second motors respectively, and wherein said second layer stage carries said first and second motors such that respective rotational axes of said first and second motors intersect substantially perpendicularly with each other.

* * * * *